(12) United States Patent
Casbolt

(10) Patent No.: US 12,472,207 B2
(45) Date of Patent: Nov. 18, 2025

(54) ANTI-INFLAMMATORY COMPOSITIONS AND METHODS

(71) Applicant: RR Medsciences Pty Ltd., Gordon (AU)

(72) Inventor: Llewellyn Stephen Frank Casbolt, Mount Rankin (AU)

(73) Assignee: RR Medsciences Pty Ltd., Gordon (AU)

( * ) Notice: Subject to any disclaimer, the term of this patent is extended or adjusted under 35 U.S.C. 154(b) by 967 days.

(21) Appl. No.: 17/310,270

(22) PCT Filed: Jan. 28, 2020

(86) PCT No.: PCT/AU2020/050053
§ 371 (c)(1),
(2) Date: Jul. 27, 2021

(87) PCT Pub. No.: WO2020/154762
PCT Pub. Date: Aug. 6, 2020

(65) Prior Publication Data
US 2022/0168339 A1    Jun. 2, 2022

(30) Foreign Application Priority Data
Jan. 28, 2019  (AU) .................. 2019900251

(51) Int. Cl.
| | | |
|---|---|---|
| A61K 33/34 | (2006.01) |
| A61K 8/19 | (2006.01) |
| A61K 9/00 | (2006.01) |
| A61K 47/18 | (2017.01) |
| A61Q 17/04 | (2006.01) |

(52) U.S. Cl.
CPC ............ *A61K 33/34* (2013.01); *A61K 8/19* (2013.01); *A61K 9/0014* (2013.01); *A61K 47/183* (2013.01); *A61Q 17/04* (2013.01); *A61K 2800/58* (2013.01)

(58) Field of Classification Search
None
See application file for complete search history.

(56) References Cited

U.S. PATENT DOCUMENTS

| | | |
|---|---|---|
| 2004/0247633 A1 | 12/2004 | Eberl et al. |
| 2006/0183708 A1 | 8/2006 | Gupta |
| 2015/0306062 A1 | 10/2015 | Vulders |

FOREIGN PATENT DOCUMENTS

| | | |
|---|---|---|
| AU | 2004205086 A1 | 3/2006 |
| WO | 2016201524 A1 | 12/2016 |
| WO | 2017191453 A1 | 11/2017 |
| WO | 2019153051 A1 | 8/2019 |

OTHER PUBLICATIONS

International Search Report for PCT/AU2020/050053, mailed Apr. 9, 2020 (9 pages).
McCook, J.P., et al., "Ability of sodium copper chlorophyllin complex to repair photoaged skin by stimulation of biomarkers in human extracellular matrix," Clinical, Cosmetic and Investigational Dermatology, vol. 9, pp. 167-174 (2016).

*Primary Examiner* — Robert A Wax
*Assistant Examiner* — Quanglong N Truong
(74) *Attorney, Agent, or Firm* — McNeill PLLC

(57) ABSTRACT

Disclosed are compositions comprising a copper complex useful in the reduction of inflammation in one or more tissues. Also disclosed are methods of utilizing the copper complexes for treating/preventing inflammation in one or more tissues, treating/enhancing wound healing, preventing/reducing DNA damage caused by radiation, and reducing free radical damage.

20 Claims, 11 Drawing Sheets

A  B

ANTI-INFLAMMATORY COMPOSITIONS AND METHODS

CROSS REFERENCE TO RELATED APPLICATIONS

This application is a national phase entry pursuant to 35 U.S.C. § 371 of International Application No. PCT/AU2020/050053, filed 28 Jan. 2020, which claims priority to Australian Provisional Application No. 2019900251 entitled "Anti-Inflammatory Compositions and Methods" filed 28 Jan. 2019, the contents of which are incorporated by reference in their entirety.

This application claims priority to Australian Provisional Application No. 2019900251 entitled "Anti-Inflammatory Compositions and Methods" filed 28 Jan. 2019, the contents of which are incorporated herein by reference in their entirety.

FIELD OF THE INVENTION

The present invention relates to compositions useful in the reduction of inflammation in one or more tissues. The present invention also relates to methods of treating and/or preventing inflammation in one or more tissues.

BACKGROUND OF THE INVENTION

It is to be understood that, if any prior art publication is referred to herein, such reference does not constitute an admission that the publication forms a part of the common general knowledge in the art, in Australia or any other country.

The skin is a highly metabolic tissue with the largest surface area in the body. It serves as the protective layer for internal organs. The skin tissue is exposed to a variety of damaging threats coming from the outer environment (e.g., ultraviolet radiation), the skin itself and various endogenous sources. Skin exposure to these endogenous and exogenous factors (including ultraviolet radiation, drugs, physical and psychological stress, alcohol, poor nutrition and xenobioticis) leads to the harmful generation of reactive oxygen species (ROS), which damages proteins, lipids and DNA (see, Le Quéré, et al., 2014).

Inflammation is the complex biological response of vascular tissues to pathogens, damaged cells, chemical signals or irritants. The development of an inflammatory response is a major contributor to many diseases and/or conditions. The appropriate management of inflammatory responses has become a major goal, given the extremely high burden on the medical system by diseases and conditions associated with inflammation. Inflammation can be classified as either acute or chronic.

Acute inflammation is a short-term process characterized by swelling, redness, pain, heat, and loss of function caused by the increased movement of plasma and leukocytes from the blood into the injured tissues. Acute inflammation is initiated by the blood vessels adjacent to the injured tissue, which adapt to allow the exudation of plasma proteins and leukocytes into the surrounding tissue. The increased flow of fluid into the tissue causes the characteristic swelling associated with inflammation, and the increased blood flow to the area causes the reddened colour and increased heat. The blood vessels are also altered to permit the extravasation of leukocytes through the endothelium and basement membrane constituting the blood vessel. Once in the tissue, the cells migrate along a chemotactic gradient to reach the site of injury, where they can attempt to remove the stimulus and repair the tissue. Several biochemical cascade systems, consisting of chemicals known as plasma-derived inflammatory mediators, act in parallel to propagate and mature the inflammatory response. These include the complement system, coagulation system, and fibrinolysis system. Removal of the injurious stimuli causes down-regulation of the inflammatory response and concludes acute inflammation. Down regulation halts the recruitment of monocytes into the inflamed tissue, existing macrophages exit the tissue via lymphatics and wound healing begins.

The causes of acute inflammation include physical injury (blunt or penetrating), burns, chemical irritants, frostbite, toxins, infection by pathogens, necrosis, immune reactions due to hypersensitivity, ionizing radiation, and foreign bodies, including splinters and dirt.

A large body of evidence underlines that inflammation is one of the manifestations of oxidative stress, and that oxidative stress (e.g., production of ROS) induces the mediators of inflammation (see, Reuter et al., 2010). Acute inflammatory response characterized by the recruitment of numerous inflammatory cells (see, Le Quéré, et al., 2014). The release of pro-inflammatory mediators leads to the promotion of ROS production and the activation of redox-sensitive activation pathways. These molecular pathways driven by ROS play important roles in numerous skin alterations. This confirms the close association between oxidative stress and inflammation.

Wound healing is a particularly prevalent problem in the elderly patient population. According to the Wound Healing Society, about 15% of older adults suffer from chronic, hard-to-heal wounds (see, Stein J., 2000). In addition, around 18% of diabetic patients over the age of 65 years will have chronic, non-healing skin ulcers (see, Hess, C. T., 1999). A body of literature exists suggesting the topical application of epidermal growth factor as a promising therapy, and has been demonstrated to accelerate wound closure of acute wounds in patients (see, Brown et al., 1989; Goldman, R., 2004; and Fu X., et al., 2005). However, due to the high cost and other practical considerations, this strategy has not been commercially viable as a general solution for wound healing. So far, only platelet-derived growth factor has been approved by the Federal Drug Administration (FDA) for treatment of non-healing diabetic foot ulcers. However, this therapy is limiting and not always successful. For example, one difficulty associated with the topical application of growth factors is that the wound bed is often laden with proteolytic enzymes which tend to degrade and nullify the applied agent.

Current anti-inflammatory drug treatments, such as corticosteroids and non-steroidal anti-inflammatory drugs are not overly effective in managing inflammatory responses.

Superoxide dismutase (SOD) has a high capacity to remove free radicals, one of the main causes of many conditions and skin disorders. Due to its powerful antioxidant potential, SOD exhibits potent anti-inflammatory properties by inhibiting the expression of ROS-sensitive transcription factors (see, Le Quéré, et al., 2014). For this reason, although it was originally contemplated that SOD had significant potential as a therapeutic agent for the treatment of cutaneous wound healing and acne, however, the concept has never progressed. The lack of clinical development of SOD is due in part to the large size of SOD, in addition to its low cell permeability, short circulating half-life, antigenicity, a high manufacturing costs (see, McCord et al., 2005).

There is therefore a need to provide alternative treatment options for those suffering from conditions in which the ROS-mediated inflammation plays a role.

Advantageously the present invention may in at least some embodiments provide methods and formulations useful for the treatment of wounds.

The copper ion complexes of the present invention have previously been found to be effective in alleviation of pain (see International PCT Patent Publication No. WO 2016/201524, the entire contents of which is incorporated herein by reference). Advantageously, improvements in formulation of the copper ion complexes may allow the more effective treatment of pain or the use of lower dosage levels to achieve an effective alleviating effect.

SUMMARY OF THE INVENTION

In one aspect, the present invention provides a method of reducing an inflammatory response in a subject, the method comprising administering to the subject a composition comprising a copper ion complex or a mixture of copper ion complexes obtained by a process comprising:
(a) contacting copper having a specific surface area of from about 0.1 $m^2$/kg to about 2 $m^2$/kg, or in the form of particles having a bulk density of between about 0.2 and about 8.0 $g/cm^3$, with a chelating agent in solid form; and
(b) while the copper is in contact with the chelating agent, contacting the copper and chelating agent with an oxidising agent, to form the copper ion complex or mixture of copper ion complexes;

to thereby reduce the inflammatory response in the subject.

In another aspect, the present invention provides a method of treating a wound or enhancing wound healing in a subject, the method comprising administering to the subject a composition comprising a copper ion complex or a mixture of copper ion complexes obtained by a process comprising:
(a) contacting copper having a specific surface area of from about 0.1 $m^2$/kg to about 2 $m^2$/kg, or in the form of particles having a bulk density of between about 0.2 and about 8.0 $g/cm^3$, with a chelating agent in solid form; and
(b) while the copper is in contact with the chelating agent, contacting the copper and chelating agent with an oxidising agent, to form the copper ion complex or mixture of copper ion complexes;

to thereby treat the wound or enhance the wound healing in the subject.

In some embodiments, the wound is a delayed-healing wound, an incompletely healed wound, dehisced wound, chronic wound, venous ulcer, venous stasis ulcer, arterial ulcer, decubitus ulcer, diabetic ulcer, skin ulcer resulting from trauma, or skin ulcer resulting from a burn.

In some of the same embodiments and some other embodiments, the method reduces fibrosis in the subject.

In yet another aspect, the present invention provides a method of preventing or reducing DNA damage caused by radiation in a tissue of a subject, the method comprising administering to the subject a composition comprising a copper ion complex or a mixture of copper ion complexes obtained by a process comprising:
(a) contacting copper having a specific surface area of from about 0.1 $m^2$/kg to about 2 $m^2$/kg, or in the form of particles having a bulk density of between about 0.2 and about 8.0 $g/cm^3$, with a chelating agent in solid form; and
(b) while the copper is in contact with the chelating agent, contacting the copper and chelating agent with an oxidising agent, to form the copper ion complex or mixture of copper ion complexes;

to thereby treat the wound or enhance the wound healing in the subject.

to thereby reduce or prevent DNA damage in the tissue of the Subject.

In some embodiments, the radiation is ultraviolet (UV) radiation. Typically in embodiments of this type, the radiation is radiated from the Sun. In some alternative embodiments, however, the radiation may be gamma radiation.

In some of the same embodiments and other embodiments, the tissue is skin.

In still another aspect, the present invention provides a method of treating or preventing sunburn to the skin of a subject, the method comprising administering to the subject a composition comprising a copper ion complex or a mixture of copper ion complexes obtained by a process comprising:
(a) contacting copper having a specific surface area of from about 0.1 $m^2$/kg to about 2 $m^2$/kg, or in the form of particles having a bulk density of between about 0.2 and about 8.0 $g/cm^3$, with a chelating agent in solid form; and
(b) while the copper is in contact with the chelating agent, contacting the copper and chelating agent with an oxidising agent, to form the copper ion complex or mixture of copper ion complexes;

to thereby treat or prevent sunburn in the tissue of the subject.

Where the likelihood of sunburn is predetermined, it can be advantageous for the method to be performed as a preventative to sunburn, and administered to the subject prior to being exposed to the radiation. In some of the same embodiments, and other embodiments, the composition is administered to the subject after being exposed to the radiation.

In yet still another aspect, the present invention provides a method of treating a burn on the skin of a subject, the method comprising administering to the subject a composition comprising a copper ion complex or a mixture of copper ion complexes obtained by a process comprising: (a) contacting copper having a specific surface area of from about 0.1 $m^2$/kg to about 2 $m^2$/kg, or in the form of particles having a bulk density of between about 0.2 and about 8.0 $g/cm^3$, with a chelating agent in solid form; and
(b) while the copper is in contact with the chelating agent, contacting the copper and chelating agent with an oxidising agent, to form the copper ion complex or mixture of copper ion complexes;

to thereby treat the burn on the skin of the subject.

In some preferred embodiments, the composition is administered to the subject within one minute, two minutes, three minutes, four minutes, five minutes, or ten minutes of the burn to the subject. In some of the same embodiments and some other embodiments, the composition is administered a plurality of times in the first 60 minutes after the burn occurring to the subject. For example, the composition can be administered more than two times, more than three times, more than four times, and/or more than 5 times in the first 60 minutes after the burn occurs to the subject.

In some embodiments, the composition further comprises hyaluronic acid, a salt of a hyaluronic acid, or a mixture thereof.

Typically, the composition is formulated as a gel, a cream, a paste, a lotion, a spray, a suspension, a solution, a dispersion salve, a hydrogel or an ointment formulation.

In some preferred embodiments, the composition is topically administered to the subject.

In some embodiments, the composition is administered to the subject at least once, twice, three times, four time, or five times per day for at least three days after the burn occurs to the subject.

In some preferred embodiments, the chelating agent is ethylenediaminetetraacetic acid (EDTA), a salt of EDTA or a mixture thereof.

In some embodiments, the process further comprises a step (c) of allowing the combination of agents resulting from step (b) to react until completion.

In another aspect, the present invention provides a method of reducing an inflammatory response in a subject, the method comprising administering to the skin of the subject a composition comprising a copper ion complex or a mixture of copper ion complexes comprising copper coordinated to a ligand of Formula (I) or Formula (II) or Formula (VI)

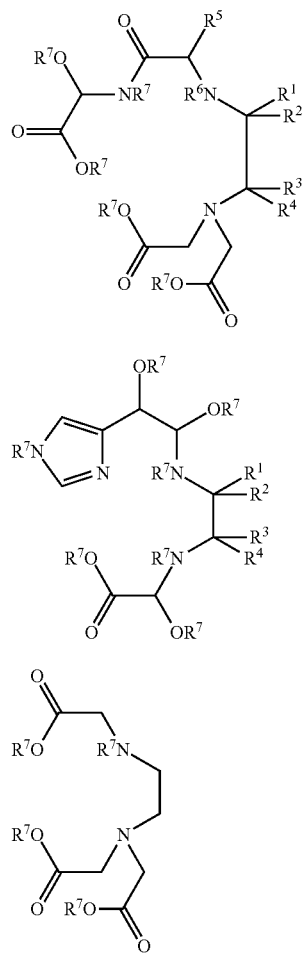

Formula (I)

Formula (II)

Formula (VI)

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
each $R^7$ is independently absent or H;
or a salt thereof, tautomer thereof or polymer thereof;
to thereby reduce the inflammatory response in the subject.

In yet another aspect, the present invention provides a method of treating a wound or enhancing wound healing in a subject, the method comprising administering to the skin of the subject a composition comprising a copper ion complex or a mixture of copper ion complexes comprising copper coordinated to a ligand of Formula (I) or Formula (II) or Formula (VI)

Formula (I)

Formula (II)

Formula (VI)

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$, and
each $R^7$ is independently absent or H;
or a salt thereof, tautomer thereof or polymer thereof;
to thereby treat the wound or enhance wound healing in the subject.

The compositions of the invention have particular utility in treating difficult to treat wounds, including but not limited to a delayed-healing wound, an incompletely healed wound, dehisced wound, chronic wound, venous ulcer, venous stasis ulcer, arterial ulcer, decubitus ulcer, diabetic ulcer, skin ulcer resulting from trauma, or skin ulcer resulting from a burn.

In some of the same embodiments and some other embodiments, the method reduced fibrosis in the subject.

In some of the same embodiments and some other embodiments, the composition inhibits or reduces the inflammatory response at the site of the wound.

In another aspect, the present invention provides a method of preventing or reducing DNA damage caused by radiation in a tissue of a subject, the method comprising administering to the skin of the subject a composition comprising a copper ion complex or a mixture of copper ion complexes comprising copper coordinated to a ligand of Formula (I) or Formula (II) or Formula (VI)

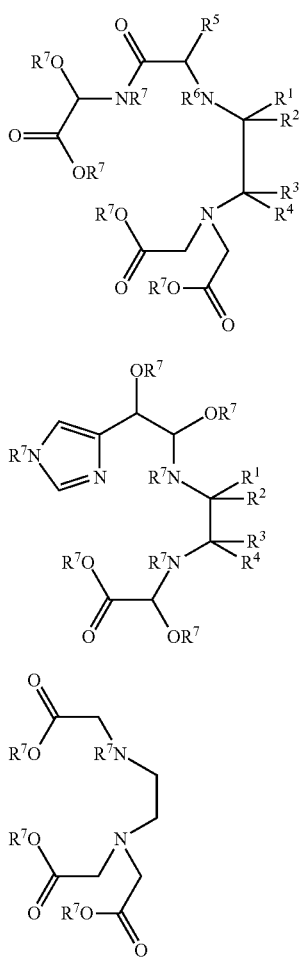

Formula (I)

Formula (II)

Formula (VI)

wherein
R$^1$ is H and R$^2$ is H or OH, or R$^1$ and R$^2$ together with the carbon atom to which they are attached form a carbonyl (C=O);
R$^3$ is H and R$^4$ is H or OH, or R$^3$ and R$^4$ together with the carbon atom to which they are attached form a carbonyl (C=O);
R$^5$ is —CH(OR$^7$)CH$_2$OR$^7$ or —CH$_2$CO$_2$R$^7$ and R$^6$ is absent or H, or R$^5$ is H and R$^6$ is —CH(OR$^7$)CH$_2$OR$^7$ or —CH$_2$CO$_2$R$^7$; and
each R$^7$ is independently absent or H;
or a salt thereof, tautomer thereof or polymer thereof;
to thereby prevent or reduce the damage in the subject.

In yet another aspect, the present invention provides a method of treating or preventing sunburn on the skin of a subject, the method comprising administering to the skin of the subject a composition comprising a copper ion complex or a mixture of copper ion complexes comprising copper coordinated to a ligand of Formula (I) or Formula (II) or Formula (VI)

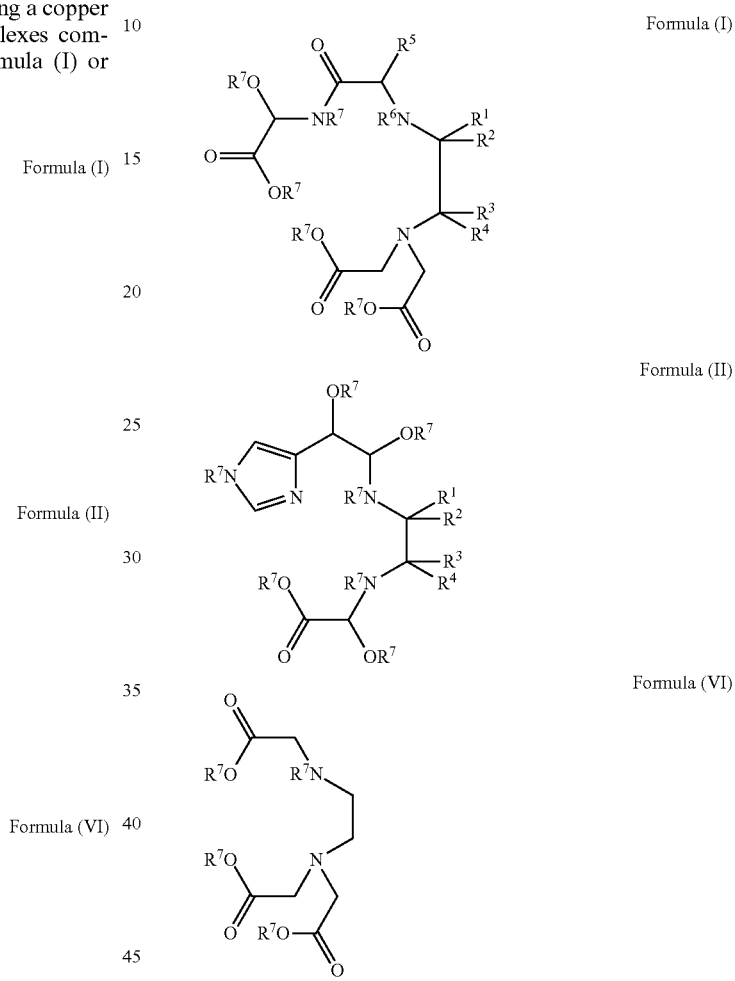

Formula (I)

Formula (II)

Formula (VI)

wherein
R$^1$ is H and R$^2$ is H or OH, or R$^1$ and R$^2$ together with the carbon atom to which they are attached form a carbonyl (C=O);
R$^3$ is H and R$^4$ is H or OH, or R$^3$ and R$^4$ together with the carbon atom to which they are attached form a carbonyl (C=O);
R$^5$ is —CH(OR$^7$)CH$_2$OR$^7$ or —CH$_2$CO$_2$R$^7$ and R$^6$ is absent or H, or R$^5$ is H and R$^6$ is —CH(OR$^7$)CH$_2$OR$^7$ or —CH$_2$CO$_2$R$^7$; and
each R$^7$ is independently absent or H;
or a salt thereof, tautomer thereof or polymer thereof;
to thereby prevent or reduce the sunburn in the subject.

When the exposure to radiation is predetermined, it may be advantageous for the composition to be administered to the subject prior to being exposed to the radiation. In embodiments of this type, the composition can be administered to the subject at least one minute, two minutes, three minutes, four minutes, five minutes or ten minutes prior to being exposed to the radiation.

Alternatively or in addition, the composition can be administered to the subject after being exposed to the radiation.

In still yet another aspect, the present invention provides a method of treating a burn on the skin of a subject, the method comprising administering to the skin of the subject a composition comprising a copper ion complex or a mixture of copper ion complexes comprising copper coordinated to a ligand of Formula (I) or Formula (II) or Formula (VI)

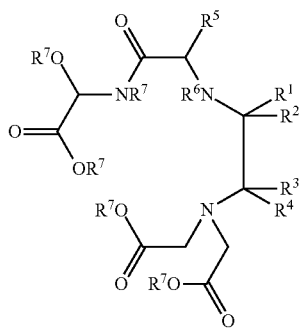

Formula (I)

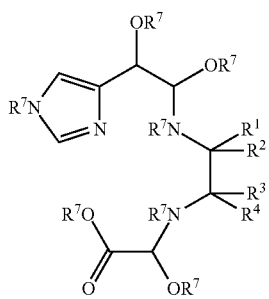

Formula (II)

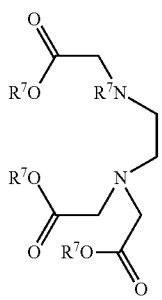

Formula (VI)

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
each $R^7$ is independently absent or H;
or a salt thereof, tautomer thereof or polymer thereof; to thereby treat the burn on the subject.

In some embodiments, the composition further comprises hyaluronic acid, a salt of a hyaluronic acid or a mixture thereof.

Typically, the composition is formulated as a gel, a cream, a paste, a lotion, a spray, a suspension, a solution, a dispersion salve, a hydrogel or an ointment formulation.

In some preferred embodiments, the composition is topically administered to the subject.

In some embodiments, the composition is administered to the subject once, twice, three times, four times, or five times per day in the three days following the burn occurring on the subject (unless all symptoms are alleviated prior).

In yet another aspect, the present invention provides a use of a composition comprising a copper ion complex or a mixture of copper ion complexes obtained by a process comprising:
(a) contacting copper having a specific surface area of from about 0.1 m$^2$/kg to about 2 m$^2$/kg, or in the form of particles having a bulk density of between about 0.2 and about 8.0 g/cm$^3$, with a chelating agent in solid form; and
(b) while the copper is in contact with the chelating agent, contacting the copper and chelating agent with an oxidising agent, to form the copper ion complex or mixture of copper ion complexes;
in the manufacture of a medicament to reduce an inflammatory response in a subject.

In yet another aspect, the present invention provides a use of a composition comprising a copper ion complex or a mixture of copper ion complexes obtained by a process comprising:
(a) contacting copper having a specific surface area of from about 0.1 m$^2$/kg to about 2 m$^2$/kg, or in the form of particles having a bulk density of between about 0.2 and about 8.0 g/cm$^3$, with a chelating agent in solid form; and
(b) while the copper is in contact with the chelating agent, contacting the copper and chelating agent with an oxidising agent, to form the copper ion complex or mixture of copper ion complexes;
in the manufacture of a medicament to promote or otherwise enhance wound healing in a subject.

In yet another aspect, the present invention provides a use of a composition comprising a copper ion complex or a mixture of copper ion complexes comprising copper coordinated to a ligand of Formula (I) or Formula (II) or Formula (VI)

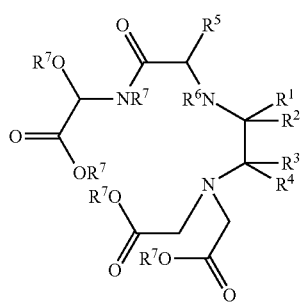

Formula (I)

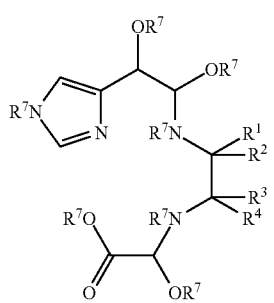

Formula (II)

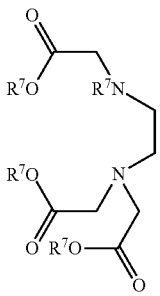

Formula (VI)

wherein
R¹ is H and R² is H or OH, or R¹ and R² together with the carbon atom to which they are attached form a carbonyl (C=O);
R³ is H and R⁴ is H or OH, or R³ and R⁴ together with the carbon atom to which they are attached form a carbonyl (C=O);
R⁵ is —CH(OR⁷)CH₂OR⁷ or —CH₂CO₂R⁷ and R⁶ is absent or H, or R⁵ is H and R⁶ is —CH(OR⁷)CH₂OR⁷ or —CH₂CO₂R⁷; and
each R⁷ is independently absent or H;
or a salt thereof, tautomer thereof or polymer thereof;
in the manufacture of a medicament to promote or otherwise enhance wound healing in a subject.

In some embodiments, the composition further comprises hyaluronic acid, a salt of a hyaluronic acid or a mixture thereof.

In another aspect, the present invention provides a cosmetic composition suitable for reducing skin damage from ultraviolet radiation, the composition comprising: at a rate of about 5 mg/cm² of skin a copper ion complex or a mixture of copper ion complexes comprising copper coordinated to a ligand of Formula (I) or Formula (II) or Formula (VI)

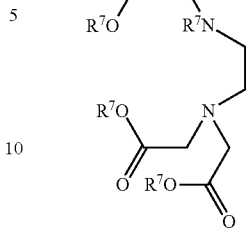

Formula (VI)

wherein
R¹ is H and R² is H or OH, or R¹ and R² together with the carbon atom to which they are attached form a carbonyl (C=O);
R³ is H and R⁴ is H or OH, or R³ and R⁴ together with the carbon atom to which they are attached form a carbonyl (C=O);
R⁵ is —CH(OR⁷)CH₂OR⁷ or —CH₂CO₂R⁷ and R⁶ is absent or H, or R⁵ is H and R⁶ is —CH(OR⁷)CH₂OR⁷ or —CH₂CO₂R⁷; and
each R⁷ is independently absent or H;
or a salt thereof, tautomer thereof or polymer thereof; and an organic chemical compound that absorbs UV light; an inorganic particulate that reflects, scatters, and/or absorbs UV light (such as titanium dioxide and zinc oxide); and/or an organic particulate that significantly absorb UV radiation, and contain multiple chromophores that reflect and scatter a fraction of radiation like inorganic particulates.

In some embodiments, the composition further comprises hyaluronic acid, a salt of a hyaluronic acid or a mixture thereof.

In yet another aspect, the present invention provides a wound healing matrix for treating a subject, the matrix comprising (i) a solid substrate; and (ii) a copper ion complex or mixture of copper ion complexes comprising copper coordinated to a ligand of Formula (I) or Formula (II) or Formula (VI).

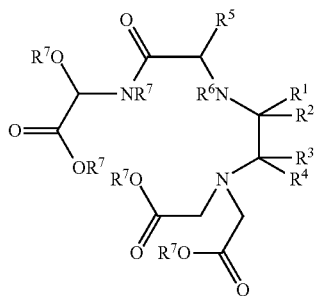

Formula (I)

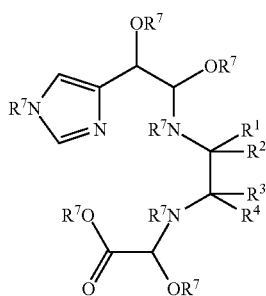

Formula (II)

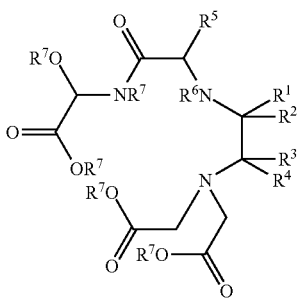

Formula (I)

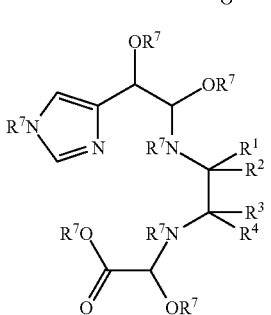

Formula (II)

-continued

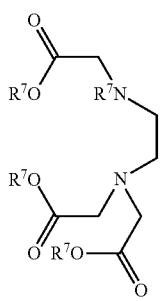

Formula (VI)

wherein $R^1$ is H and $R^2$ is H or OH, or $R^1$ and $R^2$ together with the carbon atom to which they are attached form a carbonyl (C=O);

$R^3$ is H and $R^4$ is H or OH, or $R^3$ and $R^4$ together with the carbon atom to which they are attached form a carbonyl (C=O);

$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and each $R^7$ is independently absent or H;

or a salt thereof, tautomer thereof or polymer thereof.

In still yet another aspect, the present invention provides a wound dressing or bandage comprising the wound healing matrix as described above or elsewhere herein. In some embodiments, the wound dressing or bandage further comprises hyaluronic acid, a salt of a hyaluronic acid or a mixture thereof.

In yet another aspect, the present invention provides a method of reducing free radical induced damage in a tissue of a subject, the method comprising the step of contacting the tissue with an effective amount of a copper ion complex or mixture of copper ion complexes copper ion complexes obtained by a process comprising:

(a) contacting copper having a specific surface area of from about 0.1 m²/kg to about 2 m²/kg, or in the form of particles having a bulk density of between about 0.2 and about 8.0 g/cm³, with a chelating agent in solid form; and (b) while the copper is in contact with the chelating agent, contacting the copper and chelating agent with an oxidising agent, to form the copper ion complex or mixture of copper ion complexes;

to thereby reduce free radical induced damage in the tissue of the subject.

In still yet another aspect, the present invention provides a method of reducing free radical induced damage in a tissue in a subject, the method comprising the step of contacting the tissue with an effective amount of a copper ion complex or a mixture of copper ion complexes comprising copper coordinated to a ligand of Formula (I) or Formula (II) or Formula (VI)

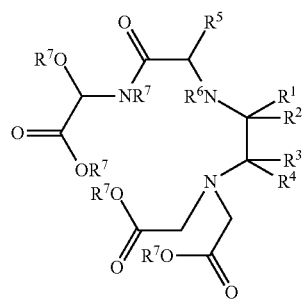

Formula (I)

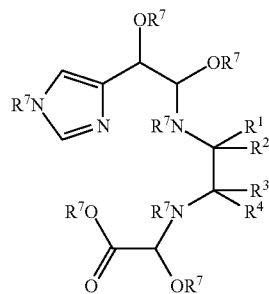

Formula (II)

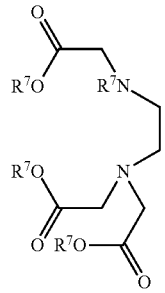

Formula (VI)

wherein $R^1$ is H and $R^2$ is H or OH, or $R^1$ and $R^2$ together with the carbon atom to which they are attached form a carbonyl (C=O);

$R^3$ is H and $R^4$ is H or OH, or $R^3$ and $R^4$ together with the carbon atom to which they are attached form a carbonyl (C=O);

$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and each $R^7$ is independently absent or H;

or a salt thereof, tautomer thereof or polymer thereof;

to thereby reduce the free radical induced injury.

In some embodiments, the free radical induced injury is caused by a stimulus selected from the group comprising: photic, radiation, heat, and chemical.

In some preferred embodiments, the tissue is skin.

In yet another aspect, the present invention provides a method of treating or preventing an inflammatory skin condition in a subject, the method comprising the step of administering to the subject an effective amount of a copper ion complex or mixture of copper ion complexes obtained by a process comprising:

(a) contacting copper having a specific surface area of from about 0.1 m²/kg to about 2 m²/kg, or in the form of particles having a bulk density of between about 0.2 and about 8.0 g/cm³, with a chelating agent in solid form; and (b) while the copper is in contact with the chelating agent, contacting the copper and chelating agent with an oxidising agent, to form the copper ion complex or mixture of copper ion complexes;

to thereby treat or prevent the inflammatory skin condition tissue in the subject.

In yet another aspect, the present invention provides a method of treating or preventing an inflammatory skin condition in a subject, the method comprising the step of contacting the tissue with an effective amount of a copper ion complex or a mixture of copper ion complexes comprising copper coordinated to a ligand of Formula (I) or Formula (II) or Formula (VI)

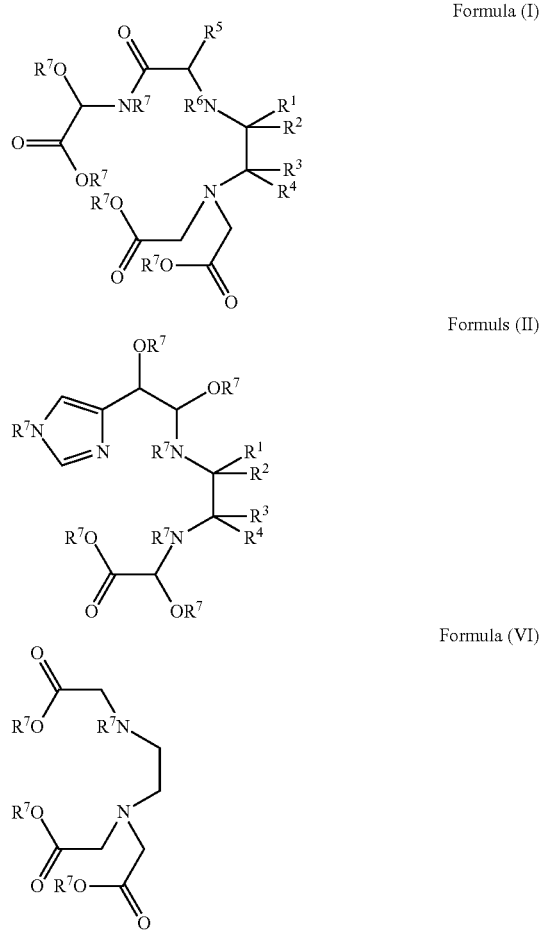

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and each $R^7$ is independently absent or H;

or a salt thereof, tautomer thereof or polymer thereof;

to thereby treat or prevent the inflammatory skin condition in the subject.

Typically, the inflammatory skin condition includes but is not limited to psoriasis, hyperkeratosis, photo-aging, ulcers (cutaneous, decubitus, venous stasis), venous dermatitis, allergy (e.g., poison ivy allergy), skin rashes, and insect bites.

DESCRIPTION OF THE FIGURES

An example of the present invention will now be described with reference to the accompanying drawings, in which.

DETAILED DESCRIPTION OF THE INVENTION

Figure 1:
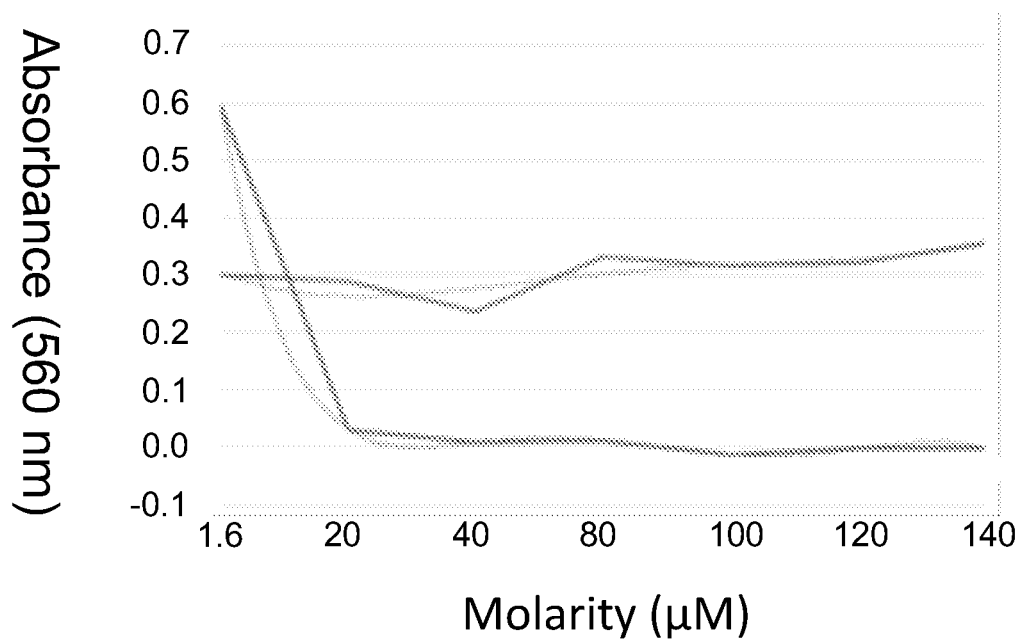
FIG. 1 is a graphical representation of a comparison between the copper ion complexes described herein and SOD, in their ability to scavenge free radicals in vitro, through measuring UV absorbance of the reactions. Blue line—SOD; red line—copper ion complexes. The dashed lines illustrate the smoothed trace.

The following description of the embodiments of the invention is not intended to limit the invention to these embodiments, but rather to enable any person skilled in the art to make and use this invention.

1. Definitions

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e., to at least one) of the grammatical object of the article. By way of example, "a sample" means one sample or more than one sample.

The use of numerical values in the various ranges specified in this application, unless expressly indicated otherwise, are stated as approximations as though the minimum and maximum values within the stated ranges were both preceded by the word "about." In this manner, slight variations above and below the stated ranges (e.g., less than or equal to 10%, 9%, 8%, 7%, 6%, 5%, 4%, 3%, 2%, 1%) can be used to achieve substantially the same results as values within the ranges. Also, the disclosure of these ranges is intended as a continuous range including every value between the minimum and maximum values. In embodiments in which the stated range defines the position of an amino acid residue, for example, at the beginning or end of a domain, the present invention encompasses the defined position as well as slight variations (e.g., 1, 2, 3, 4, 5, 6, 7, 8, 9, 10, 11, 12, 13, 14, 15, 16, 17, 18, 19 or 20 amino acids) upstream or downstream of that position.

The terms "administration concurrently," "administering concurrently" or "co-administering" and the like refer to the administration of a single composition containing two or more actives, or the administration of each active as separate compositions and and/or delivered by separate routes either contemporaneously or simultaneously or sequentially within a short enough period of time that the effective result is equivalent to that obtained when all such actives are administered as a single composition. By "simultaneously" is meant that the active agents are administered at substantially the same time, and desirably together in the same formulation. By "contemporaneously" it is meant that the active agents are administered closely in time e.g., one agent is administered within from about one minute to within about one day before or after another. Any contemporaneous time is useful. However, it will often be the case that when not administered simultaneously, the agents will be administered within about one minute to within about eight hours and preferably within less than about one to about four hours. When administered contemporaneously, the agents are suitably administered at the same site on the subject, or at different sites on the subject (for example, administration to both left arm and right arm). The term "same site" includes the exact location, but can be within about 0.5 to about 15 centimeters, preferable from within about 0.5 to about 5 centimeters. The term "separately" as used herein means that the agents are administered at an interval, for example at an interval of about a day to several weeks or months. The active agents may be administered in either order. The term "sequentially" as used herein means that the agents are administered in sequence, for example at an interval or intervals of minutes, hours, days or weeks. If appropriate the active agents may be administered in a regular repeating cycle.

The term "about," as used herein when referring to a measurable value such as an amount, dose, time, temperature, activity, level, number, frequency, percentage, dimension, size, amount, weight, position, length and the like, is meant to encompass variations of ±20%, ±10%, 5%, 1%, +05%, or even ±0.1% of the specified amount, dose, time, temperature, activity, level, number, frequency, percentage, dimension, size, amount, weight, position, length and the like.

The term "agent" refers to any compound or substance, or mixture of compounds or substances, which induces a desired pharmacological and/or physiological effect. The term also encompasses pharmaceutically acceptable and pharmacologically active ingredients of those compounds specifically mentioned herein including but not limited to salts, esters, amides, prodrugs, active metabolites, analogs and the like. When the above term is used, then it is to be understood that this includes the active agent per se as well as pharmaceutically acceptable, pharmacologically active salts, esters, amides, prodrugs, metabolites, analogs, etc. The term "agent" is not to be construed narrowly but extends to small molecules, proteinaceous molecules such as peptides, polypeptides and proteins as well as compositions comprising them and genetic molecules such as RNA, DNA and mimetics and chemical analogs thereof as well as cellular agents. The term "agent" includes a cell that is capable of producing and secreting a polypeptide referred to herein as well as a polynucleotide comprising a nucleotide sequence that encodes that polypeptide. Thus, the term "agent" extends to nucleic acid constructs including vectors such as viral or non-viral vectors, expression vectors and plasmids for expression in and secretion in a range of cells.

As used herein, "and/or" refers to and encompasses any and all possible combinations of one or more of the associated listed items, as well as the lack of combinations when interpreted in the alternative (or).

It will be understood that the term "between" when used in reference to a range of numerical values encompasses the numerical values at each endpoint of the range. For example, a composition comprising between 30 µg and about 1000 µg of synthetic peptide is inclusive of a composition comprising 30 µg of synthetic peptide and a composition comprising 1000 µg of synthetic peptide.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Throughout this specification, unless the context requires otherwise, the words "comprise," "comprises," and "comprising" will be understood to imply the inclusion of a stated step or element or group of steps or elements but not the exclusion of any other step or element or group of steps or elements. Thus, use of the term "comprising" and the like indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

By "effective amount," in the context of modulating an inflammatory response or treating a disease or condition, is meant the administration of that amount of composition to an individual in need thereof, either in a single dose or as part of a series that is effective for achieving that modulation, treatment, or prevention. The effective amount will vary depending upon the health and physical condition of the individual to be treated, the taxonomic group of individual to be treated, the formulation of the composition, the assessment of the medical situation, and other relevant factors. It is expected that the amount will fall in a relatively broad range that can be determined through routine trials.

Throughout this specification, unless the context requires otherwise, the words "include," "includes," and "including" will be understood to imply the inclusion of a stated step or element or group of steps or elements by not the exclusion of any other step or element or group of steps or elements.

The terms "isolated" and "purified," as used herein, refer to a material that is substantially or essentially removed from or concentrated in its natural environment and substantially free of contaminants that interfere with the function or activity of the material. For example, an isolated antigen-binding material is separated from other antigen-binding materials that bind to other antigens, and free from other biological materials (e.g., other nucleic acids, proteins, lipids, cellular components) with which it is naturally associated.

As used herein, the term "mammal" refers to any mammal including without limitation, humans and other primates, including non-human primates such as chimpanzees and other apes and monkey species; farm animals such as cattle, sheep, pigs, goats and horses; domestic mammals such as dogs and cats; and laboratory animals including rodents such as mice, rats guinea pigs. The term does not denote a particular age. Thus, both adult and newborn individuals are intended to be co at a rate of about 5 mg/cm$^2$ of skin veered.

By "modulating" is meant increasing or decreasing (reducing), either directly or indirectly, an activity of a subject. In certain embodiments, "modulation" or "modulating" means that a desired/selected activity (e.g., a tolerogenic or anergic response) is more efficient (e.g., at least 10%, 20%, 30%, 40%, 50%, 60% or more), more rapid (e.g., at least 10%, 20%, 30%, 40%, 50%, 60% or more), greater in magnitude at least 10%, 20%, 30%, 40%, 50%, 60% or more), and/or more easily induced at least 10%, 20%, 30%, 40%, 50%, 60% or more) than in the absence of the modulating polypeptide.

The terms "patient," "subject," "host," or "individual" used interchangeably herein, refer to any subject, particularly a vertebrate subject, and even more particularly a mammalian subject, for whom therapy or prophylaxis is desired. Suitable vertebrate animals that fall within the scope of the invention include, but are not restricted to, any member of the subphylumn Chordata including primates (e.g., humans, monkeys, and apes, and includes species of monkeys such as from the genus *Macaca* (e.g., cynomologus monkeys such as *Macaca fascicularis*, and/or rhesus monkeys (*Macaca mulatta*) and baboon (*Papio ursinus*), as Nell as marmosets (species from the genus Callithrix), squirrel monkeys (species from the genus *Saimiri*) and tamarins (species from the genus *Saguinus*), as well as species of apes such as chimpanzees (*Pan troglodytes*), rodents (e.g., mice, rats, guinea pigs), lagomorphs (e.g., rabbits, hares), bovines (e.g., cattle), ovines (e.g., sheep), caprines (e.g., goats), porcines (e.g., pigs), equines (e.g., horses), canines (e.g., dogs), felines (e.g., cats), avians (e.g., chickens, turkeys, ducks, geese, companion birds such as canaries, budgerigars, etc.), marine mammals (e.g., dolphins, whales), reptiles (e.g., snakes, frogs, lizards, etc.), and fish. A preferred subject is a human.

By "pharmaceutically acceptable carrier" is meant a solid or liquid filled, diluent, or encapsulating substance that may be safely used in topical or systemic administration.

As used herein, the terms "prevent," "prevented," or "preventing," refer to a prophylactic treatment which increases the resistance of a subject to developing the disease or condition or, in other words, decreases the likelihood that the subject will develop the disease or condition as well as a treatment after the disease or condition has begun in order to reduce or eliminate it altogether or prevent it from becoming worse. These terms also include within their scope preventing the disease or condition from occurring in a subject which may be predisposed to the disease or condition but has not yet been diagnosed as having it.

As used herein a "small molecule" refers to a composition that has a molecular weight of less than 3 kilodaltons (kDa), and typically less than 1.5 kilodaltons, and more preferably less than about 1 kilodalton. Small molecules may be nucleic acids, peptides, polypeptides, peptidomimetics, carbohydrates, lipids or other organic (carbon-containing) or inorganic molecules. As those skilled in the art will appreciate, based on the present description, extensive libraries of chemical and/or biological mixtures, often fungal, bacterial, or algal extracts, may be screened with any of the assays of the invention to identify compounds that modulate a bioactivity. A "small organic molecule" is an organic compound (or organic compound complexed with an inorganic compound (e.g., metal)) that has a molecular weight of less than 3 kilodaltons, less than 1.5 kilodaltons, or even less than about 1 kDa.

The term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

As used herein, the terms "treatment," "treating," and the like, refer to administering an agent, or carrying out a procedure (e.g., radiation, a surgical procedure, etc.) to obtain a desired pharmacologic and/or physiologic effect. The effect may be prophylactic in terms of completely or partially preventing a disease or symptom thereof and/or may be therapeutic in terms of effecting a partial or complete cure for a disease and/or symptoms of the disease. The effect may be therapeutic in terms of a partial or complete cure for a disease or condition (e.g., chronic wond healing) and/or adverse effect attributable to the disease or condition. These terms also cover any treatment of a condition or disease in a mammal, particularly in a human, and include: (a) preventing the disease or a symptom of a disease from occurring in a subject which may be predisposed to the disease but has not yet been diagnosed as having it (e.g., including diseases that may be associated with or caused by a primary disease; (b) inhibiting the disease, i.e., arresting its development; (c) relieving the disease, i.e., causing regression of the disease; (d) reducing the severity of a symptom of the disease and/or (e) reducing the frequency of a symptom of the disease or condition.

As used herein, the term "wound" includes an injury to any tissue, including for example, delayed or difficult to heal wounds, and chronic wounds. Examples of wounds may include both open and closed wounds. The term "wound" may also include for example, injuries to the skin and subcutaneous tissue initiated in different ways (e.g., pressure sores from extended bed rest and wounds induced by trauma) and with varying characteristics. Wounds may be classified into one of four grades depending on the depth of the wound: i) Grade I wounds limited to the epithelium; ii) Grade II wounds extending into the dermis; iii) Grade III wounds extending into the subcutaneous tissue; and iv) Grade IV (or full-thickness wounds) wounds wherein bones are exposed (e.g., a bony pressure point such as the greater trochanter or the sacrum).

The term "wound dressing" refers to a dressing for topical application to a wound and excludes compositions suitable for systemic administration. For example, the compositions comprising copper ion complex or mixture of copper ion complexes as described herein may be dispersed in or on a solid sheet of wound contacting material such as a woven or nonwoven textile material, or may be dispersed in a layer of foam such as polyurethane foam, or in a hydrogel such as a polyurethane hydrogel, a polyacrylate hydrogel, gelatin, carboxymethyl cellulose, pectin, alginate, and/or hyaluronic acid hydrogel, for example in a gel or ointment. In certain embodiments the compositions are dispersed in or on a biodegradable sheet material that provides sustained release of the active ingredients into the wound, for example a sheet of freeze-dried collagen, freeze-dried collagen/alginate mixtures (available under the Registered Trade Mark FIBRACOL from Johnson & Johnson Medical Limited) or freeze-dried collagen/oxidized regenerated cellulose (available under the Registered Trade Mark PROMOGRAN from Johnson & Johnson Medical Limited).

As used herein, "wound promoting matrix" includes for example, synthetic or naturally occurring matrices such as collagen, acellular matrix, crosslinked biological scaffold molecules, tissue based bioengineered structural framework, biomanufactured bioprostheses, and other implanted structures such as for example, vascular grafts suitable for cell infiltration and proliferation useful in the promotion of wound healing. Additional suitable biomatrix material may include chemically modified collagenous tissue to reduces antigenicity and immunogenicity. Other suitable examples include collagen sheets for wound dressings, antigen-free or antigen reduced acellular matrix (Wilson G. J. et al. (1990) Trans. Am. Soc. Artif. Intern. 36:340-343) or other biomatrix which have been engineered to reduce the antigenic response to the xenograft material. Other matrices useful in promotion of wound healing may include for example, processed bovine pericardium proteins comprising insoluble collagen and elastin (Courtman D. W. et al. (1994) J. Biomed. Mater. Res. 28:655-666) and other acellular tissue which may be useful for providing a natural microenvironment for host cell migration to accelerate tissue regeneration (Malone J. M. et al. (1984) J. Vasc. Surg. 1:181-91).

Each embodiment described herein is to be applied mutatis mutandis to each and every embodiment unless specifically stated otherwise.

2. Copper Ion Complexes

The present invention is based in part on the surprising finding that the copper ion complexes described have significant free radical scavenging activity. The present inventor also determined that when the copper ion complexes described herein are administered to animals, they are surprisingly effective at preventing or blocking an inflammatory response in the animal. The present inventor thus considers that these complexes will be useful in treating or preventing inflammatory diseases and/or conditions in animals, amongst other uses.

The copper ion complexes suitable for using in the methods of the present invention are obtained by a process comprising:
(a) contacting copper having a specific surface area of from about 0.1 $m^2$/kg to about 2 $m^2$/kg, or in the form of particles having a bulk density of between about 0.2 and about 8.0 g/cm³, with a chelating agent in solid form; and (b) while the copper is in contact with the chelating agent, contacting the copper and chelating agent with an oxidising agent, to form the copper ion complex or mixture of copper ion complexes.

In this process, the copper has a specific surface area of from about 0.1 m²/kg to about 2 m²/kg, or is in the form of particles having a bulk density of between about 0.2 and about 8.0 g/cm³. As a person skilled in the art will appreciate, although an exact relationship between these measurements may not exist, the specific surface area and the bulk density are both measures related to the available surface area of the copper. It may, in some circumstances, be convenient to refer to the specific surface area of the copper rather than the bulk density. In other circumstances, it may be convenient to refer to the bulk density of the copper rather than the specific surface area.

The specific surface area is a property of solid materials and is defined as the surface area of the material per unit of mass or volume. It will be noted that a person skilled in the art will be able to interconvert units of m²/kg and m²/m³ using the density of the solid material. The specific surface area may be determined theoretically (e.g., calculating the surface area of a material mathematically using the shape and the density/weight (or assumptions regarding the shape and/or the density/weight), for example calculating the surface area of wire mathematically from the diameter and length(s) of the wire and using the density or weight of the wire) or by experimental methods known to those skilled in the art. Copper may also be supplied with a known or reported specific surface area.

In the process of the present disclosure, copper having a specific surface area of from about 0.1 m²/kg to about 2 m²/kg may be used. In some embodiments, the copper has a specific surface area of from about 0.2 m²/kg to about 1.8 m²/kg, for example, from about 0.3 m²/kg to about 1.5 m²/kg, from about 0.5 m²/kg to about 1.5 m²/kg, from about 1 m²/kg to about 1.5 m²/kg, from about 0.7 m²/kg to about 1.3 m²/kg, from about 0.8 m²/kg to about 1.2 m²/kg, from about 0.9 m²/kg to about 1.1 m²/kg or about 1 m²/kg, especially from about 0.5 m²/kg to about 1.5 m²/kg. In some embodiments, it may be beneficial to heat the reaction to encourage the reaction to go to completion, particularly when using copper having a lower specific surface area (e.g., from about 0.1 m²/kg to about 0.3 m²/kg).

In the process of the present disclosure, the copper having a specific surface area of from about 0.1 m²/kg to about 2 m²/kg may be in the form of particles, for example, copper turnings, wire, ribbon, granules, powder, a solid bar having any shape, or any other suitable particulate form.

Bulk density is a property of particles (e.g., powders, granules, and other "divided" solids or particulate matter). It is the mass of the particles of the material divided by the total volume they occupy. The total volume includes particle volume, inter-particle void volume, and internal pore volume. The bulk density of the copper particles may be determined by, for example, adding 100 g of the copper particles to a 200 mL measuring cylinder (graduated cylinder). The initial volume measured in the measuring cylinder is the "freshly settled" volume. The measuring cylinder is then picked up and dropped 3 times from a height of 2 cm onto a solid surface. The volume measured in the measuring cylinder at this stage is the "tapped" volume. The bulk density is thus determined by the formula:

$$\text{bulk density (in g/mL or g/cm}^3\text{)} = \frac{100}{\text{measured volume (in mL or cm}^3\text{)}}$$

As used herein, all references to the bulk density of copper particles refer to the "tapped" bulk density, as determined by the procedure described above unless expressly stated otherwise.

In the process of the present disclosure, copper in the form of particles having a bulk density of between about 0.2 and about 8.0 g/cm³ may be used. In some embodiments, the copper has a bulk density of between about 0.3 and about 4.0 g/cm³, for example, between about 0.5 and about 3.0 g/cm³, between about 0.5 and about 2.5 g/cm³, between about 0.7 and about 2.0 g/cm³, between about 0.8 and about 1.7 g/cm³ or between about 0.9 and about 1.5 g/cm³.

In the process of the present disclosure, the copper in the form of particles having a bulk density of between about 0.2 and about 8.0 g/cm³ may, for example, be in the form of copper turnings, wire, ribbon, granules, powder, a solid bar having any shape, or any other suitable particulate form.

In some embodiments, the copper has a specific surface area of from about 0.1 m²/kg to about 2 m²/kg and is also in the form of particles having a bulk density of from about 0.2 to about 8.0 g/cm³.

In some embodiments, the copper may have an oxide (or other) layer, or develop an oxide (or other) layer prior to being used in the process. In these embodiments, the term "contacting the copper" is taken to apply to contacting the bulk copper (i.e., the copper including any oxide (or other) layer) with the appropriate agent. This may occur by contacting the oxide (or other) layer exclusively, or contacting the oxide (or other) layer and the elemental copper simultaneously (both the elemental copper and layer at the same time). The process of the present disclosure embraces both of these alternatives, so long as the copper is able to react with the other agents. In some embodiments the copper may be pre-treated prior to the process in order to remove or reduce an oxide (or other) layer on the copper.

In some embodiments, the copper used in the process is in the form of an alloy comprising copper and one or more other metals (for example, an alloy with one or more other metals selected from zinc, tin, aluminium, silicon, nickel, iron, manganese, lead, silver, gold). In some embodiments, the alloy comprises more than about 20% by weight copper (e.g., more than about 50%, more than about 60%, more than about 70%, more than about 80%, more than about 90%, more than about 95%, more than about 97%, more than about 98%, more than about 99%, more than about 99.5%, more than about 99.9% or more than about 99.99%).

The process of making the copper ion complexes comprises a step (a) of contacting copper (having a specific surface area of from about 0.1 m²/kg to about 2 m²/kg or in the form of particles having a bulk density of between about 0.2 and about 8.0 g/cm³) with a chelating agent in solid form.

Bulk density is a property of particles (e.g., powders, granules, and other "divided" solids or particulate matter). It is the mass of the particles of the material divided by the total volume they occupy. The total volume includes particle volume, inter-particle void volume, and internal pore volume. The bulk density of the copper particles may be determined by, for example, adding 100 g of the copper particles to a 200 mL measuring cylinder (graduated cylinder). The initial volume measured in the measuring cylinder is the "freshly settled" volume. The measuring cylinder is then picked up and dropped 3 times from a height of 2 cm onto a solid surface. The volume measured in the measuring cylinder at this stage is the "tapped" volume. The bulk density is thus determined by the formula:

$$\text{bulk density (in g/mL or g/cm}^3) = \frac{100}{\text{measured volume (in mL or cm}^3)}$$

As used herein, all references to the bulk density of copper particles refer to the "tapped" bulk density, as determined by the procedure described above unless expressly stated otherwise.

In the process of the present disclosure, copper in the form of particles having a bulk density of between about 0.2 and about 8.0 g/cm$^3$ may be used. In some embodiments, the copper has a bulk density of between about 0.3 and about 4.0 g/cm$^3$, for example, between about 0.5 and about 3.0 g/cm$^3$, between about 0.5 and about 2.5 g/cm$^3$, between about 0.7 and about 2.0 g/cm$^3$, between about 0.8 and about 1.7 g/cm$^3$ or between about 0.9 and about 1.5 g/cm$^3$.

In the process of the present disclosure, the copper in the form of particles having a bulk density of between about 0.2 and about 8.0 g/cm$^3$ may, for example, be in the form of copper turnings, wire, ribbon, granules, powder, a solid bar having any shape, or any other suitable particulate form.

In some embodiments, the copper has a specific surface area of from about 0.1 m$^2$/kg to about 2 m$^2$/kg and is also in the form of particles having a bulk density of from about 0.2 to about 8.0 g/cm$^3$.

In some embodiments, the copper may have an oxide (or other) layer, or develop an oxide (or other) layer prior to being used in the process. In these embodiments, the term "contacting the copper" is taken to apply to contacting the bulk copper (i.e., the copper including any oxide (or other) layer with the appropriate agent. This may occur by contacting the oxide (or other) layer exclusively, or contacting the oxide (or other) layer and the elemental copper simultaneously (both the elemental copper and layer at the same time). The process of the present disclosure embraces both of these alternatives, so long as the copper is able to react with the other agents. In some embodiments the copper may be pre-treated prior to the process in order to remove or reduce an oxide (or other) layer on the copper.

In some embodiments, the copper used in the process is in the form of an alloy comprising copper and one or more other metals (for example, an alloy with one or more other metals selected from zinc, tin, aluminium, silicon, nickel, iron, manganese, lead, silver, gold). In some embodiments, the alloy comprises more than about 20% by weight copper (e.g., more than about 50%, more than about 60%, more than about 70%, more than about 80%, more than about 90%, more than about 95%, more than about 97%, more than about 98%, more than about 99%, more than about 99.5%, more than about 99.9% or more than about 99.99%).

The process of the present disclosure comprises a step (a) of contacting copper (having a specific surface area of from about 0.1 m$^2$/kg to about 2 m$^2$/kg or in the form of particles having a bulk density of between about 0.2 and about 8.0 g/cm$^3$) with a chelating agent in solid form.

The chelating agent is in solid form in step (a) of the process. In this context, "solid form" refers to the chelating agent being a solid. Typically, the chelating agent is in the form of a granulated or powdered solid. At least a portion of the chelating agent is in solid form when contacting the copper and when the copper and chelating agent is first contacted with the oxidising agent. Without wishing to be bound by theory, it is believed that the copper being in contact with the chelating agent in solid form when the copper and the chelating agent is contacted with the oxidising agent leads to a concentration gradient being established between the copper and the chelating agent in the resultant reaction mixture. Without wishing to be bound by theory, it is believed that, as a result of this concentration gradient, the process can result in the formation of different copper ion complexes to those formed when the chelating agent is in solution prior to the chelating agent being contacted with the copper.

In some embodiments, the chelating agent comprises a nitrogen and/or an oxygen donor.

In some embodiments, the chelating agent is a multidentate ligand capable of forming a stable metal ion complex. In some embodiments, the chelating agent is bidentate, tridentate, tetradentate, pentadentate or hexadentate.

In some embodiments, the chelating agent is neutral, positively charged or negatively charged. In some embodiments, the chelating agent is zwitterionic. In some embodiments, the chelating agent is used as its corresponding hydrate. In embodiments that include charged chelating agents, the chelating agent may be used as any suitable salt (i.e., a charged chelating agent with any suitable counterion).

In some embodiments, the chelating agent comprises a nitrogen and/or an oxygen donor. In this regard, the nitrogen and/or oxygen atom is part of a functional group on the chelating agent. The nitrogen and/or oxygen atom is able to donate electrons to the metal centre (i.e., copper) to thus form a coordinate bond and thus the coordinate complex (i.e., copper ion complex). In some embodiments, the chelating agent comprises a nitrogen donor. In some embodiments, the chelating agent comprises an oxygen donor. In some embodiments, the chelating agent comprises a sulfur donor. In some embodiments, the chelating agent comprises both a nitrogen donor and an oxygen donor. In some embodiments, not all of the nitrogen and/or oxygen donors and/or sulphur donors (when present) form a coordinate bond with the metal centre.

In some embodiments the chelating agent comprises one or more (e.g., 1, 2, 3, 4, 5 or 6) carboxylic acid (or carboxylate) groups. In some embodiments the chelating agent comprises one or more (e.g., 1, 2, 3, 4, 5 or 6) amino groups, wherein the amino group(s) may each independently be a primary, secondary or tertiary amino group. In some embodiments the chelating agent may comprise one or more (e.g., 1, 2, 3, 4, 5 or 6) imidodiacetic acid [—N(CH$_2$CO$_2$H)$_2$] groups, wherein one or both of the methylene (—CH$_2$) hydrogen atoms may be replaced with another substituent, such as a C$_1$-C$_4$ alkyl group.

In some embodiments, the chelating agent is selected from the group consisting of ethylenediaminetetraacetic acid (EDTA), diethylenetriaminepentaacetic acid (DTPA), hydroxyethylenediaminetetraacetic acid (HEDTA), ethylenediaminedisuccinic acid (EDDS), salicylic acid, acetyl salicylic acid, amino acids (e.g., glycine, histidine, lysine, arginine, cysteine, methionine), peptides (e.g., comprising 2 or more residues of amino acids such as glycine, histidine, lysine, arginine, cysteine, methionine), and salts thereof and hydrates thereof. The salts thereof may be any suitable salt (i.e., contain any suitable counterion). The structures of EDTA, DTPA, HEDTA and EDDS are shown below:

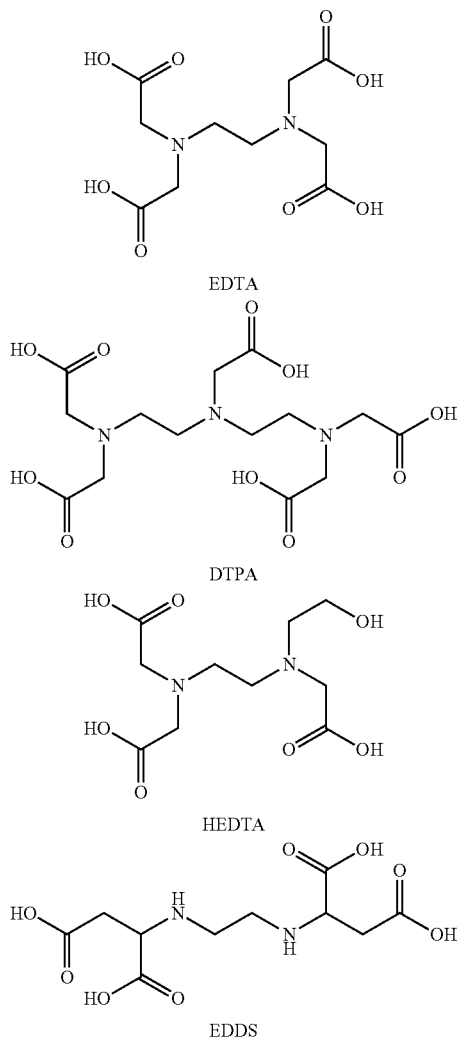

EDTA

DTPA

HEDTA

EDDS

EDTA is a hexadentate chelating ligand with 6 possible coordination sites. The pKa of the carboxylic acid residues of EDTA are 1.70, 2.60, 6.30 and 10.60, respectively. Neutral EDTA can exist as a zwitterion with one or two protons located on one or two of the nitrogen atoms.

In some embodiments, the chelating agent is ethylenediaminetetraacetic acid (EDTA), a salt of ethylenediaminetetraacetic acid (EDTA) or a mixture thereof or a hydrate thereof. In some embodiments, the salt of EDTA comprises one or more of sodium ions, potassium ions, lithium ions, calcium ions, magnesium ions, or mixtures thereof. In particular embodiments, the chelating agent is EDTA disodium salt (disodium EDTA). In other particular embodiments, the chelating agent is calcium disodium EDTA.

The process of the present disclosure comprises a step (b) of, while the copper is in contact with the chelating agent, contacting the copper and chelating agent with an oxidising agent, to form the copper ion complex or mixture of copper ion complexes.

In some embodiments, the oxidising agent is selected from the group consisting of peroxides, peracids, ozone, oxidising salts and N-oxides (e.g., (2,2,6,6-tetramethylpiperidin-1-yl)oxyl also known as TEMPO). In particular embodiments, the oxidising agent is a peroxide, especially hydrogen peroxide.

In some embodiments, the oxidising agent is in solution when contacting the copper and chelating agent. The solvent used to make the solution may be any suitable solvent. In order to be suitable, the oxidising agent should not react with (or react to any appreciable amount with) the solvent. In addition, the oxidising agent should maintain its ability to act as an oxidising agent while in solution. In some embodiments, the oxidising agent is in an aqueous solution.

In some particular embodiments, the oxidising agent is hydrogen peroxide and the hydrogen peroxide is in an aqueous solution. In such embodiments, the aqueous solution of hydrogen peroxide may comprise hydrogen peroxide in an amount within the range of about 0.01 wt. % to about 100 wt. %, For example, in various embodiments, the aqueous solution of hydrogen peroxide is within the range of about 0.01 wt. % to about 70 wt. %, about 0.5 wt. % to about 60 wt. %, about 1 wt. % to about 60 wt. %, about 1 wt. % to about 15 wt. %, about 15 wt. % to about 30 wt. %, about 20 wt. % to about 30 wt. %, about 30 wt. % to about 40 wt. %, or about 45 wt. % to about 55 wt. %, particularly in the range of about 5 wt. % to about 60 wt. %, especially about 30 wt. % or about 50 wt. %.

The process of the present disclosure comprises contacting copper with a chelating agent. In an embodiment, the copper is added to the chelating agent. In another embodiment, the chelating agent is added to the copper. In either of these embodiments, the end result is that the copper and chelating agent are in contact with each other. In other words, the copper and chelating agent are in intimate physical contact. In some embodiments, the copper and chelating agent are combined and mixed to form a mixture in which the copper and chelating agent are in contact with each other.

The process of the present disclosure comprises contacting the copper and chelating agent (while the copper is in contact with the chelating agent) with an oxidising agent. In some embodiments, the copper in contact with the chelating agent is added to the oxidising agent. In other embodiments, the oxidising agent is added to the copper and chelating agent (while the copper is in contact with the chelating agent).

In some embodiments, the oxidising agent is added to the copper/chelating agent at one time. In other embodiments, the copper/chelating agent is added to the oxidising agent at one time. Alternatively, in other embodiments, the oxidising agent is added to the copper/chelating agent in a portionwise fashion over a period of time. For example, the oxidising agent may be added portionwise over about 5 seconds to about 1 hour or 2 to 3 weeks. In other embodiments, the copper/chelating agent is added to the oxidising agent in a portionwise fashion over a period of time as above. In further alternative embodiments, the addition of the oxidising agent to the copper/chelating agent, or the copper/chelating agent to the oxidising agent, is performed in a continuous fashion over a period of time. For example, addition can be made by a syringe pump or solids addition funnel or other apparatus known to those skilled in the art. Those skilled in the art would be able to gauge an appropriate rate of addition taking into consideration factors such as concentration, temperature, reagents, etc.

In some embodiments, the process of the present disclosure is carried out as a "one pot" process. In some embodiments, the process is carried out in a stepwise fashion, including stepwise addition of the oxidising agent and/or copper/chelating agent to the other.

In some embodiments, the copper/chelating agent is wetted with a solvent, especially water, prior to contacting the oxidising agent. In this regard, "wetted" refers to the application of an amount of solvent or water to the copper/chelating agent. This typically involves applying an amount sufficient to cover the copper/chelating agent. The amount of solvent applied is insufficient to dissolve the copper/chelating agent (i.e., at least a portion of the copper/chelating agent, typically a substantial portion of the copper/chelating agent, remains in solid form).

In some embodiments, the copper and chelating agent are above ambient temperature (for example at above about 30° C., above about 40° C., above about 50° C., above about 60° C., above about 70° C., above about 75° C., above about 80° C. or at about 85° C.; e.g., in the range of about 30° C. to about 100° C., about 30° C. to about 90° C., about 30° C. to about 80° C., about 40° C. to about 90° C., about 60° C. to about 90° C. or about 80° C. to 90° C.) when the copper and chelating agent are contacted with the oxidising agent. In some embodiments, the copper and chelating agent are heated before being contacted with the oxidising agent.

In some embodiments, the oxidising agent is above ambient temperature when the copper and chelating agent are contacted with the oxidising agent. In some embodiments the oxidising agent is above room temperature when contacting the copper and chelating agent. For example, the oxidising agent may be at above about 30° C., above about 40° C., above about 50° C., above about 60° C., above about 70° C., above about 75° C., above about 80° C. or at about 85° C.; e.g., in the range of about 30° C. to about 100° C., about 30° C. to about 90° C., about 30° C. to about 80° C., about 40° C. to about 90° C., about 60° C. to about 90° C. or about 80° C. to 90° C.

In some particular embodiments, both the copper/chelating agent and the oxidising agent are above ambient temperature when contacting each other.

In some embodiments, the copper and chelating agent are heated when the oxidising agent is contacted with the copper and chelating agent. In some embodiments, heat is applied to the copper before it contacts the chelating agent, thereby elevating the temperature of the copper/chelating agent above ambient temperature. In some embodiments, heat is applied to the chelating agent before it contacts the copper, thereby elevating the temperature of the copper/chelating agent above ambient temperature. In some embodiments, heat is applied to the copper/chelating agent while the copper is in contact with the chelating agent, and before the oxidising agent is contacted with the copper and chelating agent, in order to bring it to above an ambient temperature. In some embodiments, heat is applied to the copper/chelating agent whilst the oxidising agent contacts the copper/chelating agent.

In some embodiments, heat is applied during step (b) to raise the temperature above ambient temperature. In some embodiments, heat is applied during step (c) to raise the temperature above ambient temperature.

In some embodiments, heat is applied continuously, whilst in other embodiments heat is applied at time intervals that may be regular or irregular. Heat may be applied, for example, by means of a heating mantle, heating jacket, hotplate, microwave or any other means, or any combination thereof, in order to raise the temperature above ambient temperature.

Modification of the temperature may be used to control the rate of reaction. Accordingly, the process of the present disclosure may optionally include one or more heating or cooling steps at any stage. For example, heat may be applied to the reaction in order to encourage the reaction to go to completion in a shorter period of time.

In some embodiments, the ratio of copper:chelating agent in moles is within the range of about 1:5 to about 100:1. In various embodiments, the ratio of copper:chelating agent is within the range of about 1:1 to about 50:1, about 1:1 to about 40:1, about 1:1 to about 10:1, about 2:1 to about 30:1, about 3:1 to about 20:1, about 4:1 to about 20:1, or about 4:1 to about 10:1, particularly about 1:1 to 50:1. In some embodiments the ratio is about 5:1. In some embodiments, an excess of copper is used.

In some embodiments, the ratio of chelating agent:oxidising agent in moles is within the range of about 2:1 to about 1:100. In various embodiments, the ratio of chelating agent:oxidising agent is within the range of about 1:1 to about 1:50, about 1:1 to about 1:20, about 1:2 to about 1:20, about 1:2 to about 1:10 or about 1:3 to about 1:5, particularly about 1:1 to 1:20 or about 1:3.3.

In some embodiments, the amount of copper added is sufficient to consume substantially all of the oxidising agent. In some embodiments, the amount of chelating agent added is sufficient to complex substantially all of the copper. In some embodiments, adding an excess of the chelating agent may slow the reaction down.

In some embodiments, the amount of copper used in the reaction is from about 50 g to about 250 kg, for example, from about 100 g to about 100 kg, from about 500 g to about 50 kg, from about 1 kg to about 20 kg, from about 1 kg to about 10 kg, especially about 1 kg, about 2 kg, about 3 kg, about 4 kg, about 5 kg, about 6 kg, about 7 kg, about 8 kg, about 9 kg, about 10 kg and all amounts in between.

In particular embodiments, the chelating agent is ethylenediaminetetraacetic acid (EDTA) disodium salt and the oxidising agent is aqueous hydrogen peroxide. In more particular embodiments, the oxidising agent is aqueous hydrogen peroxide, the ratio of copper:ethylenediaminetetraacetic acid (EDTA) disodium salt in moles is about 1:1 to about 50:1 and the ratio of copper:hydrogen peroxide in moles is about 1:1 to about 1:20.

In some particular embodiments, copper in contact with the chelating agent is maintained at above about 75° C. (e.g., about 80° C. to 90° C.) when the copper and chelating agent are contacted with the oxidising agent such as hydrogen peroxide, the oxidising agent also being at above about 75° C. (e.g., about 80° C. to 90° C.).

In some particular embodiments, copper in contact with EDTA disodium salt is maintained at above about 75° C. when the copper and EDTA are contacted with the hydrogen peroxide, the hydrogen peroxide also being at above about 75° C.

In some embodiments, the copper and chelating agent may be mixed by any suitable mixing techniques known to those skilled in the art. For example, mixing may be performed by mechanical or magnetic stirring, sonication, shaking, swirling, folding, whipping, inverting the reaction vessel etc.

In some embodiments, the process of the present disclosure further comprises a step of removing unreacted copper and/or unreacted chelating agent and/or unreacted oxidising agent.

The process of the present disclosure typically comprises the further step (c) of allowing the combination of agents resulting from step (b) to react until completion, i.e., allowing the oxidising agent, copper and chelating agent to react until completion. In other words, the oxidation reaction(s) initiated by the oxidising agent is (are) allowed to go to completion. In some embodiments, at least a portion of the chelating agent remains in solid form during step (c).

In the context of the process of the present disclosure, there are several characteristics to indicate to a person skilled in the art that the reaction has gone to completion.

In some embodiments, the completion of the reaction may be indicated by an "exothermic explosion". The "exothermic explosion" may be considered a period towards the end of the reaction where the reaction enters an exothermic phase. For example, the exothermic reaction may lead to a thermal runaway or a runaway reaction whereby the heat generated from the exothermic nature of the reaction(s) increases the rate of the reaction in a positive feedback, leading to a period of highly exothermic reaction. In embodiments that contain solvents, particularly low-boiling solvents, or any other low-boiling reagent or component, these may be quickly converted to their gaseous states and have the appearance of an explosion. Other indicators that the reaction is reaching completion may include the release of water vapour, $CO_2$, ozone, oxygen and/or other gaseous products. In some embodiments, the reaction mixture appears to "boil" with bubbles of gaseous products. For example, and without wishing to be constrained by theory, in the case of an embodiment using disodium EDTA as the chelating agent and $H_2O_2$ as the oxidising agent, there is believed to be a decarboxylation event as the reaction nears completion, which affords bubbles of $CO_2$.

In some embodiments, the completion of the reaction may be indicated by a change in the colour of the reaction. In some embodiments, the reaction mixture changes colour from blue to a greenish blue colour, indicating the completion of the reaction (e.g., from about Pantone® 2386 C, for example, to about Pantone® 306 UP, for example).

In other embodiments, the completion of the reaction may be indicated by the formation of specific copper ion complexes as determined by chromatographic techniques, such as, for example, HPLC.

Allowing the combination to react until completion comprises allowing the combination to react for a sufficient period of time for the reaction to proceed until completion. In some embodiments, allowing the resulting combination to react until completion involves allowing the combination to react for extended periods, for example, the combination may be left for 2 to 5 weeks in order to go to completion. In some embodiments, the combination will react for 1 day, 2 to 7 days, 1 to 2 weeks or 1 to 3 weeks before entering an exothermic phase. In embodiments where the reaction mixture is heated at the outset, it is more likely that the reaction will go to completion within a shorter period of time. For example, the reaction may go to completion in about 5 to 15 mins, about 15 to 30 mins about 30 mins to 1 hour or about 1 to 2 hours, when the reaction components are heated.

In some embodiments, the combination will react until all of the oxidising agent is consumed. In some embodiments, the combination will react until all of the chelating agent is consumed. In some embodiments, the combination will react until all of the copper is consumed.

In some embodiments, the process of the present disclosure may further include an additional step of isolating the copper ion complex or mixture of copper ion complexes from the reaction mixture. Suitable methods of isolation include solvent evaporation, recrystallisation, solvent extraction, filtration, chromatography and other methods known to those skilled in the art. In some embodiments, the mixture resulting from the process is evaporated or lyophilized to obtain a solid or gel comprising the copper ion complex. The copper ion complex may be purified, e.g., by chromatographic techniques or by recrystallization from a suitable solvent.

In some embodiments, the process of the present disclosure forms a single species of copper ion complex. In other embodiments, the process forms multiple species of copper ion complexes (i.e., a mixture of copper ion complexes). These multiple species may be produced simultaneously or sequentially, and may be kept together as a mixture, or separated in a subsequent step.

In some embodiments, the reaction mixture (containing the copper ion complex or mixture of copper ion complexes) is used in the subsequent step (e.g., in the preparation of a composition of the present invention) without further purification. In such embodiments, the copper ion complex or mixture of copper ion complexes may be in solution (e.g., the solution from the reaction mixture) and may be combined with a gelling agent or stabilising agent prior to the subsequent step. In some embodiments, the reaction mixture is allowed to settle (e.g., under gravity or by centrifugation) and the supernatant (containing the copper ion complex or mixture of copper ion complexes) is used in the subsequent step without further purification. In other embodiments, solids may be removed by filtration and the filtrate used in the subsequent step without further purification. In such embodiments, the supernatant or filtrate may be combined with a gelling agent or stabilising agent prior to the subsequent step. In these embodiments, the subsequent step may be a combination with one or more components used in the preparation of a composition of the present invention.

It will be appreciated that in embodiments wherein the copper ion complex or mixture of copper ion complexes obtained from the process of the present disclosure is/are used without further purification in the preparation of a composition of the present invention, there may be other components accompanying the copper ion complex or mixture of copper ion complexes (e.g., solvent such as water). In such embodiments, the amount of the copper ion complex or mixture of copper ion complexes is taken to be the solids content of the material. For example, if the process affords 10 g of a solution which has a solids content of 42%, the amount of copper ion complex or mixture of copper ion complexes will be taken to be 4.2 g.

The copper ion complex or mixture of copper ion complexes obtained from the process of the present disclosure may, under certain conditions, degrade or lose activity upon contact with incompatible materials (e.g., contacting active ionic surfaces like "soda glass" and some polymers/plastics or being exposed to acidic or basic conditions (e.g., pH below about 4 or above about 12, particularly below about 5 or above about 8)). Accordingly, in some embodiments, the copper ion complex or mixture of copper ion complexes obtained from the process of the present disclosure are stored or transferred in containers or vessels substantially free of active ionic surfaces like "soda glass" and incompatible polymers/plastics. In some embodiments, the copper ion complex or mixture of copper ion complexes of the present disclosure are maintained at a pH of between about 4 and about 12, especially between about 5 and about 8, more especially between about 6.5 and 7. In some embodiments, the composition of the present invention has a pH of between about 4 and about 12, especially between about 5 and about 8, more especially between about 6.5 and 7.

In some embodiments, the copper ion complex or mixture of copper ion complexes prepared by the process of the present disclosure is/are water soluble.

In some embodiments, the copper ion complex or mixture of copper ion complexes prepared by the process of the present disclosure is/are in the form of a salt, such as an alkali earth or alkali metal salt. For example, the complex may be a $Na^+$, $K^+$, $Li^+$, $Mg^{2+}$, or $Ca^{2+}$ salt. In some embodiments, the process of the present disclosure comprises an additional step of exchanging counterions of the salt. Techniques for performing such a step, such as ion exchange chromatography and recrystallization, are known to those skilled in the art. Thus, for example, a salt or protonated form of a copper ion complex (or mixture thereof) may be converted into another salt of choice (e.g., to form a pharmaceutically acceptable salt thereof).

Copper ion complexes prepared according to the process of the present disclosure may be more stable at a particular pH. For example, in some embodiments the copper ion complexes or mixtures of copper ion complexes obtained from the process of the present disclosure may be stable at a pH in the range from about 4 to about 12, preferably in the range from about 4 to about 9. Accordingly, the copper ion complex or mixture of copper ion complexes may, in some embodiments, be combined with a buffer or a pH adjusting agent to provide a stable composition comprising the copper ion complex or mixture of copper ion complexes. In some embodiments, the hyaluronic acid acts as a buffer.

In this respect, the above process results in the manufacture of a copper ion complex or mixture of copper ion complexes comprising copper coordinated to a ligand Formula (I) or Formula (II) or Formula (VI):

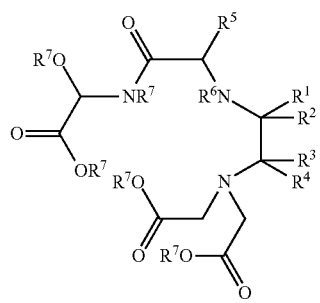

Formula (I)

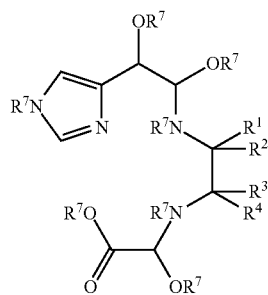

Formula (II)

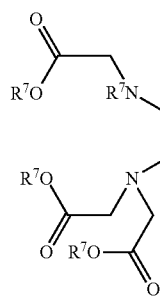

Formula (VI)

wherein
$R^1$ is H and $R^2$ is H or OH, or $R^1$ and $R^2$ together with the carbon atom to which they are attached form a carbonyl (C=O);
$R^3$ is H and $R^4$ is H or OH, or $R^3$ and $R^4$ together with the carbon atom to which they are attached form a carbonyl (C=O);
$R^5$ is —CH($OR^7$)$CH_2OR^7$ or —$CH_2CO_2R^7$ and $R^6$ is absent or H, or $R^5$ is H and $R^6$ is —CH($OR^7$)$CH_2OR^7$ or —$CH_2CO_2R^7$; and
each $R^7$ is independently absent or H;
or a salt thereof, tautomer thereof or polymer thereof.

The preparation of such copper ion complexes and mixtures of copper ion complexes (i.e., copper ion complexes and mixtures of copper ion complexes referred to in the second aspect of the present invention) is described in WO 2016/201524 A1 (it is noted that Formula (VI) was not explicitly referred to WO 2016/201524 A1).

In some embodiments, the ligand is of Formula (I) or a salt thereof, tautomer thereof or polymer thereof, especially where $R^5$ is —CH($OR^7$)$CH_2OR^7$ or —$CH_2CO_2R^7$ and $R^5$ is absent or H.

In particular embodiments, the ligand is of Formula (Ia)

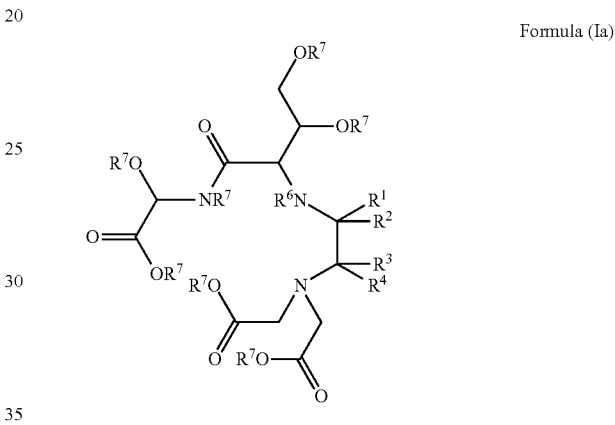

Formula (Ia)

wherein
$R^1$ is H and $R^2$ is OH, or $R^1$ and $R^2$ together with the carbon atom to which they are attached form a carbonyl (C=O);
$R^3$ is H and $R^4$ is OH, or $R^3$ and $R^4$ together with the carbon atom to which they are attached form a carbonyl (C=O);
$R^6$ is absent or H; and
each $R^7$ is independently absent or H;
or a salt thereof, tautomer thereof or polymer thereof or a ligand is of Formula (Ib)

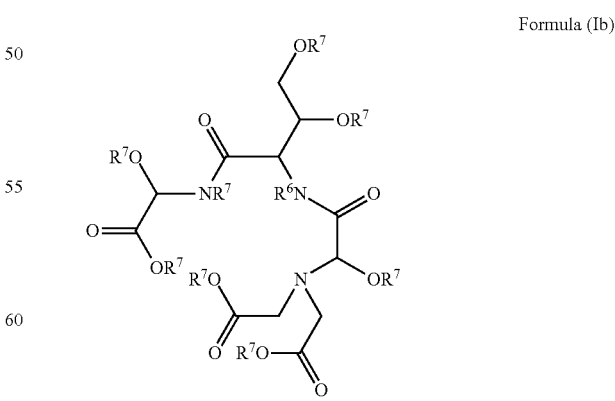

Formula (Ib)

wherein
$R^6$ is absent or H; and
each $R^7$ is independently absent or H;
or a salt thereof, tautomer thereof or polymer thereof.

In other embodiments, the ligand is of Formula (II) or a salt thereof, tautomer thereof or polymer thereof, especially a ligand of Formula (IIa)

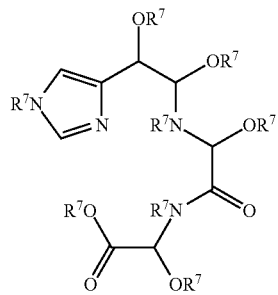

Formula (IIa)

wherein
each $R^7$ is independently absent or H.

Such copper ion complexes may be prepared by the process of the present disclosure. For example, in some embodiments, the process of the present disclosure is carried out using copper, EDTA disodium and aqueous hydrogen peroxide, and the reaction is allowed to proceed to completion, to provide a mixture of copper ion complexes including copper ion complexes comprising a ligand of Formula (III) and/or Formula (IV) (described below where M in Formula (III) or Formula (IV) is $Cu^{2+}$ or $Cu^{3+}$) and/or Formula (VI) (where $Cu^{2+}$ and/or $Cu^{3+}$ is chelated to the ligand of Formula (VI)).

The mixture of copper ion complexes may, in some embodiments, further comprise Cu(II) EDTA and/or Cu(III) EDTA.

Copper ion complexes comprising a ligand of Formula (I), Formula (II) or Formula (VI) may, in some embodiments, be formed by other methods. For example, the ligand may be synthesised by methods known in the art, and reacted with (coordinated to) a copper (or copper cation) to form the copper ion complex.

In the ligands of Formula (I) and Formula (II), the substituents $R^6$ and/or $R^7$ may, in some instances, represent H or may be absent. In the ligands of Formula (VI), the substituent $R^7$ may, in some instances, represent H or may be absent. As a person skilled in the art will appreciate, if $R^6$ or $R^7$ are absent, the valency of the heteroatom to which the $R^6$ or $R^7$ is attached (i.e., the N and/or O atom) will be assumed to be satisfied by a lone pair of electrons (resulting in a formal negative charge on the heteroatom). In such instances, the lone pair of electrons/negative charge may, for example, form a salt with another cation (such as $Na^+$, $K^+$, $Ca^{2+}$ etc.) or may, for example, coordinate (i.e., bond) with a copper cation to form a coordination bond (sometimes known as a dative bond) and thus contribute to forming the coordination complex (i.e., copper ion complex). In other words, the negative charge of the $—O^-$, $—N^-—$ or $—CO_2^-$ group (provided by the lone pair of electrons) is available for bonding with a proton ($H^+$), cation (such as $Na^+$, $K^+$, $Ca^{2+}$ etc.) or the copper ion of the copper ion complex.

For example, in the ligands of Formula (I) or Formula (II) or Formula (VI) $—CO_2R^7$ may represent $—CO_2H$ (i.e., a carboxylic acid) when $R^7$ is H, or $—CO_2$ (i.e., a carboxylate anion) when $R^7$ is absent. Depending on the conditions (pH for example), a carboxylic acid (i.e., $—CO_2H$) may deprotonate to afford the corresponding carboxylate anion (i.e., $—CO_2—$). Also depending on the conditions, the carboxylate anion may form a salt, for example $—CO_2Na$ (sometimes depicted as $—CO_2^-Na^+$), or may coordinate with the metal ion of the copper ion complex, forming a coordinate bond. This may be depicted, for example, as $—CO_2ML_n$, where M represents the copper ion of the copper ion complex and $L_n$ represents n ligands or ligating groups where n is an integer. Examples of ligating groups may include functional groups (such as $—O^-$, $—OH$, $—N^-—$, $—NH—$, $—CO_2H$, $—CO_2^-$, etc.) on a ligand.

The nature of the coordinate bond, in terms of covalent or ionic character, between a ligand and a copper ion will depend on a number of factors. As a person skilled in the art will appreciate, a bond between a ligand and a copper ion may be ionic, covalent or somewhere in between. The degree of the partial ionic character (or partial covalent character) of a bond may depend on, for example, the electronegativity of the copper ion and/or the electronegativity of the ligating group involved. For example, when the difference in electronegativity between the copper ion and the ligating group is greater, the bond will have a more ionic character. Similarly, when the difference in electronegativity between the copper ion and the ligating group is smaller, the bond will have a more covalent character. The copper ion complexes of the present disclosure comprise a ligand of Formula (I) or Formula (II) or Formula (VI), as described above, bound to a copper ion by 2 or more bonds that may be ionic, covalent, partially ionic, partially covalent or may have any degree of partial ionic character or partial covalent character.

The copper ion complexes of the present disclosure may form tautomers (i.e., may exist in multiple tautomeric forms). A person skilled in the art will understand that tautomers are structural isomers that exist as a rapidly-interconverting mixture in equilibrium. The ratio of the tautomers depends on various factors, for example, temperature, solvent and pH. Most commonly, tautomers differ by the position of a proton. In other words, a deprotonation/protonation sequence occurs to relocate a proton. When the ligands of Formula (I) or Formula (II) or Formula (VI) have a tautomer, each tautomer is embraced in the relevant Formula. For example, Formula (I) embraces both tautomers depicted in the below partial structures:

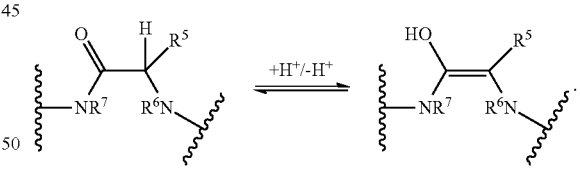

As a further example of tautomeric forms, Formula (I) embraces both tautomers depicted in the below partial structures:

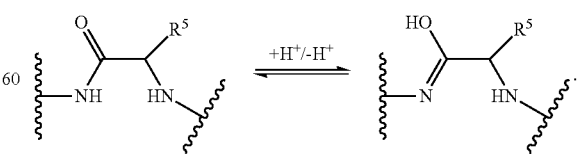

The ligands of Formula (I) or Formula (II) or Formula (VI) may exist in stereoisomeric forms (e.g., enantiomers or diastereomers depending on the number of chiral centers).

Mixtures of diastereomers and mixtures of enantiomers (e.g., racemates) can be separated into the stereoisomerically uniform constituents by methods known to persons skilled in the art. Unless otherwise stated, it is intended that any reference herein to a compound or ligand that is capable of existing in stereoisomeric forms (e.g., a copper ion complex comprising a ligand of Formula (I) or Formula (II) or Formula (VI)) is intended to encompass all possible stereoisomers and mixtures of stereoisomers of the compound or ligand (e.g., is intended to encompass all possible enantiomers, mixtures of enantiomers, diastereomers or mixtures of diastereomers).

In some embodiments, the copper ion complex comprising a ligand of Formula (I) or Formula (II) or Formula (VI) comprises a copper ion selected from $Cu^{2+}$ and $Cu^{3+}$.

In some embodiments, the copper ion complex comprises the chelate (i.e., ligand of Formula (I) or (II) or (VI)) and copper ion in a 1:1 stoichiometric ratio or 1:2 stoichiometric ratio (i.e., 1:1 or 1:2 chelate:copper ion). In other embodiments, the copper ion complex comprises the chelate and copper ion in a chelate:copper ion stoichiometric ratio of between 1:3 and 1:8, for example 1:3, 1:4, 1:5, 1:6, 1:7 or 1:8. Suitable counterions may include pharmaceutically acceptable ions such as sodium ions, potassium ions, calcium ions, magnesium ions, etc.

In some embodiments, the ligand of Formula (I) or Formula (II) may be coordinated to the copper ion of the copper ion complex by 2, 3, 4, 5 or 6 ligating groups (e.g., donor atoms). In other words, the ligand may be attached to the copper ion of the copper ion complex by 2, 3, 4, 5 or 6 bonds between the copper ion and the ligand of Formula (I) or Formula (II). In some embodiments, the ligand of Formula (VI) may be coordinated to the copper ion of the copper ion complex by 2, 3 or 4 ligating groups. In some embodiments, the copper ion complex comprises a ligand of Formula (I) or Formula (II) or Formula (VI) and a copper ion, wherein the ligand is coordinated to the copper ion by 4 coordinate bonds. In other embodiments, the copper ion complex comprises a ligand of Formula (I) or Formula (II) and a copper ion, wherein the ligand is coordinated to the copper ion by 6 coordinate bonds.

It is likely that the ligating groups of the ligands of Formula (I) or Formula (II) or Formula (VI) are the donor atoms N and/or O. These donor atoms may be present in various functional groups and may be in their charged or uncharged states. For example, the copper ion may bond to the donor atoms N and/or O, which are present in the ligands of Formula (I) or Formula (II) or Formula (VI) in the functional groups —OH, —O$^-$, —NH—, —N$^-$—, $CO_2H$, $CO_2^-$, =N— or =O (where applicable).

For example, in some embodiments, the copper ion complex may comprise a ligand attached to a copper ion by 4 bonds, as represented by Formula (III) or Formula (IV) as depicted below (where M is a copper ion):

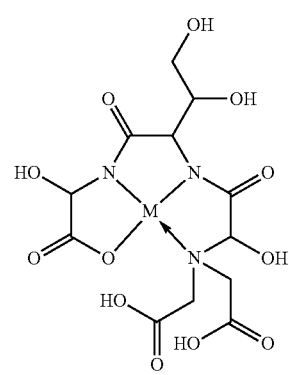

Formula (III)

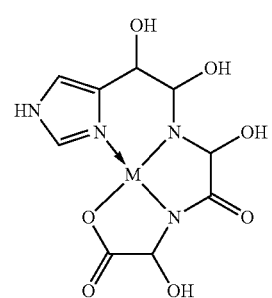

Formula (IV)

As a person skilled in the art will appreciate, the structures depicted in Formula (III) and Formula (IV) are a generalisation only, as various protonation/deprotonation steps will occur to give rise to tautomers of the structures of Formulas (III) and (IV). For example, the imidazole of Formula (IV) may deprotonate and tautomerise to give a structure of Formula (IVa):

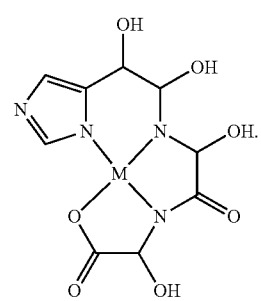

Formula (IVa)

As a person skilled in the art will also appreciate, the ligands may also bind to the copper ion by further coordination bonds. For example, one of the pendant carboxylic acid groups of Formula (III) may also bind to the metal centre to give the structure depicted in Formula (IIIa) below:

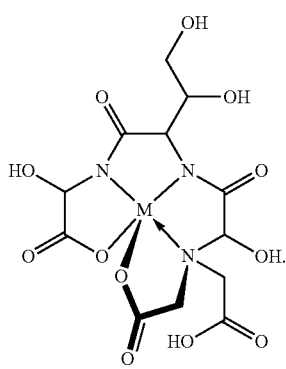

Formula (IIIa)

Further coordination may afford the structure depicted in Formula (IIIb):

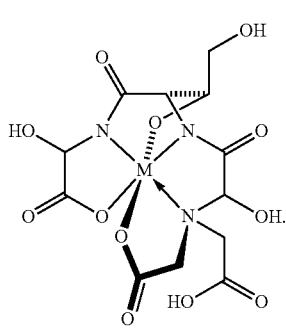

Formula (IIIb)

Without wishing to be bound by theory, it may also be possible for a ligand to coordinate to the copper ion via a contiguous series of 2 or more atoms (i.e., have a hapticity of 2 or more). For example, it may be possible for the ligand of Formula (II) to bind to the copper via the 5 contiguous atoms of the imidazolate group (i.e., hapticity of 5, $\eta^5$), as depicted below in Formula (V).

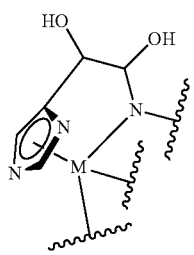

Formula (V)

Accordingly, in some embodiments, the copper ion complex comprises a ligand coordinated to the copper ion via a contiguous series of 2 or more atoms (i.e., having a hapticity of 2 or more), for example, having a hapticity of 2 ($\eta^2$), 3 ($\eta^3$), 4 ($\eta^4$) or 5 ($\eta^5$).

The copper ion complex or mixture of copper ion complexes of the present disclosure (i.e., a copper ion complex or a mixture of copper ion complexes as referred to in the second aspect of the present invention or obtained by the process referred to in the first aspect of the present invention) may, in some embodiments, exist as salts. Such salts are preferably pharmaceutically acceptable, that is, a salt which is not deleterious to a subject to whom the salt is administered. Examples of pharmaceutically acceptable salts include salts of pharmaceutically acceptable cations such as sodium, potassium, lithium, calcium, magnesium, ammonium and alkylammonium; acid addition salts of pharmaceutically acceptable inorganic acids such as hydrochloric, orthophosphoric, sulphuric, phosphoric, nitric, carbonic, boric, sulfamic and hydrobromic acids; or salts of pharmaceutically acceptable organic acids such as acetic, propionic, butyric, tartaric, maleic, hydroxymaleic, fumaric, citric, lactic, mucic, gluconic, benzoic, succinic, oxalic, phenylacetic, methanesulphonic, trihalomethanesulphonic, toluenesulphonic, benzenesulphonic, salicylic, sulphanilic, aspartic, glutamic, edetic, stearic, palmitic, oleic, lauric, pantothenic, tannic, ascorbic and valeric acids. Pharmaceutically acceptable salts may also be formed with amino acids having positively charged side-chains (e.g., arginine, histidine and lysine), negatively charged side-chains (e.g., aspartic acid and glutamic acid), polar uncharged side-chains (e.g., serine, threonine, asparagine and glutamine), hydrophobic side-chains (e.g., alanine, valine, isoleucine, methionine, phenylalanine, tyrosine and tryptophan) or other side-chains (e.g., cysteine, selenocysteine, glycine and proline).

In some embodiments, the copper ion complex or mixture of copper ion complexes of the present disclosure form solvates with water (hydrates) or common organic solvents. Such solvates are contemplated herein.

The copper ion complexes of the present invention may, in certain circumstances or conditions, aggregate to form a supramolecular assembly. Accordingly, in some embodiments, the copper ion complex or mixture of copper ion complexes of the present disclosure exist in a supramolecular assembly (a supramolecular assembly comprising two or more copper ion complexes of the present disclosure and may optionally comprise other copper ion complexes such as copper EDTA). Supramolecular assemblies comprising the copper ion complexes of the present disclosure may be loosely held together (e.g., by Van der Waals, dispersion or electrostatic forces) and disassemble under certain conditions.

The copper ion complexes of the present disclosure may, in certain circumstances or conditions, form a polymer. As used herein, the terms "polymer" and "polymers" are used in a broad sense and include an oligomer, oligormers, oligomeric material and the like, unless the context clearly requires otherwise. That is, the terms "polymer" and "polymers" as used herein include dimers, trimers, tetramers etc. (i.e., comprising 2, 3, 4 etc. monomeric/repeating units or entities). For example, the term "polymer" may be used herein to refer to 2, 3, 4, 20, 50, 100, 1000, 10000, 100000 etc. monomeric/repeating units or entities. Experimental evidence (e.g., mass spectroscopic data, not presented) suggests that material isolated from the process of the present disclosure may, in some circumstances, comprise a polymer formed of copper ion complexes.

In some embodiments, a polymer of a copper ion complex comprising a ligand of Formula (I) or Formula (II) or Formula (VI) may be provided by the polymerisation of a ligand of Formula (I) and/or Formula (II) and/or Formula (VI). A person skilled in the art will understand that the ligands of Formula (I), Formula (II) and Formula (VI) each have functional groups capable of forming covalent bonds (e.g., esters, amides, ethers etc.). Accordingly, polymers may, in various embodiments, be formed by the polymerisation of the functional groups of the ligands of Formula (I) and/or Formula (II) and/or Formula (VI) leading to polyesters, polyamides, polyethers etc. For example, a carboxylic acid group residing on the ligand of Formula (I) may form an ester with an alcohol group (—OH) on a ligand of Formula (I) or Formula (II) or Formula (VI) to form an ester bond.

In some embodiments, a polymer of a copper ion complex comprising a ligand of Formula (I) or Formula (II) or Formula (VI) is a coordination polymer. A coordination polymer may be described as a structure containing copper cations linked by organic ligands. A coordination polymer may also be described as a coordination compound with repeating coordination entities extending in 1, 2 or 3 dimensions, or as a polymer whose monomeric/repeat units are coordination complexes. Coordination polymers may extend along a single dimension (and may include cross-links between two or more individual chains), or may extend in 2 or 3 dimensions. In some embodiments, the coordination polymer comprises a copper cation bound to more than 1 (e.g., 2, 3, 4, 5 or 6) ligands of Formula (I) and/or Formula (II) and/or Formula (VI). In other embodiments, the coordination polymer comprises a ligand of Formula (I) and/or Formula (II) and/or Formula (VI) bound to more than 1 (e.g., 2, 3, 4, 5 or 6) copper cations.

In some embodiments, polymers of copper ion complexes comprising a ligand of Formula (I) and/or Formula (II) and/or Formula (VI) may form during the formation of the complex, or may form during the formation of the ligands. In other words, the copper ion complexes may polymerise during their formation, or the ligands may be polymerised prior to formation of the copper ion complex.

Polymers may be formed solely from copper ion complexes comprising a ligand of Formula (I), copper ion complexes comprising a ligand of Formula (II) or copper ion complexes comprising a ligand of Formula (VI) (i.e., homopolymers). Alternatively, polymers may also be formed from a mixture of copper ion complexes comprising a ligand of Formula (I) and/or copper ion complexes comprising a ligand of Formula (II) and/or copper ion complexes comprising a ligand of Formula (VI) (i.e., copolymers). In some embodiments, the copolymers may also comprise complexes other than copper ion complexes comprising a ligand of Formula (I), Formula (II) or Formula (VI). The copolymers may, for example, be random copolymers, alternating copolymers or block copolymers. In some embodiments, the polymer may comprise copper ion complexes other than those encompassed by Formula (I) and Formula (II) and Formula (VI). For example, the polymer may comprise a copper ion complex comprising a ligand of Formula (I) and/or a copper ion complex comprising a ligand of Formula (II) and/or a copper ion complex comprising a ligand of Formula (VI) and copper EDTA.

In some embodiments, the polymers comprise from 2 to about 20000 monomeric/repeating units/entities, for example, from 2 to about 5000, 1000, 100, 20, 10, 9, 8, 7, 6, 5, 4 or 3 monomeric units. In some embodiments, the process of the present disclosure affords a polymer comprising one or more copper ion complexes of the second aspect of the present invention (which may be the same or different complexes). In some embodiments, this polymer may further comprise other complexes (e.g., copper EDTA).

In some embodiments, the process of the present disclosure provides a mixture comprising one or more of: (i) one or more copper ion complexes of the second aspect of the present invention; (ii) a polymer comprising one or more copper ion complexes referred to in (i); and (iii) a supramolecular assembly comprising one or more copper ion complexes referred to in (i) and/or (ii). Such mixtures may, in some embodiments, further comprise other complexes (e.g., copper EDTA or polymers comprising copper EDTA).

In some embodiments, the process of the present disclosure provides a dimer comprising two copper ion complexes each comprising a ligand of Formula (VI). In some embodiments, the process of the present disclosure provides a dimer comprising one copper ion complex comprising a ligand of Formula (VI) and one other complex (e.g., a copper ion complex comprising a ligand of Formula (I), Formula (II) or Formula (VI) or EDTA).

Examples of dimers that may be present in a mixture of copper ion complexes obtained by the process of the present disclosure include:

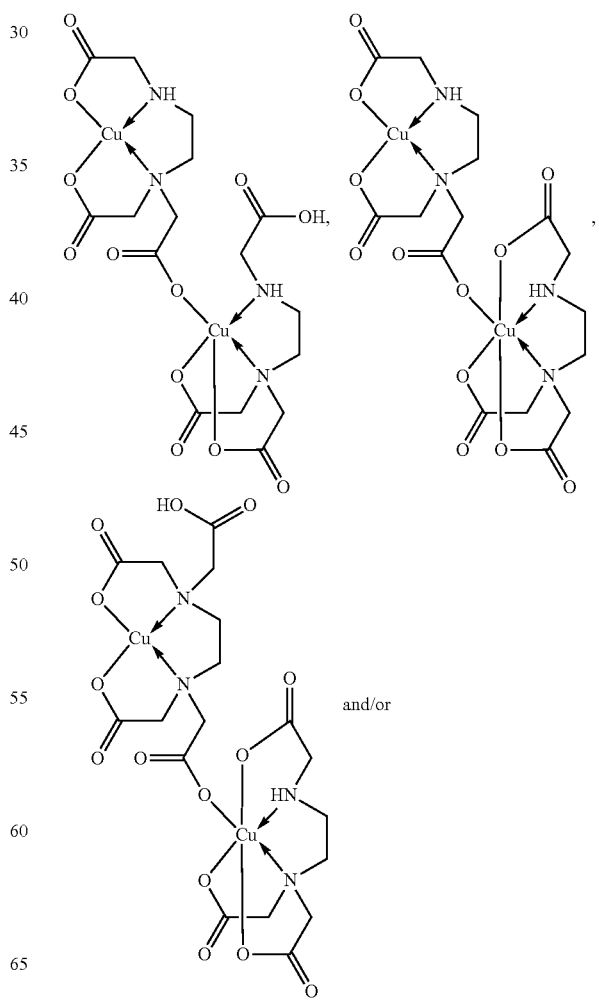

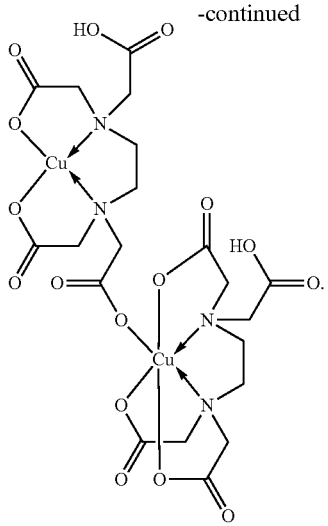

In the exemplary dimers shown above, each appearance of Cu may represent $Cu^{3+}$ or $Cu^{2+}$. For example, the dimers that may be present in a mixture of copper ion complexes obtained by the process of the present disclosure may include:

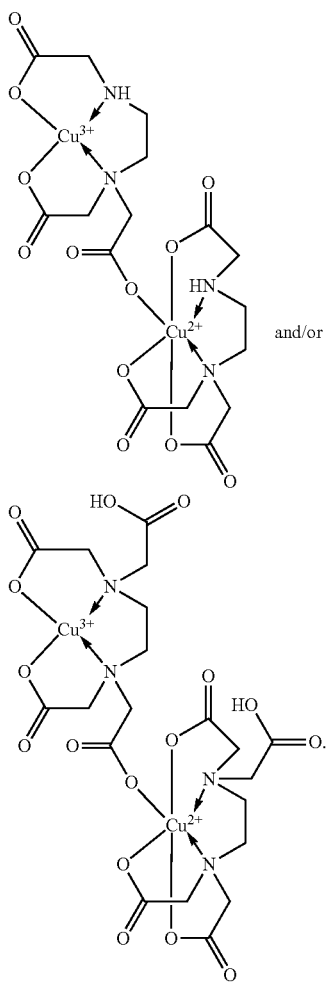

In some particular embodiments, the process of the present disclosure provides a mixture of copper ion complexes comprising:

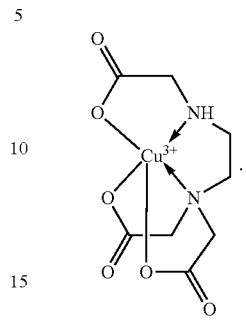

In some embodiments, the process of the present disclosure provides a mixture of copper ion complexes comprising one or more copper ion complexes of the present disclosure and, optionally, one or more polymers comprising a copper ion complex of mixture of copper ion complexes of the present disclosure.

The copper ion complex or mixture of copper ion complexes of the present disclosure (i.e., a copper ion complex or a mixture of copper ion complexes as referred to in the second aspect of the present invention or obtained by the process referred to in the first aspect of the present invention) may, in some embodiments, comprise $Cu^{3+}$, $Cu^{2+}$ or $Cu^+$ ions, or a mixture thereof. In some embodiments, the copper is $Cu^{3+}$, $Cu^{2+}$, or a mixture thereof, especially $Cu^{3+}$. In some embodiments, there exist 2 or more different $Cu^{3+}$ species. In some embodiments, there exist 3 or more different $Cu^{3+}$ species. In some embodiments, the mixture of copper ion complexes comprises a mixture of $Cu^{2+}$ species and $Cu^{3+}$ species. In some embodiments, the ratio of the $Cu^{2+}:Cu^{3+}$ species in the mixture of copper ion complexes is in the range of about 1:1 to about 1:5, for example, about 1:2 to about 1:4, 1:3 to about 1:4 or about 1:3.5.

Without wishing to be bound by theory, it is believed that one factor in the observed biological activity of copper ion complexes of the present disclosure may be due to the formation of relatively stable complexes of $Cu^{3+}$. The reduction in situ of $Cu^{3+}$ accounts for the SOD-like activity of the complexes, whereby the $Cu^{3+}$ donates a proton to the $O^{2+}$ superoxide neutralizing that free radical. A similar reaction occurs in respect of nitrogen-based free radical species, including peroxynitrite.

3. Pharmaceutical and Cosmetic Formulations

The copper ion complex or mixture of copper ion complexes described above and elsewhere herein are typically administered as an agent in a pharmaceutical composition or a cosmetic composition.

In some embodiments, the amount of copper ion complex or mixture of copper ion complexes in the composition is in the range of from about 0.01% to about 95% by mass based on the total mass of the composition. In some embodiments, the amount of copper ion complex or mixture of copper ion complexes in the composition is in the range of from about 0.1% to about 50% by mass based on the total mass of the composition (for example, from about 0.1% to about 20%, from about 0.1% to about 10%, from about 0.1% to about 5%, 0.2% to about 20%, from about 0.2% to about 10%, from about 0.2% to about 5%, 0.5% to about 20%, from about 0.5% to about 10%, from about 0.5% to about 5%. 1% to about 20%, from about 1% to about 10%, from about 1% to about 5%, 2% to about 20%, from about 2% to about 10%, from about 2% to about 5% or from about 0.3% to about 10% by mass based on the total mass of the composition).

Hyaluronic Acid

In some embodiments, the compositions of the present invention comprise hyaluronic acid, a salt of a hyaluronic acid or a mixture thereof. Hyaluronic acid (HA; also called hyaluronan) is an anionic, non-sulfated glycosaminoglycan. The term "hyaluronic acid" is used generally in the art to refer to the acid form of hyaluronic acid as well as salts of hyaluronic acid and mixtures thereof. As used herein, except where the context requires otherwise due to express language or necessary implication, the term "hyaluronic acid" is used in a general sense and is intended to refer to the acid form of hyaluronic acid as well as salts of hyaluronic acid and mixtures thereof. It is believe that the hyaluronic acid may assist to provide an environment that aids the stabilisation of copper ion complexes, particularly those comprising $Cu^{3+}$. It is believed that an observed stabilisation and improved biological activity of copper ion complexes in compositions comprising hyaluronic acid may be due to one or more effects which may act alone or in concert. For example, the hyaluronic acid may act as a buffer, thereby maintaining the composition at a suitable pH (e.g., ideal for the copper ion complexes of the present disclosure) when in contact with the skin (or other surface) of a subject. It is also possible that the hyaluronic acid may coordinate to the copper ion of the copper ion complexes, which may act to stabilise the complexes and may also assist with transporting the complexes to thereby deliver them to the subject (e.g., transportation/absorption into the skin). The hyaluronic acid may also assist with stabilisation and/or transportation of the copper ion complexes by other, presently unknown, mechanisms.

Naturally occurring hyaluronic acid is typically found distributed widely throughout connective, epithelial, and neural tissues. It is unique among glycosaminoglycans in that it is non-sulfated, forms in the plasma membrane instead of the Golgi apparatus, and can be very large, with its molecular weight often approaching the range of $10^6$ Da. Hyaluronic acid is one of the main components of the extracellular matrix, and contributes to cell proliferation and migration.

Hyaluronic acid has found significant application in the cosmetics industry where it is typically used as a gelling agent and/or moisturising agent, most notably in skin care products. Hyaluronic acid can have a range of properties depending on the form of the hyaluronic acid employed. Properties of hyaluronic acid may be affected by, for example, molecular weight, intrinsic pH, counterion (i.e., salt) or biological source (e.g., whether isolated from vegetables, bacteria, cows, sheep, pigs, chickens etc.). In some preferred embodiments, the hyaluronic acid is obtained from vegetable sources.

Hyaluronic acid is widely available from a range of commercial suppliers including Sigma Aldrich, Pure Bulk and Alibaba. Commercial suppliers also supply a range of different forms of hyaluronic acid. For example, it is possible to select desired molecular weight, counterion (salt) etc. from commercial suppliers (e.g., Sigma Aldrich offers sodium hyaluronate having the following molecular weight ranges (in Da): 1,200; 8,000-15,000; 10,000-30,000; 15,000-30,000; 30,000-50,000; 50,000-70,000; 70,000-90,000; 70,000-120,000; 90,000-110,000; 120,000-350,000; 130,000-150,000; 150,000-300,000; 300,000-500,000; 500,000-750,000; 750,000-1,000,000; 1,000,000-1,250,000; 1,250,000-1,500,000; 1,500,000-1,750,000; 1,750,000-2,000,000; 2,000,000-2,200,000; 2,000,000-2,400,000). Different molecular weights and weight ranges of hyaluronic acid are also widely available.

In some embodiments, an enhancement of the bioavailability of the copper ion complex or mixture of copper ion complexes is observed for the composition of the present invention compared to the copper ion complex or mixture of copper ion complexes absent the hyaluronic acid. In some embodiments, an enhancement of the bioactivity of the copper ion complex or mixture of copper ion complexes is observed for the composition of the present invention compared to the copper ion complex or mixture of copper ion complexes absent the hyaluronic acid.

In some embodiments, the salt of hyaluronic acid is selected from the sodium salt (sodium hyaluronate), potassium salt (potassium hyaluronate) and mixtures thereof. In some embodiments, the salt of hyaluronic acid is sodium hyaluronate.

A variety of hyaluronic acid samples having molecular weights ranging from 50-100 kDa to $10^6$ Da were tested. A selection of compositions comprising hyaluronic acid with an average molecular weight of $10^6$ Da are described below in the Examples. Similar results were observed across the range of molecular weights tested, with greater improvements in bioactivity, bioavailability and efficacy generally being observed with hyaluronic acids having higher molecular weights (e.g., around or above about $0.5 \times 10^6$ Da, especially around or above about $10^6$ Da).

Hyaluronic acid is typically supplied in a form wherein the molecular weight is a range rather than a discreet value. In some embodiments, the molecular weight of a substantial portion (e.g., more than 50, 60, 70, 80, 90, 95, 97, 98, 99, 99.5 or 99.9% w/w) of the hyaluronic acid is in the range of from about 500 Da to about $10^7$ Da (for example, from about $10^3$ to about $10^7$ Da, from about $10^4$ to about $10^7$ Da, from about $10^5$ to about $10^7$ Da, from about $10^6$ to about $10^7$ Da, from about $10^3$ to about $10^6$ Da, from about $10^4$ to about $10^6$ Da, from about $10^5$ to about $10^6$ Da, from about $10^3$ to about $10^5$ Da, from about $10^4$ to about $10^5$ Da or from about $10^3$ to about $10^4$ Da). In some embodiments, the composition of the present invention comprises 2, 3, 4, 5, 6, 7, 8 or more molecular weight ranges of hyaluronic acid (for example, a mixture of low molecular weight hyaluronic acid (e.g., 50-100 kDa) and high molecular weight hyaluronic acid (e.g., $10^5$-$10^6$ Da)).

In some embodiments, the amount of the hyaluronic acid in the composition is in the range of from about 0.01 to about 80% by mass based on the total mass of the composition. In some embodiments, the amount of the hyaluronic acid in the composition is in the range of from about 0.1 to about 50% by mass based on the total mass of the composition (for example, from about 0.1 to about 10%, from about 0.1 to about 5%, from about 0.1 to about 2%, from about 0.2 to about 5%, from about 0.2 to about 2%, from about 0.5 to about 5%, from about 0.5 to about 2% or from about 0.5 to about 1% by mass based on the total mass of the composition).

As a person skilled in the art will appreciate, the amount of hyaluronic acid used in the composition will typically depend on the molecular weight of the hyaluronic acid used and the desired properties of the composition.

Some properties of the composition may be adjusted by varying the molecular weight and/or amount of hyaluronic acid in the composition. This may be useful depending on the intended use or form of the composition. For example, physical properties such as viscosity, rheology, and/or hardness may be affected by varying the molecular weight and/or amount of hyaluronic acid in the composition. A person skilled in the art will be able to select appropriate molecular weights and/or amounts of hyaluronic acid depending on the intended use or form of the compositions of the present invention. For example, if a less viscous composition is required (e.g., mouthwash, gel spray or nasal spray), a lower molecular weight hyaluronic acid may be selected and/or the amount of the hyaluronic acid in the composition may be reduced. If a more viscous composition is required (e.g., hard or soft gel, suppository, pessary or pastille), a higher molecular weight hyaluronic acid may be selected and/or the amount of the hyaluronic acid in the composition may be increased.

As an example, a 2% (w/w), $10^6$ Da sodium hyaluronate solution in water is a very thick gel, similar in consistency to honey, whereas a 2% (w/w), 500 Da sodium hyaluronate solution in water is only marginally more viscous than water itself. As a further example, if the composition is to be formulated as a gel, it may be possible to form a gel using 50% (w/w) of very low molecular weight hyaluronic acid (e.g., 500 Da), whereas it is difficult to form a gel using high molecular weight hyaluronic acid (e.g., $10^6$ Da) above about 5% (w/w).

In some embodiments, hyaluronic acid (e.g. sodium hyaluronate) forms a hydrogel which unexpectedly supports the stability of the copper ion complex or mixture of copper ion complexes.

In some embodiments, hyaluronic acid (e.g. sodium hyaluronate) forms a hydrogel which unexpectedly both supports the stability of the copper ion complex or mixture of copper ion complexes and improves the bioavailability/bioactivity of the copper ion complex or mixture of copper ion complexes. The use of sodium hyaluronate in topical formulations as a hydrogel is known, particularly for cosmetic applications where it is typically used for hydration. Hyaluronic acid has also been incorporated into topical formulations for delivery of topical dermatological agents. However, these formulations have traditionally been used to deliver the topical dermatological agents to a localised area to produce a localised effect, typically no deeper than the dermis. The enhancement of the bioavailability/bioactivity of active pharmaceutical ingredients has not, to the best of the inventor's knowledge, been reported.

In some embodiments, the composition of the present invention surprisingly improves the bioavailability/bioactivity of the copper ion complex or mixture of copper ion complexes (relative to the copper ion complex or mixture of copper ion complexes absent the hyaluronic acid). Without wishing to be bound by theory, it is believed that the hyaluronic acid may improve the bioavailability and/or bioactivity of the copper ion complex or mixture of copper ion complexes by affecting the stability, as discussed above, and/or the release rate and/or "penetration" properties. In this regard, "penetration" refers to the amount or ability of the copper ion complex or mixture of copper ion complexes to enter the skin or other surface to which it is applied (e.g. epithelium). As will be appreciated, increased "penetration" may increase the transportation and/or absorption of the copper ion complex or mixture of copper ion complexes into the skin or other surface to which the composition is applied, thereby improving the bioavailability and/or bioactivity.

In some embodiments, the composition of the present invention is administered topically and surprisingly elicits a pharmacodynamic response outside of the localised area to which it is administered. It is believed that such a result may be due to the improved "penetration" properties described above.

Compositions

In some embodiments, the compositions of the present invention are pharmaceutical compositions. The pharmaceutical compositions often comprise one or more "pharmaceutically acceptable carriers." These include any carrier which does not itself induce the production of antibodies harmful to the individual receiving the composition. Suitable carriers typically are large, slowly metabolized macromolecules such as proteins, polysaccharides, polylactic acids, polyglycolic acids, polymeric amino acids, amino acid copolymers, and lipid aggregates (such as oil droplets or liposomes). Such carriers are well known to those of ordinary skill in the art. A composition may also contain a diluent, such as water, saline, glycerol, etc. Additionally, an auxiliary substance, such as a wetting or emulsifying agent, pH buffering substance, and the like, may be present. A thorough discussion of pharmaceutically acceptable components is available in Gennaro (2000) Remmington: The Science and Practice of Pharmacy, $20^{th}$ Ed. ISBN: 0683306472.

The pharmaceutical compositions may include various salts, excipients, delivery vehicles and/or auxiliary agents as are disclosed, e.g., in U.S. Patent Application Publication No. 2002/019358 (published 14 Feb. 2002).

The compositions of the present invention may be formulated for administration in the form of liquids, containing acceptable diluents (such as saline and sterile water), or may be in the form of lotions, creams, or gels containing acceptable diluents or carriers to impart the desired texture, consistency, viscosity and appearance. Acceptable diluents and carriers are familiar to those skilled in the art and include, but are not restricted to, ethoxylated and nonethoxylated surfactants, fatty alcohols, fatty acids, hydrocarbon oils (such as palm oil, coconut oil, and mineral oil), cocoa butter waxes silicon oils, pH balancers, cellulose derivatives, emulsifying agents such as non-ionic organic and inorganic bases, preserving agents, wax esters, steroid alcohols, triglyceride esters, phospholipids such as lecithin and cephalin, polyhydric alcohol esters, fatty alcohol esters, hydrophilic lanolin derivatives, and hydrophilic beeswax derivatives.

Alternatively, the bioactive agents of the present invention can be formulated readily using pharmaceutically acceptable carriers well known in the art into dosages suitable for oral administration, which is also contemplated for the practice of the present invention. Such carriers enable the bioactive agents of the invention to be formulated in dosage forms such as tablets, pills, capsules, liquids, gels, syrups, slurries, suspensions, and the like, for oral ingestion by subject. These carriers may be selected from sugars, starches, cellulose and its derivatives, malt, gelatin, talc, calcium sulphate, vegetable oils, synthetic oils, polyols, alginic acid, phosphate buffered solutions, emulsifiers, isotonic saline, and pyrogen-free water.

Pharmaceutical formulations for parenteral administration include aqueous solutions of the particles in water-soluble form. Additionally, suspensions of the bioactive agents may be prepared as appropriate oily injection suspensions. Suitable lipophilic solvents or vehicles include fatty oils such as sesame oil, or synthetic fatty acid esters, such as ethyl oleate or triglycerides. Aqueous injection suspensions may contain substances that increase the viscosity of the suspension, such as sodium carboxymethyl cellulose, sorbitol, or dextran. Optionally, the suspension may also contain suitable stabilisers or an agent that increase the solubility of the compounds to allow for the preparation of highly concentrated solutions.

Pharmaceutical preparations for oral use can be obtained by combining the molecules with solid excipients and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydropropylmethyl-cellulose, sodium carboxymethylcellulose, and/or polyvinylpyrrolidone (PVP). If desired, disintegrating agents may be added, such as the cross-linked polyvinyl pyrrolidone, agar, or alginic acid or salt thereof such as sodium alginate. Such compositions may be prepared by any of the methods of pharmacy but all methods include the step of bringing into association one or more therapeutic agents as described above with the carrier which constitutes one or more necessary ingredients. In general, the pharmaceutical compositions of the present invention may be manufactured in a manner that is itself known, e.g., by means of conventional mixing, dissolving, granulating, dragee-making, levigating, emulsifying, encapsulating, entrapping, or lyophilizing processes.

Dragee cores are provided with suitable coatings. For this purpose, concentrated sugar solutions may be used, which may optionally contain gum Arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or dragee coatings for identification or to characterize different combinations of particle doses.

Pharmaceuticals which can be used orally include push-fit capsules made of gelatin, as well as soft, sealed capsules made of gelatin and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, the compounds may be dissolved or suspended in suitable liquids, such as fatty oils, liquid paraffin, or liquid polyethylene glycols. In addition, stabilizers may be added.

The dose of agent administered to a patient should be sufficient to achieve a beneficial response in the patient over time such as a reduction in at least one symptom associated with a disease and/or condition.

The quantity or dose frequency of the pharmaceutically active compound(s) to be administered may depend on the subject to be treated inclusive of the age, sex, weight, and general health condition thereof. In this regard, the precise amounts of the active component(s) for administration will depend on the judgement of the consumer or medical practitioner. The agents of the present invention may be administered over a period of hours, days, weeks, or months, depending on several factors, including the severity of the condition being treated, whether a recurrence of the condition is considered likely, etc. The administration may be constant e.g., constant infusion over a period of hours, days, weeks, months, etc. Alternatively, the administration may be intermittent, e.g., agents may be administered once a day over a period of days, once an hour over a period of hours, or any other such schedule as deemed suitable.

The agents of the present invention may also be administered to the respiratory tract as a nasal or pulmonary inhalation aerosol or solution for a nebulizer, or as a microfine powder for insufflation, alone or in combination with an inert carrier such as lactose, or with other pharmaceutically acceptable excipients. In some particulate embodiments of the present invention, the particles of a formulation may advantageously have diameters of less than 50 µm, suitably less than 10 µm.

Certain compositions of the present invention can further include one or more adjuvants before, after, or concurrently with the polynucleotide. The term "adjuvant" refers to any material having the ability to (1) alter or increase the immune response to a particular antigen or (2) increase or aid an effect of a pharmacological agent. An adjuvant may be used with a composition comprising a peptide or polypeptide of the present invention. Suitable adjuvants include, but are not limited to, cytokines and growth factors, bacterial components (e.g., endotoxins, in particular superantigens, exotoxins and cell wall components), aluminium-based salts, calcium-based salts, silica, polynucleotide, toxoids, serum proteins, viruses, and virally-derived materials, poisons, venoms, imidazoquiniline compounds, poloxamers, and cationic lipids.

A great variety of materials have been shown to have adjuvant activity through a variety of mechanisms. Any compound which may increase the expression, antigenicity, or immunogenicity of the polypeptide is a potential adjuvant. The present invention provides an assay to screen for improved immune responses to potential adjuvants.

In some embodiments, the composition of the present invention is formulated as a topical formulation (i.e., a composition suitable for topical administration). The terms "topical" and "topical administration" have more than one meaning in the art. "Topical administration" may be used in the art to describe the application/delivery of an agent to a localised area of the body in order to have a pharmacodynamic effect on that localised area. "Topical administration" may also be used in the art to describe the application/delivery of an agent to a localised area or surface of a body part regardless of the location of the pharmacodynamic effect. As used herein, "topical" and "topical administration" are intended to refer to either or both of these meanings. The compositions of the present invention are typically formulated for topical use. In some embodiments, the composition is intended to be applied to a localised area or surface of a body part (e.g., skin, internal surface of a body or surface of an internal organ) with the intention of having a pharmacodynamic effect on that localised area. In other embodiments, the composition is intended to be applied to a localised area or surface of a body part with the intention of having a pharmacodynamic effect on a part or parts of the body other than that localised area or surface. This is particularly so in the treatment of endometriosis, where the composition may be applied to a part of the body other than where the endometriosis is located (e.g., surface of skin, abdomen, vagina or rectum).

For topical administration the compositions of the present invention may be formulated as ointments, creams, gels, hydrogels, sprayable liquid gel (e.g. gel spray, nasal spray), pessaries, suppositories, lotions, transdermal patches, buccal patches or troches. Ointments and creams may, for example, be formulated with an aqueous or oily base with the addition of suitable thickening, emulsifying and/or gelling agents (e.g. emulsion of oil in water or emulsion of water in oil). Lotions may be formulated with an aqueous or oily base and generally also contain one or more emulsifying agents, stabilising agents, dispersing agents, suspending agents, thickening agents, colouring agents or preservatives (e.g. methyl paraben, propyl paraben, phenoxyethanol). The complexes of the present disclosure are typically lipophobic. As such, ointments, creams, lotions etc. are typically formulated with an aqueous (or at least hydrophilic) base, rather than an oily base (which may be problematic due to solubility). Ointments, creams, lotions and the like may also be formulated to comprise $C_{1-3}$-alkoxylated oils and waxes (e.g. ethoxylated vegetable oils, ethoxylated jojoba oil/wax, ethoxylated lanolin oil, ethoxylated coconut oil, ethoxylated cocoa butter).

For example, in some embodiments, the composition of the present invention is formulated as a topical hydrogel formulation (i.e., a composition in the form of a hydrogel suitable for topical administration). Gels are typically dispersions of liquids within solids in which liquid particles are dispersed in the solid medium. Hydrogels are gels in which water is the liquid or a significant portion of the liquid (e.g. more than 30% v/v of the liquid is water). Hydrogels may be jelly-like in consistency, but may also range from being soft to hard hydrogels.

Hydrogels are typically formed from a network of polymer chains, typically hydrophilic polymer chains, and water. The polymer chains that form the network of polymer chains in the hydrogel may be referred to herein as a "hydrogelling agent." In some embodiments, the hydrogel formulations comprise a hydrogelling agent in addition to the hyaluronic acid. In other embodiments, the hyaluronic acid acts as the hydrogelling agent. In other embodiments still, the hydrogel formulation comprises a hydrogelling agent and the hyaluronic acid does not act to any appreciable extent as a hydrogelling agent. Accordingly, in some embodiments, the hydrogel is formed from a network of hyaluronic acid. In other embodiments, the hydrogel is formed from a network of hyaluronic acid and one or more other hydrogelling agents. In still other embodiments, the hydrogel is formed from a network of the other hydrogelling agents. Exemplary hydrogelling agents that may be used as the hydrogelling agent, or in addition to the hyaluronic acid, include aloe-vera, carrageenan, carbomers, xanthan gum, guar gum and the like.

The liquid phase of the hydrogel may contain, in addition to water, any of the conventional liquid phases or systems conventionally used for hydrogels, and may contain, for example, ethanol, polyols (for example, glycerol, propylene glycol and liquid polyethylene glycol, and the like) and suitable mixtures thereof.

In some embodiments, the copper ion complex or mixture of copper ion complexes form particles, optionally with one or more other components. Such particles may, in some embodiments, be suspended in the hydrogel.

Formulations suitable for vaginal administration may be presented as pessaries, tampons, creams, gels, pastes, foams or sprays containing in addition to the active ingredients such carriers as are known in the art to be appropriate. Formulations suitable for rectal administration may be presented as suppositories, creams, gels, pastes, foams or sprays containing in addition to the active ingredients such carriers as are known in the art to be appropriate.

In some embodiments, the composition of the present invention is formulated as a mouthwash. Such embodiments may comprise from about 0.01% (w/w) to about 30% (w/w) hyaluronic acid, especially from about 0.1% (w/w) to about 2% (w/w), more especially about 0.5% (w/w). In some embodiments, the molecular weight of more than 90% (w/w) of the hyaluronic acid is in the range of from about $10^5$ to about $10^7$ Da, especially about $10^6$ Da. In some embodiments, the amount of copper ion complex or mixture of copper ion complexes may be in the range of from about 0.01% (w/w) to about 10% (w/w), especially from about 0.5% (w/w) to about 5% (w/w), more especially from about 1% (w/w) to about 1.5% (w/w). Exemplary applications include mouth ulcers, lacerations in the mouth, etc.

In some embodiments, the composition of the present invention is formulated as a gel spray. Such embodiments may comprise from about 0.01% (w/w) to about 30% (w/w) hyaluronic acid, especially from about 0.1% (w/w) to about 2% (w/w), more especially about 0.75% (w/w). In some embodiments, the molecular weight of more than 90% (w/w) of the hyaluronic acid is in the range of from about $10^5$ to about $10^7$ Da, especially about $10^6$ Da. In some embodiments, the amount of copper ion complex or mixture of copper ion complexes may be in the range of from about 0.01% (w/w) to about 30% (w/w), especially from about 0.5% (w/w) to about 5% (w/w), more especially from about 1% (w/w) to about 3% (w/w).

In some embodiments, the composition of the present invention is formulated as a nasal spray. Such embodiments may comprise from about 0.01% (w/w) to about 30% (w/w) hyaluronic acid, especially from about 0.1% (w/w) to about 1% (w/w), more especially about 0.25% (w/w). In some embodiments, the molecular weight of more than 90% (w/w) of the hyaluronic acid is in the range of from about $10^5$ to about $10^7$ Da, especially about $10^6$ Da. In some embodiments, the amount of copper ion complex or mixture of copper ion complexes may be in the range of from about 0.01% (w/w) to about 30% (w/w), especially from about 0.5% (w/w) to about 5% (w/w), more especially from about 1% (w/w) to about 3% (w/w).

In some embodiments, the composition of the present invention is formulated as a pessary formulation. Such embodiments may comprise from about 30% (w/w) to about 80% (w/w) hyaluronic acid, especially from about 40% (w/w) to about 60% (w/w), more especially about 50% (w/w). In some embodiments, the molecular weight of more than 90% (w/w) of the hyaluronic acid is in the range of from about $10^5$ to about $10^7$ Da, especially about $10^6$ Da. In some embodiments, the amount of copper ion complex or mixture of copper ion complexes may be in the range of from about 0.01% (w/w) to about 30% (w/w), especially about 0.5% (w/w) to about 5% (w/w), more especially about 1% (w/w) to about 3% (w/w). In some particular embodiments of the pessary formulation, water soluble components are preferred, as well as, for example, alkoxylated oils and waxes (e.g. suitable components selected from ethoxylated vegetable oils, ethoxylated jojoba oil/wax, ethoxylated lanolin oil, ethoxylated coconut oil, ethoxylated cocoa butter). Exemplary applications include endometriosis and period pain.

In some embodiments, the composition of the present invention is formulated as a suppository formulation. Such embodiments may comprise from about 30% (w/w) to about 80% (w/w) hyaluronic acid, especially from about 40% (w/w) to about 60% (w/w), more especially about 50% (w/w). In some embodiments, the molecular weight of more than 90% (w/w) of the hyaluronic acid is in the range of from about $10^5$ to about $10^7$ Da, especially about $10^6$ Da. In some embodiments, the amount of copper ion complex or mixture of copper ion complexes may be in the range of from about 0.01% (w/w) to about 30% (w/w), especially about 0.5% (w/w) to about 5% (w/w), more especially about 1% (w/w) to about 3% (w/w). In some particular embodiments of the suppository formulation, water soluble components are preferred, as well as, for example, alkoxylated oils and waxes (e.g. suitable components selected from ethoxylated vegetable oils, ethoxylated jojoba oil/wax, ethoxylated lanolin oil, ethoxylated coconut oil, ethoxylated cocoa butter).

In some embodiments, the composition of the present invention is formulated as cream. Such embodiments may comprise from about 0.01% (w/w) to about 30% (w/w) hyaluronic acid, especially from about 0.1% (w/w) to about 3% (w/w) or from about 0.1% (w/w) to about 2% (w/w), more especially about 1% (w/w). In some embodiments, the molecular weight of more than 90% (w/w) of the hyaluronic acid is in the range of from about $10^5$ to about $10^7$ Da, especially about $10^6$ Da. In some embodiments, the amount of copper ion complex or mixture of copper ion complexes may be in the range of from about 0.01% (w/w) to about 30% (w/w), especially about 0.5% (w/w) to about 5% (w/w), more especially about 1% (w/w) to about 3% (w/w).

In preparing compositions of the present invention, particularly embodiments that comprise more than about 5 or 10% (w/w) hyaluronic acid having a molecular weight of about $10^6$ Da or greater, it may be beneficial to prepare the composition by a technique that comprises slowly adding the hyaluronic acid to an alcohol or polyol solvent such as glycol (e.g. glycerine) while stirring to form a well dispersed slurry. This slurry can then be added to the required amount of water whilst stirring with a high shear mixer to form a firm jelly. A similar technique may also be used to make a pastille by using greater proportions of higher MW hyaluronic acid. An alternative technique to prepare a pastille is to first form a jelly as above, pour it into a mould and dry under reduced pressure and/or increased temperature until the required water content is achieved.

In some embodiments, the composition of the present invention is formulated as a transdermal patch. Such a patch is typically self-adhering. In some embodiments, the patch is formulated as a slow release patch (i.e. to slowly release the copper ion complex or mixture of copper ion complexes of the present disclosure and the hyaluronic acid to the surface to which the patch is applied). In some embodiments, the patch has a pharmacodynamic effect on localised area to which it is applied. In some embodiments, the patch has a pharmacodynamic effect on parts of the body other than the localised area or surface to which the patch is applied.

In some embodiments, the composition of the present invention is formulated as a patch suitable for topical insertion during surgery. Such a patch is typically sterile and may optionally be self-adhering. In some embodiments, the patch is formulated as a slow release patch (i.e. to slowly release the copper ion complex or mixture of copper ion complexes of the present disclosure and the hyaluronic acid to the surface to which the patch is applied). In some embodiments, the patch has a pharmacodynamic effect on localised area to which it is applied. In some embodiments, the patch has a pharmacodynamic effect on parts of the body other than the localised area or surface to which the patch is applied.

Carriers, Excipients, Diluents and Other Additives

Other agents may also be added to the formulations of the present invention to provide other desired properties. For example, in some embodiments, humectants, anti-oxidants, vitamins (e.g., vitamin A and/or vitamin E), colouring agents and/or fragrances may be added. Such additives may be natural (for example, plant extracts, animal-derived oils, vitamins), or may be synthetic (for example, surfactants or preservatives such as BHT).

As an example, a formulation for topical administration may comprise (in addition to the copper ion complex or mixture of copper ion complexes of the present disclosure and the hyaluronic acid) any one or more of the following additives: *Simmondsia Chinensis* (Jojoba oil), glyceryl stearate, cetylstearyl alcohol, sodium stearoyl lactylate, stearic acid, glyceryl monostearate, glycerine, caprylic/capric triglyceride, PEG 20, sorbitan monolaurate, cocoa butter, triethanolamine, emu oil, shea butter, tocopheryl acetate (vitamin E), phenoxyethanol, ethylhexylglycerin, polyoxyethylene (20) sorbitan monooleate, acrylates/C10-30 alkyl acrylate crosspolymer, essential oil (e.g. lavender oil), Tween 20 (polyoxyethylene-20-sorbitan monolaurate), glycerine or Euxyl PE 9010 (phenoxyethanol and ethylhexylglyerin).

Formulations suitable for topical administration in the mouth include lozenges that, in addition to comprising the copper ion complex or mixture of copper ion complexes of the present disclosure and the hyaluronic acid, may comprise a flavoured base, usually sucrose, maltitol, acacia or tragacanth; pastilles that, in addition to comprising the copper ion complex or mixture of copper ion complexes of the present disclosure and the hyaluronic acid, may comprise an inert base such as gelatin and glycerin or sucrose and acacia; buccal cavity patches; hydrogels; or gels.

The pharmaceutical compositions and cosmetic compositions of the present invention may additionally or alternatively be suitable for oral, rectal, nasal, buccal, sub-lingual and slow-release dermal patch, vaginal or parenteral (including intramuscular and sub-cutaneous) administration or in a form suitable for administration by inhalation or insufflation.

The pharmaceutical compositions and cosmetic compositions of the present invention may be placed into the form of a unit dosage. The pharmaceutical composition may be a solid or semi-solid (e.g. hydrogel), such as a pessary or suppository, or a liquid such as a solution, gel, suspension, emulsion, spray or elixir.

Such pharmaceutical compositions, cosmetic compositions and unit dosage forms thereof may comprise conventional ingredients in conventional proportions, with or without additional active compounds or principles, and such unit dosage forms may contain any suitable effective amount of the active ingredients commensurate with the intended daily dosage range to be employed.

For preparing pharmaceutical compositions and cosmetic compositions, pharmaceutically cosmetically acceptable carriers can be either solid or liquid. A solid carrier can be one or more substances which may also act as diluents, flavouring agents, solubilisers, lubricants, suspending agents, binders or preservatives.

Suitable carriers include magnesium stearate, talc, sugar, lactose, pectin, dextrin, starch, gelatin, tragacanth, a low melting wax, cocoa butter, and the like.

The pharmaceutical compositions and cosmetic compositions of the present invention are preferably stable under the conditions of manufacture and storage and may be preserved against oxidation and the contaminating action of microorganisms such as bacteria or fungi.

Of course, any material used in preparing any pharmaceutical compositions and cosmetic compositions should be pharmaceutically pure and substantially non-toxic in the amounts employed.

In some embodiments, compositions of the present invention may be used in combination with one or more other therapeutically effective agents. Accordingly, in some embodiments, the pharmaceutical composition may further comprise, or be administered in combination with, one or more other agents. It will be understood that the combined administration of a composition of the first or second aspect of the present invention with the one or more other agents may be concurrent, sequential or separate administration.

The compositions and formulations of the present invention are typically formulated or administered to deliver a therapeutically effective amount. The term "therapeutically effective amount" refers to the amount of a compound that will elicit the biological or medical response in a subject, tissue or cell that is being sought by the medical doctor or other clinician.

It will be understood that the therapeutically effective amount of a copper ion complex (or a mixture of copper ion complexes) and, optionally, hyaluronic acid (including salts and mixtures thereof) will depend upon a variety of factors including the activity of the specific complex or mixture of complexes employed, the metabolic stability and length of action of that complex, the age, body weight, general health, sex and diet of the subject, the mode and time of administration (e.g. surface area of topical administration), rate of excretion, drug combinations, and the severity of the particular condition.

A pharmaceutically and/or cosmetically acceptable carrier may include one or more ingredients selected from the group consisting of emollients, propellants, solvents, humectants, thickeners, powders, and fragrances in addition to, or instead of, the preferred topical carrier ingredients listed above. One skilled in the art would be able to optimize carrier ingredients for the topical compositions without undue experimentation.

In some of the same embodiments and alternative embodiments, the cosmetic composition further comprises an emollient. The amount of emollient in the topical composition is typically between about 5% and about 95%. Suitable emollients include stearyl alcohol; glyceryl monoricinoleate; glyceryl monostearate; propane-1,2diol; butane-1,3-diol; mink oil; cetyl alcohol; isopropyl isostearate; stearic acid; isobutyl palmitate; isocetyl stearate; oleyl alcohol; isopropyl laurate; hexyl laurate; decyl oleate; octadecan-2-ol; octadecan-2-ol; isocetyl alcohol, cetyl palmitate; di-n-butyl sebacate; isopropyl myristate; isopropyl palmitate; isopropyl stearate; butyl stearate; polyethylene; glycol; triethylene glycol; lanolin; sesame oil; coconut oil; arachis oil; castor oil; acetylated lanolin alcohols; petrolatum; mineral oil; butyl myristate; isostearic acid; palmitic acid; isopropyl linoleate; lauryl lactate; myristyl lactate; decyl oleate; myristyl myristate; polydimethylsiloxane; and combinations thereof.

In some of the same embodiments and some alternative embodiments, the cosmetic composition further comprises a propellant. The amount of propellant in a topical composition is typically between about 5% and about 95%. Suitable propellants include propane; butane; isobutene; dimethyl ether; carbon dioxide; nitrous oxide; and combinations thereof.

In some of the same embodiments and some alternative embodiments, the cosmetic composition further comprises a solvent. The amount of solvent in the topical composition is typically between about 5% and 95%. Suitable solvents include water; ethyl alcohol; methylene chloride; isopropanol; castor oil; ethylene glycol monoethyl ether; diethylene glycol monobutyl ether; diethylene glycol monoethyl ether; dimethylsulfoxide; dimethyl formamide; tetrahydrofuran; and combinations thereof.

In some of the same embodiments and alternative embodiments, the cosmetic composition further comprises a humectant. The amount of humectant in the cosmetic composition is typically between about 5% and about 95%. Suitable humectants include glycerin; sorbitol; sodium 2-pyrrolidone-5-carboxylate; soluble collagen; dibutyl phyalate; gelatin; and combinations thereof. In some of the same embodiments and alternative embodiments, the cosmetic composition further comprises a thickener. The amount of thickener in the topical composition is typically from about 0% to about 95%.

In some of the same embodiments and alternative embodiments, the cosmetic composition further comprises a powder. The amount of powder in the composition is typically from around 0% to around 95%. Suitable powders include chalk, talc, fullers earth, kaolin, starch, gums, colloidal silicon dioxide, sodium polyacrylate, tetra alkyl ammonium smectites, trialkyl aryl ammonium smectites, chemically modified magnesium aluminium silicate, organically modified montmorillonite clay, hydrated aluminium silicate, fumed silica, carboxyvinyl polymer, sodium carboxymethyl cellulose, ethylene glycol monostearate, and combinations thereof.

In some of the same embodiments and some alternative embodiments, the cosmetic compositions also comprise a fragrance. The amount of fragrance in the topical composition is typically between around 0.001% and around 0.5%, and preferably between around 0.001% and around 0.1%.

4. Methods of Reducing Free Radical Induced Damage

The compositions of the present invention are suitable for use in methods of reducing an inflammatory response in a tissue of a subject. Without relying on any one particular mechanism, the copper ion complex and copper ion complex mixtures described above and elsewhere herein, have a substantial free radical scavenging activity. Therefore, it follows that the compositions described above and elsewhere herein find utility in reducing or preventing oxidative damage to cellular mechanisms that are implicated in conditions including, inflammation, photic injury to skin, aging, atherogenesis, carcinogenesis, etc.

Therefore, in some embodiments the present invention provides a method for reducing or preventing free-radical induced damage to a tissue of a subject. The method comprises administering to the subject a copper ion complex or copper ion complex mixture as described above and/or elsewhere herein.

In some embodiments, the free radical induced damage is caused by an injury selected from the group comprising photic injury (e.g., sunburn), radiation injury, toxic injury, direct oxidative injury (e.g., oxygen toxicity), impact injury.

Accordingly, in some embodiments of the invention, a method is provided for the use of the copper ion complexes and copper ion complex mixtures described above and/or elsewhere herein, in reducing or preventing damage to tissues or cells caused by free radicals.

In such embodiments, the compositions of the present invention may be administered prior to, simultaneously, or following, exposure to free radical inducing agents including, but nor limited to radiation, heat, and toxins. Exposure to free-radical inducing agents may be incidental, accidental, or predetermined.

The compositions of the invention are administered to a subject to be treated in a manner compatible with the dosage formulation, and in an amount that will be prophylactically and/or therapeutically effective. The amount of the composition to be delivered, generally in the range of from 0.01 µg/kg to 100 µg/kg of copper ion complex or mixture of copper ion complex per dose, depends on the subject to be treated. In some embodiments, and dependent on the intended mode of administration, the compositions will generally contain about 0.1% to 90%, about 0.5% to 50%, or about 1% to about 25% by weight copper ion complex or mixture of copper ion complex, the remainder being suitable pharmaceutical carriers and/or diluents etc. as described above and elsewhere herein.

Depending on the specific condition being treated, the compositions may be formulated and administered systemically, topically, or locally. Techniques for formulation and administration may be found in "Remmington's Pharmaceutical Sciences," Merk Publishing Co., Easton, Pa., latest edition. Suitable routes may, for example, include oral, rectal, transmucosal, or intestinal administration, parenteral delivery, including intramuscular, subcutaneous, transcutaneous, intradermal, intramedullary delivery (e.g., injection), as well as intrathecal, direct intraventricular, intravenous, intraperitoneal, intranasal, or intraocular delivery (e.g., injection). For injection, the compositions of the invention may be formulated in aqueous solutions, suitably in physiologically compatible buffers such as Hank's solution, Ringer's solution, or physiological saline buffer. For transmucosal administration, penetrants appropriate to the barrier to be permeated are used in the formulation. Such penetrants are generally known in the art.

5. Methods of Reducing an Inflammatory Response

An effect of the unexpected and surprising significant free radical scavenging activity of the copper ion complexes and the mixture of copper ion complexes that are described above and/or elsewhere herein, is its beneficial effect on reducing an inflammatory response in a subject. That is, it is known that oxidative stress results in nuclear factor-κB (NF-κB) activation, which in turn activates cellular inflammatory cascades. Accordingly, by neutralizing free radicals and reducing oxidative stress, the inflammatory response caused by cellular stress is reduced.

Advantageously, reducing the inflammatory response often has a beneficial effect. For example, by reducing an inflammatory response at a wound site is found to stimulate and/or promote wound healing.

Accordingly, in some embodiments the invention provides methods of reducing an inflammatory response in a subject, the method comprising administering to the subject the copper ion complexes, or the mixture of copper ion complexes described above and/or elsewhere herein, to thereby reduce the inflammatory response in the subject.

In some embodiments, an effective amount of the copper ion complexes, or mixture of copper ion complexes, is administered to the subject.

In some embodiments, the inflammatory response is reduced in the subject by about 30%, 35%, 40%, 45%, 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%. 97%, 98%, 99%, 99.5% or 100%.

6. Methods of Promoting Wound Healing

The compositions described above and elsewhere herein, also find utility in promoting, stimulating or otherwise enhancing wound healing in a subject. Accordingly, in one aspect, the invention provides methods for treating a wound in a subject, the method comprising administering to the subject a composition as described above or elsewhere herein. In some preferred embodiments, the composition is administered by topical administration.

The present invention contemplates treating all wounds, including those of a type that do not heal at expected rates. Wounds that do not heal at the/an expected rate, typically refer to injuries to any tissue, including delayed or difficult to heal wounds (including delayed or incompletely healing wounds), and chronic wounds. Examples of wounds that do not heal at the expected rate include, but are not limited to, ulcers, such as diabetic ulcers, diabetic foot ulcers, vasculitic ulcers, arterial ulcers, venous ulcers, venous stasis ulcers, pressure ulcers, decubitus ulcers, infectious ulcers, trauma-induced ulcers, burn ulcers, ulcerations associated with pyoderma gangrenosum, and mixed ulcers. Other wounds that do not heal at expected rates include dehiscent wounds.

As used herein, a delayed or difficult to heal wound may include, for example, a wound that is characterized at least in part by a prolonged inflammatory phase.

Chronic wounds broadly includes any wound that has not healed within about three months. Chronic wounds include venous ulcers, venous stasis ulcers, arterial ulcers, pressure ulcers, diabetic ulcers, diabetic foot ulcers, vasculitic ulcers, decubitus ulcers, burn ulcers, trauma-induced ulcers, infectious ulcers, mixed ulcers, and pyoderma gangrenosum. The chronic wound may be an arterial ulcer which comprises ulcerations resulting from complete or partial arterial blockage. The chronic wound may be a venous or venous stasis ulcer which comprises ulcerations resulting from a malfunction of the venous valve and the associated vascular disease. In certain embodiments a method of treating a chronic wound is provided where the chronic wound is characterized by one or more of the following AHCPR stages of pressure ulceration: stage 1, stage 2, stage 3, and/or stage 4.

As used herein, chronic wound may refer to, for example, a wound that is characterized at least in part by a chronic self-perpetuating state of wound inflammation. Chronic wounds may also be characterized by prolonged inflammation and proteolytic activity leading to ulcerative lesions, including for example, diabetic, pressure (decubitus), venous, and arterial ulcers.

Exemplary chronic wounds may include pressure ulcers. Exemplary pressure ulcers may be classified into four stages based on AHCPR (Agency for Health Care Policy and Research, U.S. Department of Health and Human Services) guidelines. A stage 1 pressure ulcer is an observable pressure related alteration of intact skin whose indicators as compared to the adjacent or opposite area on the body may include changes in one or more of the following: skin temperature (warmth or coolness), tissue consistency (firm or boggy feel) and/or sensation (pain, itching). The ulcer appears as a defined area of persistent redness in lightly pigmented skin, whereas in darker skin tones, the ulcer may appear with persistent red, blue, or purple hues. Stage 1 ulceration may include nonblanchable erythema of intact skin and the heralding lesion of skin ulceration. In individuals with darker skin, discoloration of the skin, warmth, edema, induration, or hardness may also be indicators of stage 1 ulceration. Stage 2 ulceration may be characterized by partial thickness skin loss involving epidermis, dermis, or both. The ulcer is superficial and presents clinically as an abrasion, blister, or shallow crater. Stage 3 ulceration may be characterized by full thickness skin loss involving damage to or necrosis of subcutaneous tissue that may extend down to, but not through, underlying fascia. The ulcer presents clinically as a deep crater with or without undermining of adjacent tissue. Stage 4 ulceration may be characterized by full thickness skin loss with extensive destruction, tissue necrosis, or damage to muscle, bone, or supporting structures (e.g., tendon, joint capsule). In certain embodiments a method of treating a chronic wound is provided where the chronic wound is characterized by one or more of the following AHCPR stages of pressure ulceration: stage 1, stage 2, stage 3, and/or stage 4.

Exemplary chronic wounds may also include decubitus ulcers. Exemplary decubitus ulcers may arise as a result of prolonged and unrelieved pressure over a bony prominence that leads to ischemia. The wound tends to occur in patients who are unable to reposition themselves to off-load weight, such as paralyzed, unconscious, or severely debilitated persons. As defined by the U.S. Department of Health and Human Services, the major preventive measures include identification of high-risk patients; frequent assessment; and prophylactic measures such as scheduled repositioning, appropriate pressure-relief bedding, moisture barriers, and adequate nutritional status. Treatment options may include for example, pressure relief, surgical and enzymatic debridement, moist wound care, and control of the bacterial load. In certain embodiments a method of treating a chronic wound is provided wherein the chronic wound is characterized by decubitus ulcer or ulceration, which results from prolonged, unrelieved pressure over a bony prominence that leads to ischemia.

Chronic wounds may also include arterial ulcers. Chronic arterial ulcers are generally understood to be ulcerations that accompany arteriosclerotic and hypertensive cardiovascular disease. They are painful, sharply marginated, and often found on the lateral lower extremities and toes. Arterial ulcers may be characterized by complete or partial arterial blockage, which may lead to tissue necrosis and/or ulceration. Signs of arterial ulcer may include, for example, pulselessness of the extremity; painful ulceration; small, punctate ulcers that are usually well circumscribed; cool or cold skin; delayed capillary return time (briefly push on the end of the toe and release, normal color should return to the toe in about 3 seconds or less); atrophic appearing skin (for example, shiny, thin, dry); and loss of digital and pedal hair. In certain embodiments a method of treating a chronic wound is provided wherein the chronic wound is characterized by arterial ulcers or ulcerations due to complete or partial arterial blockage.

Further exemplary chronic wounds may also include venous ulcers. Exemplary venous ulcers are the most common type of ulcer affecting the lower extremities and may be characterized by malfunction of the venous valve. The normal vein has valves that prevent the backflow of blood. When these valves become incompetent, the backflow of venous blood causes venous congestion. Hemoglobin from the red blood cells escapes and leaks into the extravascular space, causing the brownish discoloration commonly noted. It has been shown that the transcutaneous oxygen pressure of the skin surrounding a venous ulcer is decreased, suggesting that there are forces obstructing the normal vascularity of the area. Lymphatic drainage and flow also plays a role in these ulcers. The venous ulcer may appear near the medial malleolus and usually occurs in combination with an edematous and indurated lower extremity; it may be shallow, not too painful and may present with a weeping discharge from the affected site. In certain embodiments a method of treating a chronic wound is provided wherein the chronic wound is characterized by venous ulcers or ulcerations due to malfunction of the venous valve and the associated vascular disease. In certain embodiments a method of treating a chronic wound is provided wherein the chronic wound is characterized by arterial ulcers or ulcerations due to complete or partial arterial blockage.

Exemplary chronic wounds may also include venous stasis ulcers. Stasis ulcers are lesions associated with venous insufficiency are more commonly present over the medial malleolus, usually with pitting edema, varicosities, mottled pigmentation, erythema, and nonpalpable petechiae and purpura. The stasis dermatitis and ulcers are generally pruritic rather than painful. Exemplary venous stasis ulcers may be characterized by chronic passive venous congestion of the lower extremities results in local hypoxia. One possible mechanism of pathogenesis of these wounds includes the impediment of oxygen diffusion into the tissue across thick perivascular fibrin cuffs. Another mechanism is that macromolecules leaking into the perivascular tissue trap growth factors needed for the maintenance of skin integrity. Additionally, the flow of large white blood cells slows due to venous congestion, occluding capillaries, becoming activated, and damaging the vascular endothelium to predispose to ulcer formation. In certain embodiments a method of treating a chronic wound is provided wherein the chronic wound is characterized by venous ulcers or ulcerations due to malfunction of the venous valve and the associated vascular disease. In certain embodiments a method of treating a chronic wound is provided wherein the chronic wound is characterized by venous stasis ulcers or ulcerations due to chronic passive venous congestion of the lower extremities and/or the resulting local hypoxia.

Exemplary chronic wounds may also include diabetic ulcers. Diabetic patients are prone to ulcerations, including foot ulcerations, due to both neurologic and vascular complications. Peripheral neuropathy can cause altered or complete loss of sensation in the foot and/or leg. Diabetic patients with advanced neuropathy loose all ability for sharp-dull discrimination. Any cuts or trauma to the foot may go completely unnoticed for days or weeks in a patient with neuropathy. It is not uncommon to have a patient with neuropathy notice that the ulcer "just appeared" when, in fact, the ulcer has been present for quite some time. For patients of neuropathy, strict glucose control has been shown to slow the progression of the disease. Charcot foot deformity may also occur as a result of decreased sensation. People with "normal" feeling in their feet have the ability to sense automatically when too much pressure is being placed on an area of the foot. Once identified, our bodies instinctively shift position to relieve this stress. A patient with advanced neuropathy looses this ability to sense the sustained pressure insult, as a result, tissue ischemia and necrosis may occur leading to for example, plantar ulcerations. Additionally, microfractures in the bones of the foot, if unnoticed and untreated, may result in disfigurement, chronic swelling and additional bony prominences. Microvascular disease is one of the significant complications for diabetics, which may also lead, to ulcerations. In certain embodiments a method of treating a chronic wound is provided wherein the chronic wound is characterized by diabetic foot ulcers and/or ulcerations due to both neurologic and vascular complications of diabetes.

Exemplary chronic wounds can also include traumatic ulcers. Formation of traumatic ulcers may occur as a result of traumatic injuries to the body. These injuries include, for example, compromises to the arterial, venous or lymphatic systems; changes to the bony architecture of the skeleton; loss of tissue layers-epidermis, dermis, subcutaneous soft tissue, muscle or bone; damage to body parts or organs and loss of body parts or organs. In certain embodiments, a method of treating a chronic wound is provided wherein the chronic wound is characterized by ulcerations associated with traumatic injuries to the body.

Exemplary chronic wounds can include burn ulcers, including 1st degree burn (i.e. superficial, reddened area of skin); 2nd degree burn (a blistered injury site which may heal spontaneously after the blister fluid has been removed); 3rd degree burn (burn through the entire skin and usually require surgical intervention for wound healing); scalding (may occur from scalding hot water, grease or radiator fluid); thermal (may occur from flames, usually deep burns); chemical (may come from acid and alkali, usually deep burns); electrical (either low voltage around a house or high voltage at work); explosion flash (usually superficial injuries); and contact burns (usually deep and may occur from muffler tail pipes, hot irons and stoves). In certain embodiments, a method of treating a chronic wound is provided wherein the chronic wound is characterized by ulcerations associated with burn injuries to the body.

Exemplary chronic Wounds can include vasculitic ulcers. Vasculitic ulcers also occur on the lower extremities and are painful, sharply marginated lesions, which may have associated palpable purpuras and hemorrhagic bullae. The collagen diseases, septicemias, and a variety of hematological disorders (e.g., thrombocytopenia, dysproteinemia) may be the cause of this severe, acute condition.

Exemplary chronic wounds can include pyoderma gangrenosum. Pyoderma gangrenosum occurs as single or multiple, very tender ulcers of the lower legs. A deep red to purple, undermined border surrounds the purulent central defect. Biopsy typically fails to reveal a vasculitis. In half the patients it is associated with a systemic disease such as ulcerative colitis, regional ileitis, or leukemia. In certain embodiments, a method of treating a chronic wound is provided wherein the chronic wound is characterized by ulcerations associated with pyoderma gangrenosum.

Exemplary chronic wounds can include infectious ulcers. Infectious ulcers follow direct inoculation with a variety of organisms and may be associated with significant regional adenopathy. Mycobacteria infection, anthrax, diphtheria, blastomyosis, sporotrichosis, tularemia, and cat-scratch fever are examples. The genital ulcers of primary syphilis are typically nontender with a clean, firm base. Those of chancroid and granuloma inguinale tend to be ragged, dirty, and more extravagant lesions. In certain embodiments, a method of treating a chronic wound is provided wherein the chronic wound is characterized by ulcerations associated with infection.

The methods described herein are also useful in treating dehiscent wounds. Dehiscent wounds are usually surgical wounds, which have ruptured or split open. In certain embodiments, a method of treating a wound that does not heal at the expected rate is provided wherein the wound is characterized by dehiscence.

7. Methods of Treating or Preventing Skin Damage by Radiation

In other embodiments, the compositions described above and elsewhere herein are suitable for treating or preventing cell damage (e.g., skin cell damage) caused by radiation (e.g., ultraviolet radiation). Accordingly, the invention provides methods of treating or preventing skin damage to a subject by radiation, the method comprising administering to the subject the copper ion complex or a mixture of copper ion complexes as described herein, to thereby treat or prevent skin damage to the subject.

Ultraviolet (UV) radiation (for example, as radiated from the Sun), is known to generate ROS, such as superoxide anion, hydrogen peroxide and hydroxyl radical. Nucleotides are highly susceptible to free radical injury, and oxidation of nucleotide bases promotes mispairing ouside of normal Watson-Crick parameters, causing mutagenesis (see, Schulz I. et al., 2000, Mutat. Res., 461, 145-156). The extreme free radical scavenging activity of the copper ion complexes described herein, is useful in neutralizing free radicals caused by the ultraviolet radiation, and thus protects against DNA damage in addition to reducing the inflammatory pathways (thus relieving many of the negative symptoms of sunburn).

Furthermore, it is also known that UV irradiation of skin increases ROS and reactive nitrogen species, which both in turn inhibit DNA repair (see, Bau et al., et al., 2001, Carcinogen. 22:709-16). Therefore, the copper ion complexes of the invention enhance the cell's ability to perform effective DNA repair, through neutralizing the reactive oxygen species and reactive nitrogen species generated by the UV radiation (see, Rybchn, M. S. et al., 2018, J. Invest. Derm., 138:1146-56).

In some embodiments, the skin cells damaged by the radiation are primarily keratinocytes.

In some embodiments, the composition is administered topically.

In some embodiments, the composition is used as a preventive measure, to reduce the damage caused by premeditated exposure to radiation. In embodiments of this type, the composition may be administered before exposure to the radiation. For example, the composition may be applied to the subject at least 1 minute, 2 minutes, 3 minutes, 4 minutes, 5 minutes, 6 minutes, 7 minutes, 8 minutes, 9 minutes, 10 minutes, 15 minutes, or 20 minutes, before the subject is exposed to the radiation.

In some of the same embodiments and other embodiments, the composition is administered to the subject after the subject is exposed to the radiation. For example, the composition may be administered to the subject about 1 minute, 2 minutes, 3 minutes, 4 minutes, 5 minutes, 6 minutes, 7 minutes, 8 minutes, 9 minutes, 10 minutes, 15 minutes, or 20 minutes, or over 20 minutes after the subject is exposed to the radiation.

In some preferred embodiments, the subject undergoes a treatment regiment that includes a plurality of administrations of the composition in the first 30 minutes, 1 hour or 2 hours after the subject is exposed to the radiation. The treatment regimen may continue the continuous administration for up to 24 hours, or longer than 24 hours. By way of an illustrative example, the subject may be administered with the compositions every 10 minutes for the first hour, and then two, three or four times per day thereafter. Typically, the subject will continue administering the composition for about seven days, or until the skin physiology has returned to normal.

In some preferred applications of this aspect of the invention, the radiation is ultraviolet radiation, however, any type of radiation is expected to be as applicable (e.g., gamma radiation). The ultraviolet radiation may be UV-A or UV-B, or both UV-A and UV-B. In some of the same embodiments and some other embodiments, the ultraviolet radiation may be UV-C. For example, the ultraviolet radiation may be radiated from the Sun.

8. Sunscreen Compositions

In some embodiments, the compositions described herein may be used as an active ingredient in a sunscreen formulation. For example, the copper ion complex or mixture of copper ion complexes may be formulated together with an organic chemical compound that absorbs UV light; an inorganic particulate that reflects, scatters, and/or absorbs UV light (such as titanium dioxide and zinc oxide); and/or an organic particulate that significantly absorbs UV radiation, and contains multiple chromophores that reflect and scatter a fraction of radiation like inorganic particulates.

Organic chemical compounds that are currently used in commercially available sunscreens, and that would be suitable for formulating with the copper ion complexes described above and elsewhere herein (and with maximum suitable amounts of each sunscreen in % wt/wt listed following the sunscreen), include but are not limited to, amino benzoic acid (about 15%), avobenzone (about 3%), cinoxate (about 3%), octyl methoxycinnamate (about 10%), homosalate (about 15%), meradimate (about 5%), octocrylene (about 10%), octinoxate (about 7.5%), oxybenzone (about 6%), dioxybenzone (about 3%), padimate O (about 8%), ensulizole (about 4%), sulisobenzene (about 10%), trolamine salicylate (about 12%), benzophenone (about 10%), benzylidine compounds (about 6%), butyl methoxydibenzoylmethane (about 5%), bis-ethylhexyloxyphenol methoxyphenyl triazine (about 10%), camphor benzalkonium methosulfate (about 6%), diethyl amino hydroxy benzoyl hexyl benzoate (about 10%), diethylhexyl butamido trazoine (about 10%), disodium phenyl dibenzylmidazole tetrasulfonate (about 10%), drometrizole trisiloxane (about 15%), ethylhexyl dimethyl para-amino benzoic acid (about 8%), ethylhexyl methoxycinnamate (about 10%), ethylhexyl salicylate (about 5%), ethylhexyl triazone (about 5%), isoamyl p-methoxycinnamate (about 10%), 4-methylbenzylidene camphor (about 10%), methylene bis-benzotriazolyl tetramethylbutylphenol (about 10%), PEG-25 paramainobenzoic acid (about 5%), phenylbenziamido methylbenzylidene camphor (about 6%) polysilicone-15 terephthalylidene dicamphor sulfonic acid (about 10%), bet, 2-glucopyranoxy propyl hydroxyl benzophenone (about 5%), butyl methoxydibenzoylmethane (about 10%), diisopropyl methyl cinnamate (about 10%), dimethoxyphenyl-[1-(3,4)-4,4-dimethyl]1,3 pentanedione (about 7%), ethylhexyl dimethyloxy benzylidene dioxoimidazoline propionate (about 3%), ferulic acid (about 10%), glyceryl ethylhexanoate dimethoxycinnamate (about 10%), glycerol para-aminobenzoic acid (about 10%), phenylbenzimidazole sulfonic acid (about 3%) and any combination of any of the foregoing. The above list is not an exhaustive list of organic sunscreens and those of skill in the art may consider the use of other organic sunscreens. The amounts listed in the preceding list are for each sunscreen individually. In some embodiments in which a plurality of sunscreens are used the total combined amount of an sunscreen should be less or equal to the sum of the maximum suitable amounts for each component sunscreen.

Their efficacious wavelength range and preferred amounts of these organic compounds, when used in conventional sunscreens, are as follows: amino benzoic acid, 260 nm-313 nm, about 5% to about 15%; padimate O, 290 nm-315 nm, about 1.4% to about 8%; dioxybenzone, 260 nm-380 nm, about 1% to about 3%; oxybenzone. 270 nm-350 nm, about 2% to about 6%; sulisobenzone, 260 nm-375 nm; about 5% to about 10%; cinoxate, 270 nm-328 nm, 1% to about 3%; octocrylene, 250 nm-360 nm, 7% to about 10%; avobenzone, 320 nm-400 nm, 1% to about 3%; octyl salicylate, 280 nm-320 nm, 3% to about 5%; homosalate, 295 nm-315 nm, 4% to about 15%; trolamine salicylate, 260 nm-320 nm, 5% to about 12%; octinoxate, 290 nm-320 nm, 2% to about 7.5%. In preferred embodiments, at least two sunscreens are used where the first sunscreen has an efficacious wavelength range that includes about 260 nm to about 300 nm and the second sunscreen has an efficacious wavelength range that includes about 320 nm to about 370 nm.

Although a organic compound may be used, typically a combination of organic compounds will be used as each compound has a characteristic wavelength range in which it affords protection. Typically, that range is less than the entire range for which protection is desired. Thus, use of a combination of organic compounds generally provides protection over a wider range of wavelengths. Additionally, efficacy of protection is also related to the concentration of organic compound in the formulation. As regulatory agencies limit the amount of each sunscreen compound that can be used, the use of multiple sunscreens may improve protection level while maintaining regulatory compliance.

The use of avobenzone is particularly desirable for UVA protection as it is efficacious in the range of about 320 nm to 400 nm, a range in which most sunscreens provide limited to no protection.

Inorganic compounds, such as titanium dioxide and/or zinc oxide, are also known to be formulated in conventional sunscreens. Such compounds may be used in amounts of about 2% to about 25% (wt/wt) with higher amounts providing higher levels of protection. Unfortunately, although higher amounts of the inorganic oxides provide better protection, they typically also impart a thick layer of white material to the skin surface which is generally undesirable (particularly when applied to areas of the body such as lips). Thus for some sunscreen formulations, inorganic sunscreens may be used in amounts of less than about 15% (wt/wt) total amount of inorganic sunscreen; alternatively less than about 10%, and alternatively less than about 5%. To achieve the desired protection level, inorganic sunscreens are often formulated in combination with organic sunscreens to obtain efficacious protection.

Typical sunscreens are often formulated with wax or other pharmaceutically acceptable vehicles, emollients, oils and, optionally, one or more medicaments and/or other active agents and/or one or more beneficial agents.

Waxes and/or oils and/or semisolid hydrocarbon materials typically provide the lip protectant and/or occlusive properties associated with a lip treatment and/or lipbalm. Furthermore, the waxes and/or oils and/or semisolid hydrocarbon materials function as skin conditioning agents and skin protectants. Exemplary skin conditioning agents include hydrogenated poly(C6-14 olefin), isopropyl myristate, paraffin, beeswax, perfluorononyl dimethicone, Coenzyme Q10 formulations and *Spilanthes acmella* flower extract formulations. An exemplary skin protectant is dimethicone. Waxes also typically serve as structurants for stick lip balms permitting the stick to be extended and retracted in use while maintaining the stick form. Suitable waxes for stick compositions include animal waxes, plant waxes, mineral waxes, silicone waxes synthetic waxes and petroleum waxes. Exemplary specific waxes and amounts used include, but are not limited to, carnauba wax (about 0.1 to about 5%); paraffin wax (about 10 to about 40%); white wax (about 0.5 to about 10%); candelilla wax (about 0.1 to about 10%); beeswax (about 1% to about 50%), jojoba wax (about 0.1 to about 10%), ozokerite (about 0.1 to about 10%), polyethylene (about 0.1 to about 10%) and combinations thereof. The above list is not an exhaustive list of waxes, oils, semisolid hydrocarbon materials, skin conditioning agents and skin protectants and those of skill in the art may consider the use of other waxes, oils, semisolid hydrocarbon materials, skin conditioning agents and skin protectants.

In some embodiments, it is preferable that a portion of the oil be silicon oil as it facilitates persistence of the composition on the lips and provides for moisturization, a smooth feel and ease of spreading. Some silicon oils such as dimethicone, for example, also provide protectant properties. In an exemplary embodiment dimethicone may be used in an amount of about 0.15% to about 6%, alternatively about 1% to about 3.5% and alternatively about 1.5% to about 3.5%; and/or perfluorononyl dimethicone may be used in an amount of about 0.05 to about 6%, alternatively about 0.1% to about 5% and alternatively about 0.3% to about 5%. In some embodiments in which dimethicone and/or fluorosilicone are used it is desirable to mix them with a solubilizing agent such as hydrogenated poly decene prior to combining them with other waxes and oils.

The composition may further comprise moisturizing oils. Exemplary moisturizing oils suitable for use in the composition included, but are not limited to, sunflower oil, coconut oil, castor oil, vegetable oil, corn oil, aloe vera oil, canola oil, soybean oil, jojoba oil, olive oil, babassu oil, avocado oil, apricot oil, meadowfoam seed oil, macadamia seed oil, oat kernel oil, palm seed oil, safflower oil, sandalwood oil, sesame oil, almond oil, wheat germ oil, cranberry oil and combinations thereof. The above list is not an exhaustive list of moisturizing oils and those of skill in the art may consider the use of other moisturizing oils. Oils may be included in the composition in amounts of about 1% to about 65%.

Kits

Any of the compositions or components described herein may be comprised in a kit. In non-limiting examples, materials and reagents required for administering a copper ion complex or mixture of copper ion complexes as described herein may be assembled together in a kit.

The components of the kits may be packaged either in aqueous media or in lyophilized form. The container means of the kits will generally include at least one vial, test tube, flask, bottle, syringe or other container means, into which a component may be placed, and preferably, suitably aliquoted. Where there is more than one component in the kit (labeling reagent and label may be packaged together), the kit also will generally contain a second, third or other additional container into which the additional components may be separately placed. However, various combinations of components may be comprised in a vial. The kits of the present invention also will typically include a means for containing the copper ion complex or mixture of copper ion complexes, and any other reagent containers in close confinement for commercial sale. Such containers may include injection or blow molded plastic containers into which the desired vials are retained.

When the components of the kit are provided in one and/or more liquid solutions, the liquid solution is an aqueous solution, with a sterile aqueous solution being particularly preferred.

However, the components of the kit may be provided as dried powder(s). When reagents and/or components are provided as a dry powder, the powder can be reconstituted by the addition of a suitable solvent. It is envisioned that the solvent may also be provided in another container means. In some embodiments, labeling dyes are provided as a dried power. It is contemplated that 10, 20, 30, 40, 50, 60, 70, 80, 90, 100, 120, 120, 130, 140, 150, 160, 170, 180, 190, 200, 300, 400, 500, 600, 700, 800, 900, 1000 µg or at least or at most those amounts of dried dye are provided in kits of the invention. The dye may then be resuspended in any suitable solvent, such as DMSO.

The kits may also comprise a second container means for containing a sterile, pharmaceutically acceptable buffer and/or or other diluent.

A kit will generally also include instructions for employing the kit components as well the use of any other reagent not included in the kit. Instructions may include variations that can be implemented.

The kit may comprise additional components to assist in performing the methods of the present invention such as, for example, administration device(s), buffer(s), and/or diluent(s). The kits may include containers for housing the various components and instructions for using the kit components in the methods of the present invention.

In order that the invention may be readily understood and put into practical effect, particular preferred embodiments will now be described by way of the following non-limiting examples.

EXAMPLES

Example 1

SOD Mimetic Activity of Copper Ion Complex RM191A

The purpose of these experiments was to measure the Superoxide Dismutase-like (SOD-like) activity of the copper ion complex (RM191A) depicted in the Examples below as "Cu". The inventors employed a modified version of the method described by Beauchamp and Fridovich (see, Beauchamp et al. 1971). The reason for this modification was to create a reaction mixture that successfully generates known quantities of the $O_2^-$ free radical but does so at a pH at which the copper ion complex is stable—specifically in the range pH 6.5-7.8.

In neutralizing the superoxide free radical, the SOD catalysis reaction may be represented by:

$$O_2^- + O_2^- + 2H^+ \rightarrow H_2O_2 + O_2$$

Because of the instability of its substrate, all available chemical assays of SOD and SOD-like activity are necessarily indirect and depend upon its ability to scavenge $O_2^-$ from reaction mixtures and thus to inhibit reactions caused by $O_2^-$.

NitroBlue Tetrazolium (NBT) was selected as an indicator to measure and compare the superoxide scavenging activities of both bovine SOD and the copper ion complex ("RM191A," the preparation of which is described in detail in International PCT Patent Publication No. WO/AU2016/201524), This assay utilizes photochemical events to generate $O_2^-$ in a sodium tetraborate buffered solution of acetone and isopropanol which is then irradiated by high energy UV light at 254 nm (Mercury Vapour Lamp) to create $O_2^-$ in the solution.

SOD and SOD-like substances inhibit the formation of the blue formazan by neutralising the superoxide free radicals as they are forming. Blue formazan has a characteristic UV absorbance at 560 nm. The quantitation of the UV absorbance of the reaction solution at 560 nm is a direct measure the SOD and SOD-like activity of a substance.

The reaction is as follows:

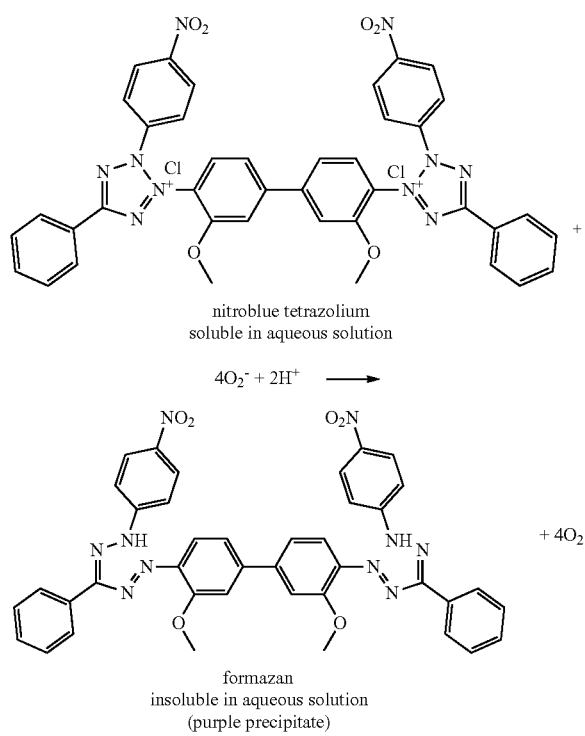

nitroblue tetrazolium
soluble in aqueous solution $4O_2^- + 2H^+$ ⟶ formazan
insoluble in aqueous solution
(purple precipitate)

$+ 4O_2$

UV absorbances of the reaction solutions were measured at 560 nm following irradiation with UV light to determine the superoxide free radical scavenging activity in situ of both bovine SOD and the copper ion complex (RM191A).

Methods

Each reaction solution consists of 0.5 ml of 200 μmol/L NBT in borate buffer (pH=7.1) and 0.5 ml of a 200 μmol/L solution of the test compound in 5.0 mL of 5 mol/L isopropanol.

To each reaction vessel 15 mg acetone (20 μL) as added to begin the reaction. Each vessel was then irradiated with UV light at 254 nm (mercury vapour lamp) for 1 minute.

The reaction solution was then transferred into UV Vis cells and the absorbance at 560 nm was measured.

A number of test solution concentrations were assayed by adding, 1.0, 1.25, 1.5, 1.75, 2.0 mL of a 200 μmol/L solution of the test compound and bringing the total volume to 5.0 mL with 5 mol/L isopropanol.

TABLE 1

REACTION SOLUTION CONCENTRATIONS

| Reagent | Concentration (M) | Volume (mL) | M.W. | Density (g/mL) | pH |
|---|---|---|---|---|---|
| NBT | 0.2 | 0.5 | 817.64 | — | 7.8 |
| SOD | 0.2 | 0.5 | 32,500 | — | 7.8 |
| Cu | 0.2 | 0.5 | 127 | — | 6.8 |
| Acetone | 15 mg | 0.00002 | 58.08 | 0.785 | — |
| Isopropanol | 5 | 2 | 60.1 | 0.785 | — |

Total Vol=5 mL borate buffer (sodium tetraborate)

Results

The method uses a Cu control to remove the minor background copper absorbance. These data represent duplicate analyses, where the results are averaged and Standard Deviation calculated.

TABLE 2

CU COMPLEX (RM191A) PRIMARY DATA

| | Absorbance | | |
|---|---|---|---|
| Molarity | 559.964 nm | Cu Cntrl 560 nm | Cu Subtract |
| 0.0000016 | 0.620005429 | 0.002993 | 0.617012428 |
| 0.0000016 | 0.577356756 | 0.002993 | 0.574363755 |
| 0.00002 | 0.066124484 | 0.030323343 | 0.035801141 |
| 0.00002 | 0.054080654 | 0.030323343 | 0.023757311 |
| 0.00004 | 0.092193432 | 0.085006595 | 0.007186837 |
| 0.00004 | 0.092672534 | 0.085006595 | 0.00766594 |
| 0.00008 | 0.188593045 | 0.172021911 | 0.016571134 |
| 0.00008 | 0.175874755 | 0.172021911 | 0.003852844 |
| 0.0001 | 0.330817819 | 0.348536104 | −0.017718285 |
| 0.0001 | 0.338331401 | 0.348536104 | −0.010204703 |
| 0.00012 | 0.426666528 | 0.429085076 | −0.002418548 |
| 0.00012 | 0.422661394 | 0.429085076 | −0.006423682 |
| 0.00014 | 0.500377715 | 0.509390771 | −0.009013057 |

TABLE 3

SOD PRIMARY DATA

| | Absorbance | |
|---|---|---|
| Molarity | 560 nm Ave | 560 nm STD |
| 0.0000016 | 0.298784509 | 0.021581056 |
| 0.00002 | 0.287949774 | 0.02282401 |
| 0.00004 | 0.234830945 | 0.012912599 |
| 0.00008 | 0.332023822 | 0.027191065 |
| 0.0001 | 0.316250565 | 0.032623967 |
| 0.00012 | 0.321532415 | 0.021445615 |
| 0.00014 | 0.355489785 | 0.008396117 |

TABLE 4

CU DATA (STANDARDIZED)

| | Absorbance | |
|---|---|---|
| Molarity | 560 nm Ave | 560 nm STD |
| 0.0000016 | 0.595688092 | 0.021324337 |
| 0.00002 | 0.029779226 | 0.006021915 |
| 0.00004 | 0.007426389 | 0.000239551 |
| 0.00008 | 0.010211989 | 0.006359145 |
| 0.0001 | −0.013961494 | 0.003756791 |
| 0.00012 | −0.004421115 | 0.002002567 |
| 0.00014 | −0.003404081 | 0.005608976 |

TABLE 5

| µM | SOD | Cu | Cu | Cu Average | Fold difference over SOD |
|---|---|---|---|---|---|
| 1.6 | 0.298784509 | 0.595688092 | 0.595688092 | 0.595688092 | 0.50 |
| 20 | 0.287949774 | 0.029779226 | 0.029779226 | 0.029779226 | 9.67 |
| 40 | 0.234830945 | 0.007426389 | 0.007426389 | 0.007426389 | 31.62 |
| 80 | 0.332023822 | 0.010211989 | 0.010211989 | 0.010211989 | 32.51 |

These data demonstrate that at concentrations exceeding 5 µM the activity of RM191A (Cu complex) exceeds that of SOD by a multiple of from 10-30 times. This represents a significant difference, demonstrating that RM191A has unexpected and surprising SOD-like activity. These copper ion complexes can be described as a "super-antioxidant" relative to all other known antioxidants.

This extreme free radical scavenging activity, combined with its demonstrated safety in humans and other mammals when applied topically, is likely to lead to the generation of a new class of drug. Such drugs have an ability to neutralise free radicals as they are forming and inhibit or even block the inflammatory cascade at its outset.

Example 2

Confirming Potent Antioxidant and Anti-Inflammatory Properties of RM191A

Figure 2:
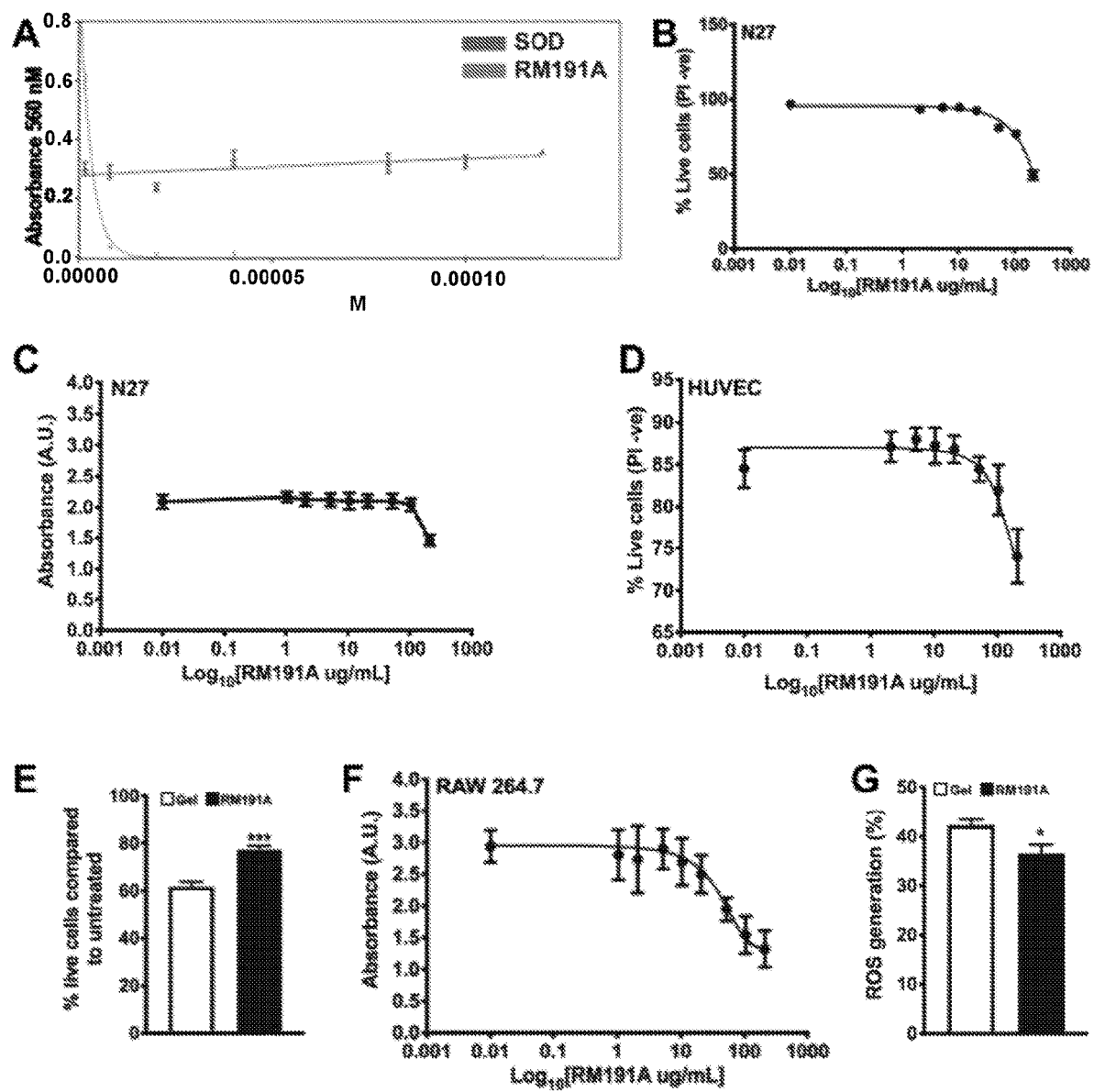
FIG. 2: RM191A has potent antioxidant and anti-inflammatory properties
(A) Comparison of superoxide scavenging activities of both bovine SOD and RM191A. (B) Dose dependent curve of RM191A for N27 cells, as measured by PI exclusion (PI-ve) in flow cytometry. (C) Dose dependent curve of RM191A for N27 cells, as measured by MTT assay. (D) Dose dependent curve of RM191A for HUVEC, as measured by P1 exclusion (PI-ve) in flow cytometry. (E) Percentage live N27 cells, as measured by P1 exclusion (PI-ve) in flow cytometry, exposed to 200 µM hydrogen peroxide for 30 minutes and then treated with 21 µg/mL RM191A Gel or gel for 4 hours. (F) Dose dependent curve of RM191A for RAW264.7 cells, as measured by MTT assay (G) Amount of ROS generated by RAW 264.7 cells, as measured by CM-H$_2$DCFDA fluorescence in flow cytometry, upon LPS stimulation and followed by treatment with RM191A Gel or gel only.

The presence of unique $Cu^{2+}/Cu^{3-}$ dipoles in RM191A led us to postulate that RM191A would be a highly efficient free radical scavenger which could act in a similar manner to SOD. To prove our hypothesis, we measured and compared the superoxide scavenging activities of both bovine SOD and RM191A using a well-established assay described above (and as described in Beauchamp et al., 1971). At 20 µM concentration, RM191A was 10 times more effective than SOD at neutralising superoxide free radicals (FIG. 2A). With increasing concentration, the activity of RM191A exceeded that of SOD by 30 times.

After confirming the SOD-like antioxidant activity of RM191A, we investigated its protective effects in cells. For all subsequent experiments reported herein, 5% RM191A was dissolved in a 1% hyaluronic acid-based hydrogel (RM191A Gel).

First, we determined RM191A Gel's toxicity in cells. Upon treatment of N27 cells, an immortalized rat dopaminergic neuronal cell line (Holmes et al., 2013), with different concentrations of RM191A Gel and measuring the percentage of live cells by flow cytometry or MTT assay, the LD50 of RM191A Gel was observed to be 210 µg/mL (FIGS. 2B and 2C). Similarly, LD50 of RM191A Gel for human umbilical vein endothelial cells (HUVEC) was 210 µg/mL (FIG. 2D). In order to determine if RM191A Gel could protect cells from ROS-mediated oxidative stress, N27 cells were first exposed to 200 µM hydrogen peroxide for 30 minutes and then treated with 21 µg/mL RM191A Gel (hydrogel as control) for 4 hours. RM191A Gel treatment increased the viability of cells by 24%, when measured by flow cytometry, compared to the control (FIG. 2E).

ROS are known to mediate inflammatory responses induced by a variety of stimuli including lipopolysaccharide (LPS) (see, Hsu et al., 2002; and Lee et al., 2009). Treatment of macrophage-like RAW 264.7 cells with SOD decreases LPS-induced ROS generation and upregulation of several inflammatory genes (Lee et al., 2009; and Ferret et al., 2002). To investigate if RM191A has similar effects, at first, we determined its toxicity in RAW 264.7 cells using flow cytometry and MTT assay. The LD50 of RM191A was 85 µg/mL in both assays (see, FIG. 2F). Next, RAW 264.7 cells were stimulated with LPS (10 ng/mL) and then treated with RM191A Gel or gel only. The amount of ROS was measured by flow cytometry. LPS stimulation increased the ROS by 42%, however, treatment with RM191A decreased ROS levels to 36% (see, FIG. 2G).

Figure 3:
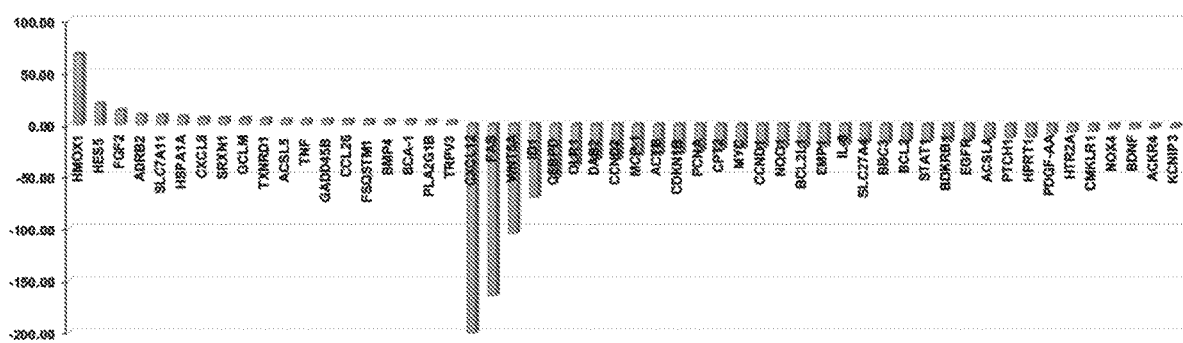
FIG. 3. Fold change in gene expression in primary human fibroblasts treated with RM191A Gel in comparison to gel treatment.

The inventors hypothesized that RM191A could also affect the expression of inflammatory genes. To investigate this, primary human fibroblasts were treated with RM191A and fold change in gene expression compared to control was determined using PCR arrays, RM191A suppressed the genetic expression of many inflammatory cytokines, including CXCL12, MCP-1, IL-6, VEGF-A, as well as that of genes that mediate inflammation, such as FAS and CEBPD (see, FIG. 3A and Table 6). Significantly, expression of FGF-2 and heme oxygenase (HMOX1), both of which have anti-inflammatory activities, were upregulated by RM191A treatment (see, FIG. 2F and Table 6).

TABLE 6

FOLD CHANGE IN GENE EXPRESSION IN RM191A GEL-TREATED PRIMARY HUMAN FIBROBLASTS COMPARED TO GEL-TREATED CONTROL

| Gene/Cytokne | Fold Change |
|---|---|
| HMOX1 | 67.56 |
| HES5 | 19.81 |
| FGF2 | 13.65 |
| ADRB2 | 9.20 |
| SLC7A11 | 8.53 |
| HSPA1A | 7.45 |
| CXCL8 | 6.31 |
| SRXN1 | 6.18 |
| GCLM | 5.75 |
| TXNRD1 | 5.27 |
| ACSL5 | 4.59 |
| TNF | 4.53 |
| GADD45B | 4.51 |
| CCL26 | 4.25 |
| FSQSTM1 | 4.16 |
| BMP4 | 4.12 |
| BCA-1 | 4.00 |
| PLA2G1B | 3.62 |
| TRPV3 | 3.03 |
| CXCL12 | −598.57 |
| FAS | −163.83 |
| WNT5A | −105.13 |
| ID1 | −70.04 |
| CEBPD | −51.88 |
| OLR1 | −39.26 |
| DAB2 | −33.73 |
| CCND2 | −32.95 |
| MCP-1 | −29.77 |
| ACTB | −29.26 |
| CDKN1B | −28.17 |
| PCNA | −25.87 |
| CPT2 | −24.00 |
| MYC | −22.57 |
| CCND1 | −22.53 |
| NQO1 | −22.36 |
| BCL2L1 | −22.01 |
| EMP1 | −21.39 |

TABLE 6-continued

FOLD CHANGE IN GENE EXPRESSION IN RM191A
GEL-TREATED PRIMARY HUMAN FIBROBLASTS
COMPARED TO GEL-TREATED CONTROL

| Gene/Cytokne | Fold Change |
| --- | --- |
| IL-6 | −19.44 |
| SLC27A4 | −17.72 |
| BBC3 | −17.20 |
| BCL2 | −16.51 |
| STAT1 | −16.48 |
| BDKRB1 | −15.98 |
| EGFR | −15.22 |
| ACSL4 | −13.44 |
| PTCH1 | −12.56 |
| HPRT1 | −11.96 |
| PDGF-AA | −8.27 |
| HTR2A | −7.00 |
| CMKLR1 | −6.33 |
| NOX4 | −3.90 |
| BDNF | −3.85 |
| ACKR4 | −3.30 |
| KCNIP3 | −3.04 |

These combined data demonstrate that RM191A acts a potent antioxidant and anti-inflammatory agent in biological systems.

Example 3

RM191A Protects Skin Against UV-Induced Oxidative Stress and DNA Damage

Exposure of skin to UV radiation induces oxidative stress via a dramatic increase in ROS (see, Dunaway et al., 2018). In this section of the research work we measured oxidative DNA damage caused by UV-induced cyclobutene pyrimidine dimers (CPD), oxidative DNA damage resulting from UV-induced 8-oxo-guanine (8-oxoG), and nitrosative DNA damage caused by 8-nitroguanine (8NG) (Mason et al., 2013). Typically, if these DNA lesions are not adequately repaired, they lead to mutations which may then lead to the development of skin tumours (Mason et al., 2013). Our primary objective here was to determine if RM191A, when applied topically to ex vivo human skin, reduced UV-induced DNA damage.

Human skin was either pre-treated with RM191A Gel (RM191A Gel 1), followed by exposure to UV radiation or it was post-treated with RM191A Gel (RM191A Gel 2), immediately after UV exposure. The same treatment protocols were also followed for a placebo gel which contained no RM191A. An active form of vitamin D, 1,25-dihydroxy vitamin D3 (1,25D), was used as a positive control in these experiments as it has previously been shown that topical application of 1,25D reduces UV-induced DNA damage in human skin cells, human skin explants and human subjects, and reduces UV-induced skin tumours in mice (Gupta et al, 2007; and Dixon et al., 2011).

Cyclo Pyrimidine Dimers (CPD) in the Epidermis

Figure 4:
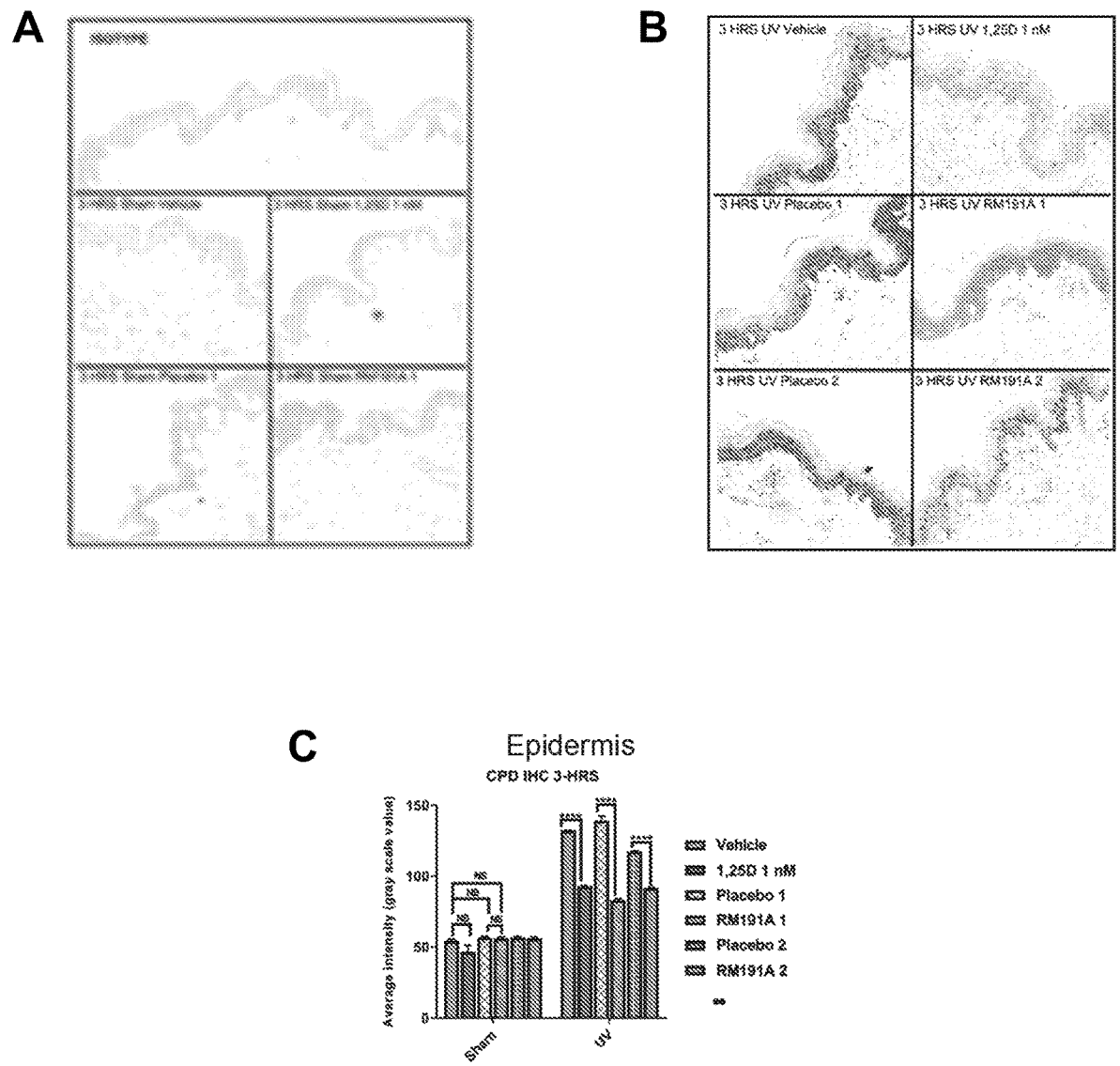
FIG. 4: RM191A protects against UV-induced oxidative stress. (A) Representative images of immunohistochemical staining of CPDs in human explants from isotype control and sham exposed explants. There was little staining in the isotype control. Sham irradiated skin showed low levels of nuclear staining. (B) Representative images of immunohistochemical staining of CPDs in human skin explants from UV-exposed explants. (C) Analysis of CPD in epidermis of skin explants. Bars indicate significant differences **** p<0.001; NS=not significant between data sets (n=3 explants per data point).

Staining for CPD, was virtually absent in the isotype control, and the intensity of nuclear staining was low in the sham exposed explants, indicating very few CPDs (see, FIG. 4A). This was expected, since exposure to UV was the major source of the energy required to produce CPD. Exposure to UV significantly increased CPD in UV-vehicle or UV-placebo gel groups compared with their respective sham controls. (compare FIG. 4B and FIG. 4A). Both the treatment of UV-exposed explants with 1,25D and RM191A Gel (RM191A Gel 2) decreased CPD by 30% compared to their UV-exposed controls (see, FIG. 4C). When pre-treated with RM191A Gel (RM191A Gel 1), CPD decreased by 37% compared to its pre-treatment control (see, FIG. 4C).

8-oxo-guanine 8-oxoG in the Epidermis

The intensity of nuclear 8-oxoG staining was moderate in the sham exposed explants treated with vehicle or 1,25D (see, FIG. 5A) due to the fact that culture of the explants engendered some oxidative stress. Markedly increased cytoplasmic staining was seen in explants which were sham exposed and treated with either placebo gel or RM191A Gel (see, FIG. 5A). Because of this high level of cytoplasmic staining, which was also observed in UV exposed explants, for the analysis, two separate masks (cytoplasmic and nuclear) were created using the Metamorph image analysis program and only the nuclear staining was imaged, so as not to include this strong background, non-specific cytoplasmic stain.

Exposure to UV significantly increased nuclear 8-oxoG in UV-vehicle or UV-placebo gel groups compared with their respective sham controls. (compare FIG. 5A and FIG. 5B). Treatment of UV-exposed explants with 1,25D decreased nuclear 8-oxoG by 27% compared to their UV-exposed controls. Treatment with RM191A (RM191A Gel 2) was found to decrease 8-oxoG levels by 33%, which was even further reduced by 55% in the RM191A pre-treated group (RM191A Gel 1), when compared to their UV-exposed controls (see, FIG. 5B). Interestingly, oxidative DNA damage in the nuclei of epidermal cells was lower in RM191A Gel-treated sham explants compared to placebo gel-treated sham wells, indicating that RM191A was able to reduce even basal oxidative damage (see, FIG. 5C).

8-oxo-guanine (8-oxoG) in the Dermis

Figure 5:
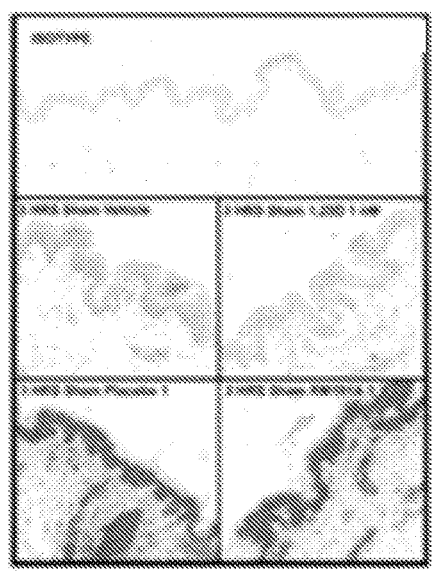
FIG. 5. (A) Representative images of immunohistochemical staining of 8-oxoG in human explants from isotype control and sham exposed explants. (B) Representative images of immunohistochemical staining of 8-oxoG in human skin explants from UV-exposed explants. (C-D) Analysis of 8-oxoG in (C) epidermis and (D) dermis of skin explants. Bars indicate significant differences **** p<0.001; NS=not significant between data sets (n=3 explants per data point).
Figure 5:
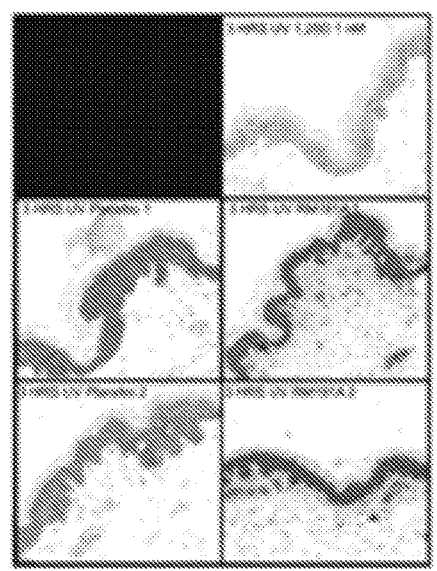
Figure 5:
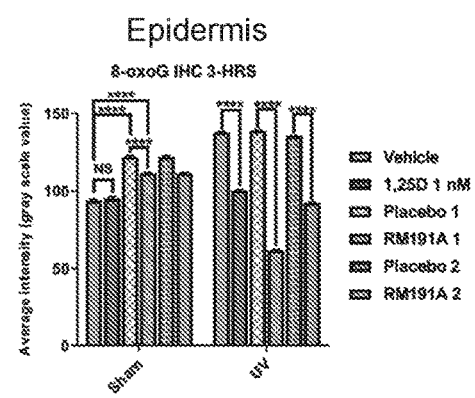
Figure 5:
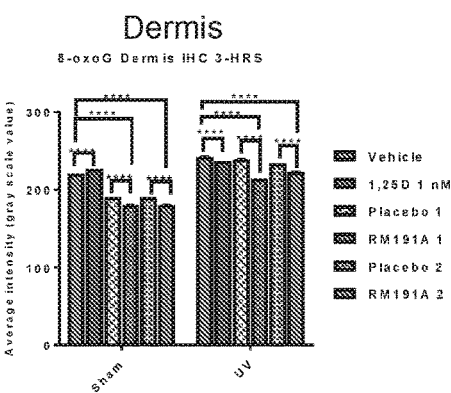

There were far fewer cells in the dermis of the explants, but an analysis was performed on the intensity of staining in the nuclei of cells of the upper dermis. Nuclear staining for 8-oxoG was overall lower in the dermis of sham exposed explants than in UV-exposed explants but was not negligible (see, FIG. 5D). Pre-treatment of sham explants with RM191A Gel significantly reduced 8-oxoG staining. Nuclear stain for 8-oxoG was significantly increased in the dermis in vehicle or placebo gel treated UV-exposed explants, compared with sham exposed controls, though the fold increase with UV was not as great as seen in the epidermis, probably reflecting reduced penetration of UV into the dermis. Nevertheless, as shown in FIG. 5D, each of the active treatments significantly reduced 8-oxoG in the dermis.

8-Nitroguanine (8NGO in the Epidermis and Dermis

Figure 6:
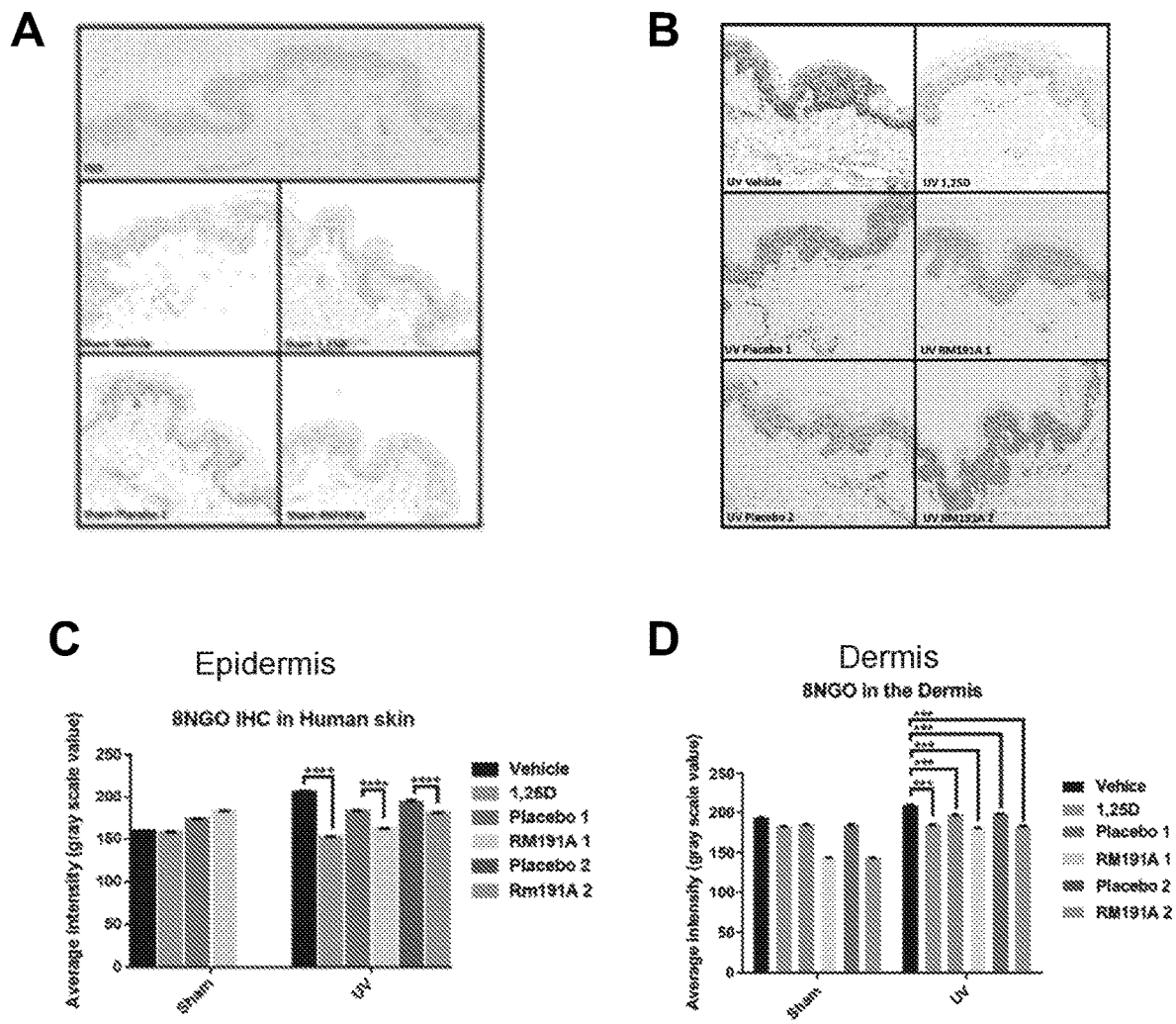
FIG. 6. (A) Representative images of immunohistochemical staining of 8NGO in human explants from isotype control and sham exposed explants. (B) Representative images of immunohistochemical staining of 8NGO in human skin explants from UV-exposed explants. (C-D) Analysis of 8NGO in epidermis (C) and dermis (D) of skin explants. Bars indicate significant differences **** p<0.001; NS=not significant between data sets (n=3 explants per data point).

Similar to 8-oxoG staining, exposure to UV significantly increased nuclear 8-NGO staining in UV-vehicle and UV-placebo gel groups, in both epidermis and dermis, compared with their respective sham controls (compare FIG. 6A and FIG. 6B). As shown in FIG. 6B, treatment of UV-exposed explants with 1,25D or with RM191A using either protocol significantly decreased 8NGO compared with their UV-exposed controls. Again, pre-treatment of UV-exposed explants with RM191A was more effective at reducing nitrosative DNA damage than RM191A Gel post-treatment.

Overall the data above indicate that topical application of RM191A Gel, with either of the two protocols, beneficially and significantly reduced three types of UV-induced DNA damage in human skin explants in both the epidermis and dermis. This reduction in DNA damage was a statistically significant improvement over that produced by a well-established photoprotective agent, 1,25D. Furthermore, we discovered notably enhanced reduction of oxidative DNA damage in the epidermis over the 1,25D standard when RM191A Gel was applied prior to exposure to UV.

Example 4

RM191A Toxicity Studies

In Viva Toxicity

After determining the biological activities of RM191A in cells and skin explants, we sought to determine if these effects can translate in vivo.

Firstly, we used mouse models to test if RM191A has any toxicity in animals. In order to confirm that there was no overt toxicity in the tissues, wet tissue weights were measured, and no differences were observed (Table 7). Furthermore, histological analyses of these tissues by hematoxylin and eosin (H&E) staining showed normal morphology across all groups (data not shown).

TABLE 7

TISSUE WEIGHTS (G) IN MICE TREATED WITH TOPICAL DOSES OF RM191A GEL OR GEL ONLY (CONTROL) FOR 29 DAYS

| Tissues | No gel (n = 4) | Gel (n = 9) | RM191A (n = 9) |
|---|---|---|---|
| Thymus | 0.025 ± 0.003 | 0.025 ± 0.003 | 0.023 ± 0.005 |
| Heart | 0.131 ± 0.008 | 0.141 ± 0.016 | 0.139 ± 0.014 |
| Liver | 1.1229 ± 0.052 | 1.213 ± 0.115 | 1.156 ± 0.136 |
| Spleen | 0.074 ± 0.003 | 0.067 ± 0.007 | 0.069 ± 0.013 |
| Kidney | 0.152 ± 0.012 | 0.167 ± 0.016 | 0.174 ± 0.011 |
| Lymph Nodes | 0.020 ± 0.004 | 0.018 ± 0.004 | 0.016 ± 0.004 |
| Gastrocnemius | 0.160 ± 0.004 | 0.162 ± 0.009 | 0.163 ± 0.012 |
| Quadriceps | 0.193 ± 0.023 | 0.195 ± 0.023 | 0.192 ± 0.022 |
| Testes | 0.113 ± 0.007 | 0.106 ± 0.009 | 0.104 ± 0.006 |
| Brain | 0.413 ± 0.025 | 0.435 ± 0.015 | 0.448 ± 0.024 |

Materials & Methods

Acute Toxicity

Figure 7:
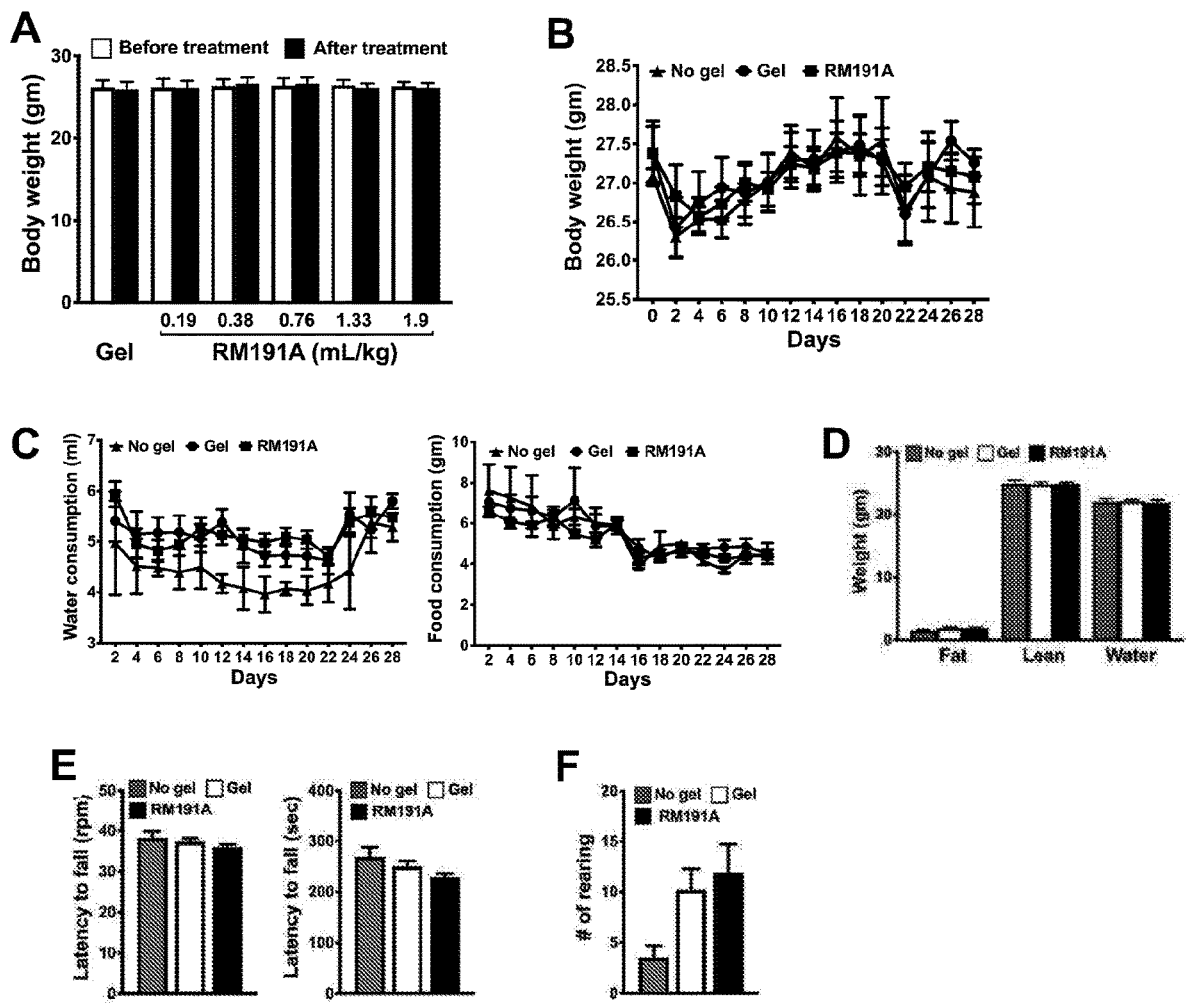
FIG. 7: RM191A is readily bioavailable, attenuates inflammation. (A) Body weights (g) of mice treated with different topical doses of RM191A Gel or gel only (control) for 4 days. (B) Body weights (g) in mice treated with topical doses of RM191A Gel or gel only (control) for 29 days. (C) Water and food consumption, and (D) EchoMRI of mice treated with topical doses of RM191A Gel or gel only (control) for 29 days. (E) Rotarod performance of mice treated with topical doses of RM191A Gel or gel only (control) for 29 days. (F) Rearing behaviour of mice treated with topical doses of RM191A Gel or gel only (control) for 29 days.

The dorsal surfaces of 12 week old male mice were shaved and 50 µL of RM191A Gel at different doses (0.19-1.9 mL/kg body weight) was applied topically daily for 4 days. We found that there were no significant changes in the body weight and tissue weights of these animals compared to vehicle control (gel only) after 4 days of topical treatment (see, FIG. 7A and Table 8), implying that short-term treatment of RM191A Gel is well tolerated in mice up to a concentration of 1.9 mL/kg body weight. This maximum dosage translates to topical applications of 120 mL daily in a 75 kg human.

TABLE 8

TISSUE WEIGHTS (G) IN MICE TREATED WITH DIFFERENT TOPICAL DOSES OF RIM91A GEL OR GEL ONLY (CONTROL) FOR 4 DAYS

| Tissues | Group 1 (n = 5) | Group 2 (n = 5) | Group 3 (n = 5) | Group 4 (n = 5) | Group 5 (n = 6) | Group 6 (n = 5) |
|---|---|---|---|---|---|---|
| Thymus | 0.025 ± 0.006 | 0.024 ± 0.002 | 0.019 ± 0.004 | 0.020 ± 0.006 | 0.023 ± 0.003 | 0.022 ± 0.003 |
| Heart | 0.127 ± 0.011 | 0.138 ± 0.005 | 0.139 ± 0.011 | 0.139 ± 0.017 | 0.139 ± 0.015 | 0.137 ± 0.019 |
| Liver | 1.170 ± 0.143 | 1.076 ± 0.244 | 1.118 ± 0.259 | 1.249 ± 0.237 | 1.262 ± 0.112 | 1.282 ± 0.068 |
| Spleen | 0.068 ± 0.008 | 0.080 ± 0.010 | 0.080 ± 0.012 | 0.078 ± 0.006 | 0.074 ± 0.012 | 0.079 ± 0.013 |
| Kidney | 0.163 ± 0.020 | 0.169 ± 0.012 | 0.170 ± 0.014 | 0.158 ± 0.019 | 0.152 ± 0.009 | 0.155 ± 0.004 |
| Lymph Nodes | 0.019 ± 0.004 | 0.016 ± 0.004 | 0.017 ± 0.001 | 0.019 ± 0.003 | 0.020 ± 0.002 | 0.021 ± 0.004 |
| Gastrocnemius | 0.150 ± 0.007 | 0.152 ± 0.014 | 0.154 ± 0.009 | 0.153 ± 0.015 | 0.148 ± 0.004 | 0.157 ± 0.015 |
| Quadriceps | 0.175 ± 0.014 | 0.168 ± 0.015 | 0.173 ± 0.028 | 0.203 ± 0.023 | 0.211 ± 0.013 | 0.190 ± 0.015 |
| Testes | 0.098 ± 0.012 | 0.095 ± 0.006 | 0.097 ± 0.006 | 0.094 ± 0.009 | 0.100 ± 0.005 | 0.093 ± 0.018 |
| Brain | 0.432 ± 0.030 | 0.437 ± 0.043 | 0.466 ± 0.031 | 0.452 ± 0.022 | 0.439 ± 0.011 | 0.438 ± 0.010 |

Chronic Toxicity

Next, we studied if RM191A Gel was also well tolerated in long-term treatment. As previously, the dorsal area of 8 week old mice was shaved, and the animals were either left untreated or treated topically daily with 50 µL of vehicle gel or RM191A Gel at 0.19 mL/kg body weight for 29 days. No significant changes in body weight, water intake and food intake were observed between the three groups (see, FIG. 7B, 7C). The fat content, lean mass and water content, as measured using EchoMRI, were similar among these three groups (see, FIG. 7D).

Behavioural/Neurological Toxicity

After confirming that RM191A Gel treatment did not have any adverse impact on the general health of mice, we explored if its exposure altered the behaviour of mice. In a standard rotarod test, the animals from all three groups performed equally well, indicating no significant impact on the motor coordination in mice (see, FIG. 7E). Both gel and RM191A Gel-treated groups exhibited higher spontaneous rearing behaviour compared to the untreated group (see, FIG. 7F). Although this increase was not significant, it implied that hyaluronic acid-based hydrogel might improve exploratory behaviour of mice.

Example 5

RM191A is Readily Bioavailable, Attenuates Inflammation and Improves Wound Healing in Mice Skin Penetration and Metabolism As a follow on from the results of the toxicity studies and skin explant work we explored RM191A's ability to penetrate through the skin into the body. The primary goal was to determine whether or not RM191A remained on the skin where it could be washed away, or if it penetrated through the skin into the blood stream and was cleared through metabolism. Further, if it was found to enter the blood stream, by what mechanism was it then metabolised and cleared from the body.

To gain these insights, we applied 50 µL of RM191A Gel (1.9 mL/kg body weight) topically to the shaved dorsal surfaces of 8 week old mice and measured total copper content in different animal tissues at different time points using ICP-MS.

Figure 8:
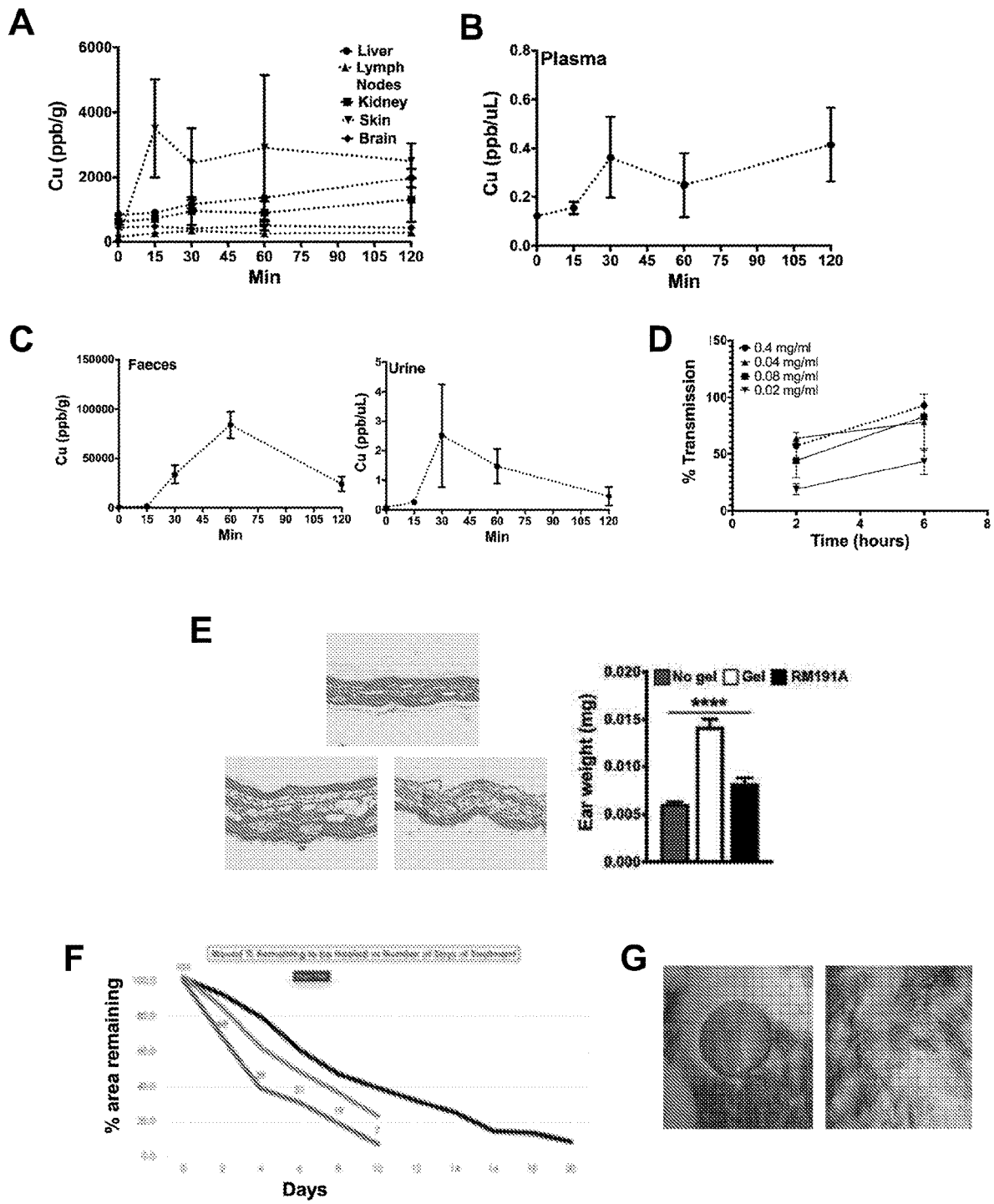
FIG. 8: RM191 improves wound healing in mice. Copper levels in (A) different mouse tissues and (B) plasma overtime measured using ICP-MS. (C) Copper levels in faeces and urine over time measured using ICP-MS. (D) Percentage transmission of RM191A through BBB over time. (E) Representative H&E staining images of ear sections and earweights from mice treated with TPA, and RM191A Gel or gel only. (F) Representative images of wound areas and percentage wound closure in mice treated with RM191A Gel (blue line), gel only (green line), or no treatment (black line). (G) Photographic images of excision wound at 0 days (left), and after 10 days (right).

As expected, the amount of copper in the skin steadily increased over 2 hrs following RM191A Gel treatment (see, FIG. 8A). There was also an increase in copper levels in internal tissues, including liver, kidney, brain and lymph nodes, which implied that topically applied RM191A Gel was able to penetrate through the skin layers (see, FIG. 8A) and enter the bloodstream. The plasma copper levels spiked within 30 minutes of RM191A Gel application and stayed steady for 2 hours (see, FIG. 8B), indicating that RM191A Gel was distributed and metabolised systemically.

The ICP-MS results demonstrated that the copper in RM191A Gel followed the common mammalian metabolic route, with most of the copper being metabolized by the liver, the remainder by the kidneys and excreted within one hour via the faeces and urine respectively (see, FIG. 8C). Moreover, the copper was cleared from the body within 24 hours as its levels in tissues and blood collected 24 hours after RM191A Gel application reduced to the same level as the control group at this time point (see, Table 9).

TABLE 9

COPPER CONTENTS (PPB/μL* OR PPB/G**) IN PLASMA AND TISSUES 24 HOURS AFTER RM191A GEL OR GEL TREATMENT IN MICE.

|  | Plasma* | Liver** | Kidney** | Brain** |
|---|---|---|---|---|
| Gel (n = 9) | 0.173 ± 0.007 | 744.05 ± 112.01 | 626.46 ± 23.11 | 486.18 ± 37.02 |
| RM191A Gel (n = 9) | 0.170 ± 0.005 | 826.02 ± 203.66 | 591.74 ± 30.46 | 543.56 ± 102.60 |

Blood-Brain-Barrier Transmission

The increase in brain copper levels indicated that RM191A Gel was able to cross the blood-brain-barrier (BBB). We investigated this further using a standard 3D model for human BBB transmission, which demonstrated that 50.79% of RM191A at 0.4 mg/mL concentration crossed the BBB in 2 hours, and 95.65% crossed the BBB within 6 hours (see, FIG. 8D).

Anti-Inflammatory Activity

Our previous in vitro data demonstrated that RM191A exhibits anti-inflammatory activity via suppression of ROS overproduction and the beneficial up/down regulation of various inflammatory cytokines and gene signalling pathways. Here we used a TPA (12-O-tetradecanoylphorbol-13-acetate)-induced mouse ear edema model to test the anti-inflammatory activity of RM191A in mice (Song et al., 2008). TPA treatment doubled the ear weight after 6 hours when compared to vehicle (acetone)-treated control (see, FIG. 8E). Pre-treatment with RM191A Gel (50 μL of 21 μg/mL) reduced the ear weight by 83% compared to placebo-gel and TPA-treated control. Ear cross-sections showed increased ear thickening and granulocyte infiltration in TPA/gel-treated group, which was significantly attenuated in the RM191A Gel pre-treated group.

Wound Healing

Finally, the effect of RM191A Gel was examined in wound regeneration in mice. A circular wound of ten-millimetre diameter was created on the dorsal surfaces of 12 week old male mice, after which 50 μL of RM191A Gel (21 μg/mL) or gel alone was topically applied every 2 days to the wound area. Significantly, only 2 days after the start of RM191A Gel treatment, 31% wound regeneration was observed in RM191A Gel-treated group compared to only 12% wound closure in the control group (see, FIG. 8F). In FIG. 8G, photographs are provided showing the excision wound at day 0 and day 10. It can be clearly observed that the wound is close to healed at after the 10 day time point. After 12 days, 93% of the skin was regenerated in the RM191A Gel-treated animals, whereas 77% of the wound area was healed in gel-treated mice. The projected (usual) time to fully heal untreated wounds is 23 days, more than twice the time of the compound RM191A. This is a dramatic improvement over both the vehicle and untreated wounds. In this regard, vehicle treated wounds were 77% healed at the 10 day time-point, and untreated wounds were 61% healed.

Previously published data employing similar full wound thickness techniques in mouse/rat models using 8 mm and 20 mm full thickness wounds found that untreated (control) groups of animals, achieved 95% healing in >16 days and >21 days respectively (Rong et al., 2019; and Tort et al., 2019).

These data indicate that treatment of large excisional wounds with RM191A Gel can meaningfully accelerate regenerate large full-thickness excisional wounds, which are the equivalent of human ulcerative wounds. Tests indicate this improvement rate is more than twice as fast as the normal healing time for wounds.

Example 6

Impact Injury Healing Potential of RM191A

Figure 9:
FIG. 9 provides photographic images of an impact injury to a subject. (A) A photographic image of the initial impact injury, taken within 15 minutes of the injury occurring to the subject. (B) A photographic image showing the injury site 19 hours and 44 minutes after the injury being suffered, after administration with RM191A.
Figure 9:

A subject was struck on the edge of the right shin bone by a fast pitched baseball. The subject experienced significant pain and the injury swelled and bruised almost immediately, as shown in FIG. 9A. The subject found it difficult to walk the impact was so severe. 5% RM191A gel at a rate of about 5 mg/cm$^2$ of skin was topically administered to the subject at the site of the impact damage.

As demonstrated in FIG. 9B, the following morning the injury and pain resolved overnight and with very little bruising and no swelling being evident.

Example 7

Wound Healing Properties of RM191A

A subject was severely impacted by a tree branch of about 5 cm in diameter, that was being strained to breaking point. The branch collided with the subject's face at high speed causing the subjects sunglasses to be broken at the nose bridge. In particular the area immediately below the left eye was heavily impacted, causing a deep incision in the skin below the lower left eyelid, abrasions around the left eye and above the right eyebrow, as well as a deep cut in the bridge of the subject's nose (see, FIG. 10A).

Left untreated, a heavily bruised "black eye" was anticipated, including symptoms including pain, swelling, bruising and significant inflammation.

Within five minutes of the injury, the subject applied the RM191A 5% gel at a rate of about 5 mg/cm$^2$ of skin and continued to apply the gel frequently over the course of several hours that evening and at least three times daily thereafter for seven days.

Notably, no other intervention was used at all by the subject. That is, no treatments such as ice or other anti-inflammatory or antiseptic therapy were administered to the subject.

The outcomes were as follows:

Very shortly after applying the gel (i.e., immediately following the injury) the pain of the injury significantly reduced.

Over the course of the next hour, the subject experienced no pain, and very little bruising and swelling of the eye occurred, whereas it was expected that the eye would be "black" for several weeks given the severity of the impact and that the nose bridge and the split area of skin under the eyelid would be permanently scarred.

From very shortly following the first application of the gel the subject reported no pain as a result of the injury.

After 24 hours, no swelling around the wound area could be observed and the wound scabbing was well progressed (FIG. 1B).

Figure 10:
FIG. 10 provides photographic images of an impact injury and incision wound to a subject. Photographic images of (A) the initial impact injury and incision wound, taken immediately after administering RM191A to the wound; (B) 25 hours after first administration of RM191A; (C) 4 days and 3 hours after first administration of RM191A; and (D) 7 days and 18 hours after first administration of RM191A.
Figure 10:
Figure 10:
Figure 10:

As shown in FIG. 10C, the wound scabbing was close to falling off after 4 days, and bruising had almost completely resolved. In addition, no swelling could be observed around the eye.

The injury resolved completely in 7 days, with scabbing and healing occurring at an accelerated rate and the subject showed no scarring, skin nerve dysfunction or change of skin colour or texture whatsoever, or other remnants of the injury at the 7 day time-point (FIG. 10D).

It is generally reported that with early ice intervention a "black eye" without contusions typically takes 2 weeks to resolve, and thereafter the skin around the eye will continue to be red/pink for another week or two.

Example 8

Therapeutic Poison Ivy Potential of RM191A

It was understood that through reducing the free radicals, and thereby inflammation, at an injury site of a subject, that the RM191A composition could be used to treat or prevent skin allergy, including poison ivy reaction.

In order to demonstrate this potential a subject (male, mid-50s aged, USA based practicing physician) with a known sensitivity to poison ivy was topically administered with RM191A after exposure to poison ivy. The following is his description of the activity of a 5% RM191A gel in the treatment of his severe poison ivy reaction:

"I am very sensitive to poison ivy and get progressive weeping erythematous edema after initial vesicles from the poison ivy. In this case, there was the weeping edematous itching area which I put on the gel, got an immediate decrease in itching to where I could sleep and the healing process accelerated to where weeping stopped within 2 days and edema started to go down over following 2-4 days and complete healing shortly after. A tremendous advance in treating severe reactions to poison ivy. Steroids in past did not help my reaction."

Figure 11:
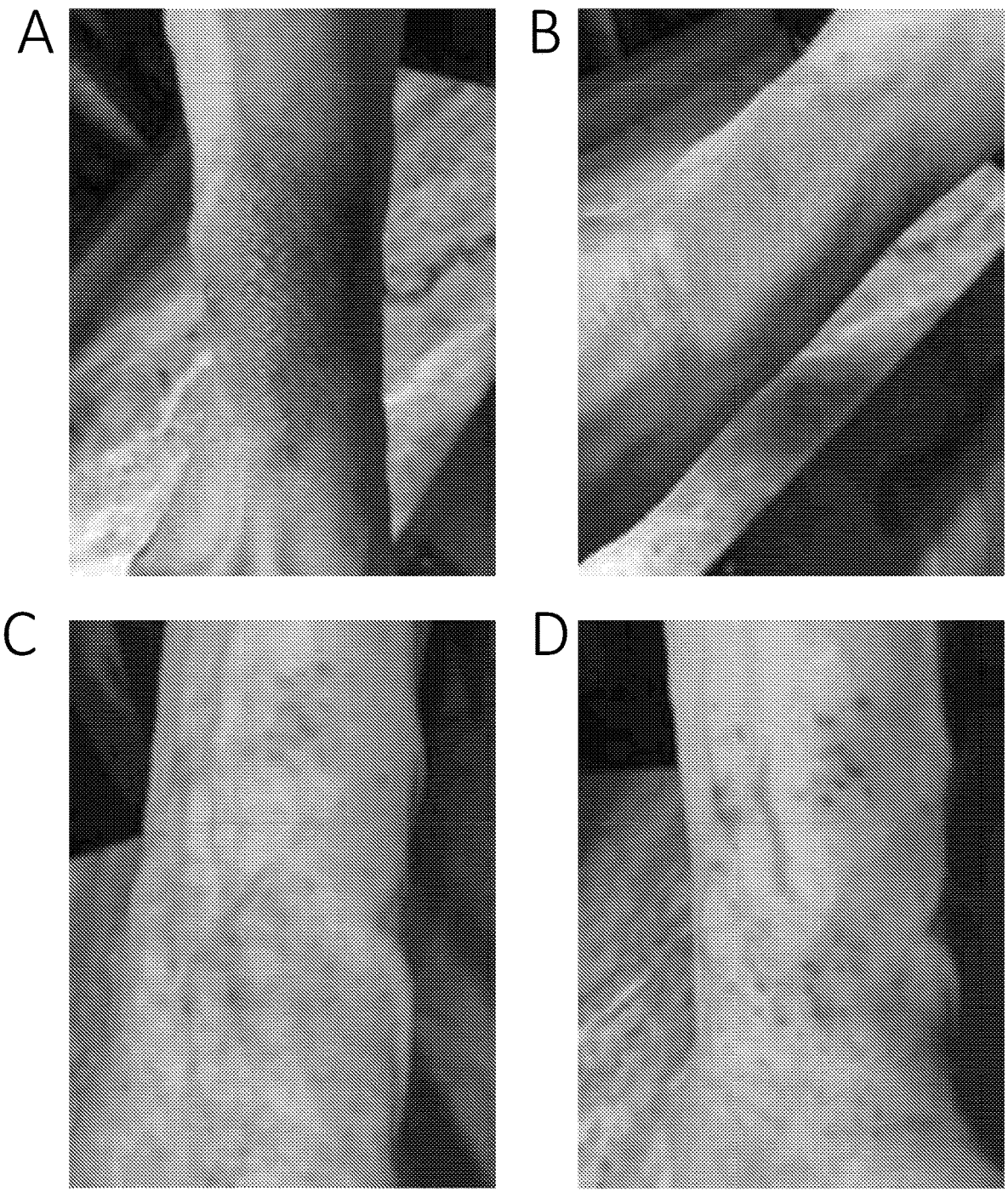
FIG. 11 provides photographic images of a skin reaction to poison ivy. Photographic images of (A) left forearm; and (B) right forearm; before treatment with RM191A. Photographic images of (C) left forearm; and (D) right forearm; after 2 days of administering RM191A.

FIG. 11 demonstrates the significant therapeutic effect of RM191A administration, where the reaction had subsided by about 90%, over only 2 days.

Persons skilled in the art will appreciate that numerous variations and modifications will become apparent. All such variations and modifications which become apparent to persons skilled in the art, should be considered to fall within the spirit and scope of the invention broadly before described.

Thus, for example, it will be appreciated that features from different examples above may be used interchangeably where appropriate.

BIBLIOGRAPHY

Beauchamp, C., and Fridovich, I. (1971) Superoxide dismutase: improved assays and an assay applicable to acrylamide gels. Anal Biochem 44, 276-287.
Brown G. L., Nanney L. B., Griffen J., Cramer A. B., Yancey J. M., Curtsinger L. J. 3rd, Holtzin L., Schultz G. S., Jurkiewicz M. J., Lynch J. B. (1989), Enhancement of wound healing by topical treatment with epidermal growth factor. N. Engl. J. Med., 321: 76-79.
Dunaway, S., Odin, R., Zhou, L., Ji, L., Zhang, Y., and Kadekaro, A. L. (2018) Natural Antioxidants: Multiple Mechanisms to Protect Skin From Solar Radiation. Front Pharmacol 9, 392.
Ferret, P. J., Soum, E., Negre, O., and Fradelizi, D. (2002) Auto-protective redox buffering systems in stimulated macrophages. BMC Immunol 3, 3.
Fu, X., Li, X., Cheng, B., Chen, W., Sheng, Z., (2005), Engineered growth factors and cutaneous wound healing: Success and possible questions in the past 10 years. Wound Repair Regen, 13: 122-130.
Goldman, R., 2004, Growth factors and chronic wound healing: past, present, and future. Adv. Skin Wound Care, 17⊛)17: 24.
Gupta, R., Dixon, K. M., Deo, S. S., Holliday, C. J., Slater, M., Halliday, G. M., Reeve, V. E., and Mason, R. S. (2007) Photoprotection by 1,25 dihydroxyvitamin D3 is associated with an increase in p53 and a decrease in nitric oxide products. J Invest Dermatol 127, 707-715.
Hess, C. T., (1999), Caring for a diabetic ulcer. Nursing, 29:71.
Holmes, S., Abbassi, B., Su, C., Singh, M., and Cunningham, R. L. (2013) Oxidative stress defines the neuroprotective or neurotoxic properties of androgens in immortalized female rat dopaminergic neuronal cells. Endocrinology 154, 4281-4292.
Hsu, H. Y., and Wen, M. H. (2002) Lipopolysaccharide-mediated reactive oxygen species and signal transduction in the regulation of interleukin-1 gene expression. J Biol Chem 277, 22131-22139.
Le Quéré, S., Lacan, D., Lemaire, B., Carillon, J., Schmitt, K., (2014), The role of superoxide dismutase (SOD) in skin disorders. Nutrafoods 13: 13-27.
Lee, J. A., Song, H. Y., Ju, S. M., Lee, S. J., Kwon, H. J., Eum, W. S., Jang, S. H., Choi, S. Y., and Park, J. S. (2009) Differential regulation of inducible nitric oxide synthase and cyclooxygenase-2 expression by superoxide dismutase in lipopolysaccharide stimulated RAW 264.7 cells. Exp Mol Med 41, 629-637.
Mason, R. S., and Reichrath, J. (2013) Sunlight vitamin D and skin cancer. Anticancer Agents Med Chem 13, 83-97.
McCord, J. M., Edeas, M. A., (2005), SOD, oxidative stress and human pathologies: a brief history and a future vision. Biomed. Pharmacother. 59: 139-142.
Reuter, S., Gupta, S. C., Chaturvedi, M. M., Aggarwal, B. B., (2010) Oxidative stress, inflammation, and cancer: How are they linked? J Am Acad Dermatol. 49 (11)1 603-1616.
Stein J., (2000), Int. Med. World Rep.
Song, H. Y., Lee, J. A., Ju, S. M., Yoo, K. Y., Won, M. H., Kwon, H. J., Eum, W. S., Jang, S. H., Choi, S. Y., and Park, J. (2008) Topical transduction of superoxide dismutase mediated by HIV-1 Tat protein transduction domain ameliorates 12-O-tetradecanoylphorbol-13-acetate (TPA)-induced inflammation in mice. Biochem Pharmacol 75, 1348-1357.

The invention claimed is:

1. A method of reducing an inflammatory response in a subject, the method comprising administering to the subject a composition comprising a copper ion complex or a mixture of copper ion complexes obtained by a process comprising:
   (a) contacting copper having a specific surface area of from about 0.1 $m^2$/kg to about 2 $m^2$/kg, or in the form of particles having a bulk density of between about 0.2 and about 8.0 g/$cm^3$, with a chelating agent in solid form; and
   (b) while the copper is in contact with the chelating agent, contacting the copper and chelating agent with an oxidising agent, to form the copper ion complex or mixture of copper ion complexes;
wherein the composition further comprises hyaluronic acid, a salt of hyaluronic acid, or a mixture thereof;
to thereby reduce the inflammatory response in the subject.

2. The method according to claim 1, wherein the inflammatory response is at a wound site, wherein the wound is a delayed-healing wound, an incompletely healed wound, dehisced wound, chronic wound, venous ulcer, venous stasis ulcer, arterial ulcer, decubitus ulcer, diabetic ulcer, skin ulcer resulting from trauma, or skin ulcer resulting from a burn.

3. The method according to claim 1, wherein the method reduces fibrosis in the subject.

4. A method of preventing or reducing DNA damage caused by radiation in a tissue of a subject, the method comprising administering to the subject a composition comprising a copper ion complex or a mixture of copper ion complexes obtained by a process comprising:
  (a) contacting copper having a specific surface area of from about 0.1 m²/kg to about 2 m²/kg, or in the form of particles having a bulk density of between about 0.2 and about 8.0 g/cm³, with a chelating agent in solid form; and
  (b) while the copper is in contact with the chelating agent, contacting the copper and chelating agent with an oxidising agent, to form the copper ion complex or mixture of copper ion complexes;
wherein the composition further comprises hyaluronic acid, a salt of hyaluronic acid, or a mixture thereof;
to thereby reduce or prevent DNA damage in the tissue of the subject.

5. The method according to claim 4, wherein the radiation is ultraviolet (UV) radiation or gamma radiation.

6. The method according to claim 4, wherein the radiation is radiated from the Sun.

7. The method according to claim 4, wherein the tissue is skin.

8. The method according to claim 4, wherein the composition is administered to the subject prior to being exposed to the radiation, and/or administered to the subject after being exposed to the radiation.

9. The method according to claim 1, wherein the composition is formulated as a gel, a cream, a paste, a lotion, a spray, a suspension, a solution, a dispersion salve, a hydrogel or an ointment formulation.

10. The method according to claim 1, wherein the composition is topically administered to the subject.

11. The method according to claim 1, wherein the composition is administered to the subject at least once, twice, three times, four times, or five times per day.

12. The method according to claim 1, wherein the chelating agent is ethylenediaminetetraacetic acid (EDTA), a salt of EDTA or a mixture thereof.

13. The method according to claim 1, wherein the process further comprises a step (c) of allowing the combination of agents resulting from step (b) to react until completion.

14. The method according to claim 1, wherein the composition comprising a copper ion complex or a mixture of copper ion complexes comprises copper coordinated to a ligand of Formula (I) or Formula (II) or Formula (VI)

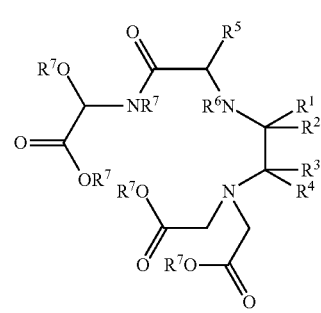
Formula (I)

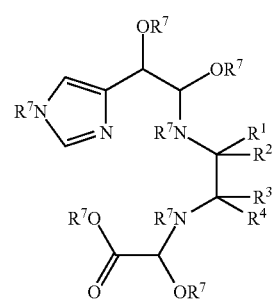
Formula (II)

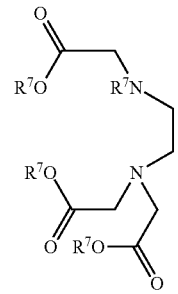
Formula (VI)

wherein
  $R^1$ is H and $R^2$ is H or OH, or $R^1$ and $R^2$ together with the carbon atom to which they are attached form a carbonyl (C=O);
  $R^3$ is H and $R^4$ is H or OH, or $R^3$ and $R^4$ together with the carbon atom to which they are attached form a carbonyl (C=O);
  $R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
  each $R^7$ is independently absent or H;
or a salt thereof, tautomer thereof or polymer thereof.

15. The method of claim 1, wherein the composition inhibits or reduces the inflammatory response at the site of a wound or burn.

16. The method according to claim 4, wherein the composition comprises a copper ion complex or a mixture of copper ion complexes comprising copper coordinated to a ligand of Formula (I) or Formula (II) or Formula (VI)

Formula (I)

Formula (II)

Formula (VI)

wherein
- $R^1$ is H and $R^2$ is H or OH, or $R^1$ and $R^2$ together with the carbon atom to which they are attached form a carbonyl (C=O);
- $R^3$ is H and $R^4$ is H or OH, or $R^3$ and $R^4$ together with the carbon atom to which they are attached form a carbonyl (C=O);
- $R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$)CH$_2$OR$^7$ or —CH$_2$CO$_2$R$^7$; and
- each $R^7$ is independently absent or H;

or a salt thereof, tautomer thereof or polymer thereof.

17. The method according to claim 4, wherein the composition is formulated for topical administration as a gel, a cream, a paste, a lotion, a spray, a suspension, a solution, a dispersion salve, a hydrogel or an ointment.

18. The method according to claim 4, wherein the composition is administered to the subject once, twice, three times, four times, or five times per day.

19. A cosmetic composition suitable for reducing skin damage from ultraviolet radiation, the composition comprising:
(i) a copper ion complex or a mixture of copper ion complexes comprising copper coordinated to a ligand of Formula (I) or Formula (II) or Formula (VI)

wherein
- $R^1$ is H and $R^2$ is H or OH, or $R^1$ and $R^2$ together with the carbon atom to which they are attached form a carbonyl (C=O);
- $R^3$ is H and $R^4$ is H or OH, or $R^3$ and $R^4$ together with the carbon atom to which they are attached form a carbonyl (C=O);
- $R^5$ is —CH(OR$^7$)CH$_2$OR$^7$ or —CH$_2$CO$_2$R$^7$ and $R^6$ is absent or H, or $R^5$ is H and $R^6$ is —CH(OR$^7$) CH$_2$OR$^7$ or —CH$_2$CO$_2$R$^7$; and
- each $R^7$ is independently absent or H;

or a salt thereof, tautomer thereof or polymer thereof; and
(ii) an organic chemical compound that absorbs UV light; an inorganic particulate that reflects, scatters, and/or absorbs UV light; and/or an organic particulate that significantly absorbs UV radiation, and contain multiple chromophores that reflect and scatter a fraction of radiation like inorganic particulates
wherein the composition further comprises hyaluronic acid, a salt of hyaluronic acid, or a mixture thereof.

20. The method according to claim 1, wherein reducing an inflammatory response in a subject promotes wound healing in the subject.

* * * * *